(12) United States Patent
Fonte et al.

(10) Patent No.: US 11,280,543 B2
(45) Date of Patent: *Mar. 22, 2022

(54) RAPIDLY COOLING FOOD AND DRINKS

(71) Applicant: ColdSnap, Corp., Billerica, MA (US)

(72) Inventors: Matthew Fonte, Concord, MA (US); Robert Devaney, Auburndale, MA (US); John Heymans, Hampstead, NH (US); Nicholas Fonte, Sudbury, MA (US); Benjamin Fichera, Newburyport, MA (US); Ian McGinty, Chelmsford, MA (US); Jason Hugenroth, Baton Rouge, LA (US); Max Louis Lemoine, Baton Rouge, LA (US); Daniel Ross Stelly, Baton Rouge, LA (US)

(73) Assignee: ColdSnap, Corp., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/359,141

(22) Filed: Jun. 25, 2021

(65) Prior Publication Data
US 2021/0325105 A1 Oct. 21, 2021

Related U.S. Application Data

(63) Continuation of application No. 17/031,425, filed on Sep. 24, 2020, which is a continuation of application No. 16/824,483, filed on Mar. 19, 2020, now Pat. No. 10,830,529, which is a continuation of application No. 16/459,176, filed on Jul. 1, 2019, now Pat. No. 10,612,835, which is a continuation-in-part of application No. 16/104,758, filed on Aug. 17, 2018, now Pat. No. 10,334,868.

(Continued)

(51) Int. Cl.
*F25D 25/00* (2006.01)
*A23G 9/00* (2006.01)
*A23G 9/12* (2006.01)
*A23G 9/22* (2006.01)
*A23G 9/28* (2006.01)

(52) U.S. Cl.
CPC ............. *F25D 25/005* (2013.01); *A23G 9/12* (2013.01); *A23G 9/224* (2013.01); *A23G 9/28* (2013.01)

(58) Field of Classification Search
CPC .......... A23G 9/224; A23G 9/222; A23G 9/28; A23G 9/12; F25D 25/005; F25D 23/12; B65D 85/8046; B65D 51/32
USPC .................................................. 99/452, 455
See application file for complete search history.

(56) References Cited

U.S. PATENT DOCUMENTS 1,438,523 A 12/1922 Duren
1,555,701 A 9/1925 Prichard et al.
(Continued)

FOREIGN PATENT DOCUMENTS

CN 203314023 12/2013
EP 0471904 2/1992
(Continued)

OTHER PUBLICATIONS

Hosford et al., "The aluminum beverage can," Scientific American, Sep. 1, 1994, 271(3):48-53.
(Continued)

*Primary Examiner* — Reginald Alexander
(74) *Attorney, Agent, or Firm* — Fish & Richardson P.C.

(57) ABSTRACT

Systems and methods have demonstrated the capability of rapidly cooling the contents of pods containing the ingredients for food and drinks.

21 Claims, 52 Drawing Sheets

Related U.S. Application Data

(60) Provisional application No. 62/831,600, filed on Apr. 9, 2019, provisional application No. 62/831,646, filed on Apr. 9, 2019, provisional application No. 62/831,666, filed on Apr. 9, 2019, provisional application No. 62/831,657, filed on Apr. 9, 2019, provisional application No. 62/801,587, filed on Feb. 5, 2019, provisional application No. 62/758,110, filed on Nov. 9, 2018.

(56) References Cited

U.S. PATENT DOCUMENTS

| | | | |
|---|---|---|---|
| 1,944,114 A | 1/1934 | Snowlund |
| 2,350,534 A | 6/1944 | Arthur |
| 2,518,758 A | 8/1950 | Cook |
| 2,541,814 A | 2/1951 | Gaddini |
| 2,577,916 A | 12/1951 | Rollman |
| 3,061,280 A | 10/1962 | Kraft et al. |
| 3,393,900 A | 7/1968 | Wagner et al. |
| 3,635,147 A | 1/1972 | Lee |
| 3,896,959 A | 7/1975 | Roy |
| 3,914,673 A | 10/1975 | Wallin |
| 3,951,289 A | 4/1976 | Landen |
| 4,110,476 A | 8/1978 | Rhodes |
| 4,162,855 A | 7/1979 | Bender |
| 4,408,690 A | 10/1983 | Ferrero |
| 4,538,427 A | 9/1985 | Cavalli |
| 4,563,880 A | 1/1986 | Cipelletti |
| 4,568,192 A | 2/1986 | Kudermann |
| 4,573,329 A | 3/1986 | Cavalli |
| 4,632,566 A | 12/1986 | Masel et al. |
| 4,635,560 A | 1/1987 | Ballantyne |
| 4,664,529 A | 5/1987 | Cavalli |
| 4,784,886 A | 11/1988 | Wissgott |
| 4,796,440 A | 1/1989 | Shiotani et al. |
| 4,827,732 A | 5/1989 | Suyama et al. |
| 4,885,917 A | 12/1989 | Spector |
| 4,913,645 A | 4/1990 | Daouse et al. |
| 4,993,238 A | 2/1991 | Inagaki |
| 5,264,237 A | 11/1993 | Traitler et al. |
| 5,331,820 A | 7/1994 | Faries et al. |
| 5,343,710 A | 9/1994 | Cathenaut et al. |
| 5,363,746 A | 11/1994 | Gordon |
| 5,435,143 A | 7/1995 | Heinrich |
| 5,447,036 A | 9/1995 | Heinrich |
| 5,533,800 A | 7/1996 | Stiegelmann et al. |
| 5,549,042 A | 8/1996 | Bukoschek et al. |
| 5,556,659 A | 9/1996 | De Pedro et al. |
| 5,568,729 A | 10/1996 | Heinrich et al. |
| 5,571,282 A | 11/1996 | Earle |
| 5,603,965 A | 2/1997 | Daouse |
| 5,692,633 A | 12/1997 | Gordon |
| 5,823,675 A | 10/1998 | Myerly |
| 5,834,739 A | 11/1998 | Lockwood et al. |
| 5,843,512 A | 12/1998 | Daouse et al. |
| 5,879,731 A | 3/1999 | Beckett et al. |
| 5,888,562 A | 3/1999 | Hansen et al. |
| 5,888,567 A | 3/1999 | Daouse |
| 5,932,275 A | 8/1999 | Nalur |
| 5,967,381 A | 10/1999 | Van Zeeland et al. |
| 6,004,606 A | 12/1999 | French et al. |
| 6,012,383 A | 1/2000 | Lande |
| 6,045,836 A | 4/2000 | Saunier et al. |
| 6,060,094 A | 5/2000 | Nalur |
| 6,071,546 A | 6/2000 | Nalur |
| 6,089,747 A | 7/2000 | Huang |
| 6,174,157 B1 | 1/2001 | Daouse et al. |
| 6,194,014 B1 | 2/2001 | Busse et al. |
| 6,210,739 B1 | 4/2001 | Nalur |
| 6,220,047 B1 | 4/2001 | Vogel et al. |
| 6,221,409 B1 | 4/2001 | Bueno Ceresuela |
| 6,251,455 B1 | 6/2001 | Thomas |
| 6,251,456 B1 | 6/2001 | Maul et al. |
| 6,267,073 B1 | 7/2001 | Busse et al. |
| 6,272,974 B1 | 8/2001 | Pascotti et al. |
| 6,280,783 B1 | 8/2001 | Blaschke et al. |
| 6,284,294 B1 | 9/2001 | French et al. |
| 6,299,923 B1 | 10/2001 | Meziane |
| 6,338,863 B1 | 1/2002 | Amiel et al. |
| 6,340,488 B1 | 1/2002 | French et al. |
| 6,379,724 B1 | 4/2002 | Best et al. |
| 6,399,134 B1 | 6/2002 | Best et al. |
| 6,413,563 B1 | 7/2002 | Blaschke et al. |
| 6,431,395 B1 | 8/2002 | San Martin et al. |
| 6,479,085 B1 | 11/2002 | Archibald |
| 6,524,634 B2 | 2/2003 | Busse et al. |
| 6,524,635 B1 | 2/2003 | Aebi |
| 6,531,169 B2 | 3/2003 | Best et al. |
| 6,548,097 B1 | 4/2003 | Best et al. |
| 6,565,902 B2 | 5/2003 | Ruano Del Campo et al. |
| 6,579,375 B2 | 6/2003 | Beckett et al. |
| 6,592,928 B2 | 7/2003 | Makela et al. |
| 6,616,963 B1 | 9/2003 | Zerby et al. |
| 6,623,784 B2 | 9/2003 | Zerby et al. |
| 6,627,239 B1 | 9/2003 | Gavie et al. |
| 6,645,538 B2 | 11/2003 | Best et al. |
| 6,689,406 B2 | 2/2004 | Kuehl et al. |
| 6,713,101 B2 | 3/2004 | Lometillo et al. |
| 6,726,944 B2 | 4/2004 | Blaschke et al. |
| 6,739,475 B2 | 5/2004 | San Martin et al. |
| 6,758,056 B1 | 7/2004 | Cathenaut et al. |
| 6,790,467 B2 | 9/2004 | Kostival et al. |
| 6,818,238 B2 | 11/2004 | Napolitano et al. |
| 6,820,765 B2 | 11/2004 | Pahl |
| 6,824,808 B2 | 11/2004 | Best et al. |
| 6,835,406 B1 | 12/2004 | Wurzel et al. |
| 6,861,082 B2 | 3/2005 | Laffont et al. |
| 6,890,577 B2 | 5/2005 | Vaghela et al. |
| 6,936,794 B2 | 8/2005 | Zhang et al. |
| 6,942,885 B2 | 9/2005 | Ross et al. |
| 6,971,248 B1 | 12/2005 | Wiggs |
| 7,211,283 B2 | 5/2007 | Jones et al. |
| 7,314,307 B2 | 1/2008 | Cai |
| 7,407,681 B2 | 8/2008 | Marchon et al. |
| 7,451,613 B2 | 11/2008 | Barraclough et al. |
| 7,513,213 B2 | 4/2009 | Mange et al. |
| 7,619,188 B2 | 11/2009 | Oghafua et al. |
| 7,650,834 B2 | 1/2010 | Bravo |
| 7,658,960 B2 | 2/2010 | Thomas et al. |
| 7,727,573 B2 | 6/2010 | Vaghela et al. |
| 7,730,831 B2 | 6/2010 | Mange et al. |
| 7,736,681 B2 | 6/2010 | Belzowski et al. |
| 7,754,260 B2 | 7/2010 | Kruik et al. |
| 7,918,334 B2 | 4/2011 | Gaetano et al. |
| 8,182,853 B2 | 5/2012 | Puaud et al. |
| 8,273,392 B2 | 9/2012 | Ho et al. |
| 8,347,808 B2 | 1/2013 | Belzowski et al. |
| 8,425,967 B2 | 4/2013 | Vaghela et al. |
| 8,459,497 B2 | 6/2013 | Milan et al. |
| 8,628,811 B2 | 1/2014 | Panyam et al. |
| 8,685,477 B2 | 4/2014 | Almblad et al. |
| 8,720,493 B2 | 5/2014 | Dose et al. |
| 8,777,057 B2 | 7/2014 | Fiedler |
| 8,784,091 B2 | 7/2014 | Henriet et al. |
| 8,840,943 B2 | 9/2014 | Amend |
| 8,844,426 B2 | 9/2014 | Ochoa et al. |
| 8,877,179 B2 | 11/2014 | Mercenier et al. |
| 8,906,437 B2 | 12/2014 | Green et al. |
| 8,936,821 B2 | 1/2015 | Ummadi et al. |
| 8,940,352 B2 | 1/2015 | Ambrogi et al. |
| 8,960,992 B2 | 2/2015 | de Jong |
| 8,960,999 B1 | 2/2015 | Ochoa et al. |
| 8,980,354 B2 | 3/2015 | Harlaux-Pasquier et al. |
| 9,155,322 B2 | 10/2015 | Ricco et al. |
| 9,232,811 B2 | 1/2016 | Panyam et al. |
| 9,242,387 B2 | 1/2016 | Amend et al. |
| 9,253,993 B2 | 2/2016 | Ummadi et al. |
| 9,346,611 B1 | 5/2016 | Roberts et al. |
| 9,351,503 B2 | 5/2016 | Amend et al. |
| 9,351,504 B2 | 5/2016 | Ricco et al. |
| 9,448,006 B2 | 9/2016 | Kulkarni et al. |
| 9,572,358 B2 | 2/2017 | Whitehouse |
| 9,573,726 B2 | 2/2017 | Danesin et al. |

(56) References Cited

U.S. PATENT DOCUMENTS

| | | |
|---|---|---|
| 9,591,865 B2 | 3/2017 | Ravji et al. |
| 9,826,756 B2 | 11/2017 | Ummadi et al. |
| 9,861,114 B2 | 1/2018 | Lallemand et al. |
| 9,888,706 B2 | 2/2018 | Ummadi et al. |
| 9,913,486 B2 | 3/2018 | Nalur |
| 10,039,298 B2 | 8/2018 | Noth et al. |
| 10,058,833 B2 | 8/2018 | Bloch |
| 10,111,447 B2 | 10/2018 | Noth et al. |
| 10,117,445 B2 | 11/2018 | Imer |
| 10,149,487 B2 | 12/2018 | Shuntich |
| 10,279,973 B2 | 5/2019 | Butscher et al. |
| 10,314,320 B2 | 6/2019 | Roberts et al. |
| 10,334,868 B2 | 7/2019 | Fonte |
| 10,358,284 B2 | 7/2019 | Fonte |
| 10,368,680 B2 | 8/2019 | Ryan |
| 10,426,180 B1 | 10/2019 | Fonte |
| 10,543,978 B1 | 1/2020 | Fonte et al. |
| 10,612,835 B2 | 4/2020 | Fonte et al. |
| 10,782,049 B1 | 9/2020 | Fonte et al. |
| 10,897,916 B2 | 1/2021 | Fonte |
| 10,973,240 B1 | 4/2021 | Fonte |
| 11,021,319 B2 | 6/2021 | Fonte |
| 11,033,044 B1 | 6/2021 | Fonte et al. |
| 11,109,610 B2 | 9/2021 | Fonte et al. |
| 2001/0035016 A1 | 11/2001 | Weber et al. |
| 2001/0052294 A1 | 12/2001 | Schmed |
| 2002/0001644 A1 | 1/2002 | Busse et al. |
| 2002/0034572 A1 | 3/2002 | Blaschke et al. |
| 2002/0166870 A1 | 11/2002 | Martin et al. |
| 2002/0182300 A1 | 12/2002 | Groh et al. |
| 2003/0000240 A1 | 1/2003 | Pahl |
| 2003/0012864 A1 | 1/2003 | Gerber |
| 2003/0017244 A1 | 1/2003 | Blaschke et al. |
| 2003/0035876 A1 | 2/2003 | Kostival et al. |
| 2003/0084898 A1 | 5/2003 | Beckett et al. |
| 2003/0134025 A1 | 7/2003 | Vaghela et al. |
| 2004/0058037 A1 | 3/2004 | Masuda et al. |
| 2004/0161503 A1 | 8/2004 | Malone et al. |
| 2004/0211201 A1 | 10/2004 | Bischel et al. |
| 2004/0219269 A1 | 11/2004 | Cathenaut et al. |
| 2005/0098561 A1 | 5/2005 | Schwoebel |
| 2005/0178796 A1 | 8/2005 | Schraiber |
| 2005/0189375 A1 | 9/2005 | McGill |
| 2005/0193896 A1 | 9/2005 | McGill |
| 2005/0229622 A1 | 10/2005 | Franck et al. |
| 2005/0279219 A1 | 12/2005 | Turi |
| 2006/0090654 A1 | 5/2006 | Mange et al. |
| 2006/0110507 A1 | 5/2006 | Yoakinn et al. |
| 2006/0110515 A1 | 5/2006 | Waletzko et al. |
| 2006/0254429 A1 | 11/2006 | Sinton |
| 2006/0255066 A1 | 11/2006 | Damiano et al. |
| 2006/0266751 A1 | 11/2006 | Ali et al. |
| 2006/0280826 A1 | 12/2006 | Mange et al. |
| 2007/0144357 A1 | 6/2007 | Rivera |
| 2007/0160722 A1 | 7/2007 | Best et al. |
| 2007/0172562 A1 | 7/2007 | Medina Quintanilla |
| 2007/0177455 A1 | 8/2007 | Renfro |
| 2007/0181604 A1 | 8/2007 | Rusch |
| 2007/0202231 A1 | 8/2007 | Ambrogi et al. |
| 2007/0275131 A1 | 11/2007 | Bertini et al. |
| 2008/0066483 A1 | 3/2008 | Klier et al. |
| 2008/0102172 A1 | 5/2008 | Capelle et al. |
| 2008/0113069 A1 | 5/2008 | Green et al. |
| 2008/0140437 A1 | 6/2008 | Russo et al. |
| 2008/0206404 A1 | 8/2008 | Green et al. |
| 2008/0206426 A1 | 8/2008 | Rousset et al. |
| 2008/0226771 A1 | 9/2008 | Cathenaut et al. |
| 2008/0239867 A1 | 10/2008 | Gilbert |
| 2008/0282723 A1 | 11/2008 | Perrier et al. |
| 2009/0017149 A1 | 1/2009 | Richman |
| 2009/0090254 A1 | 4/2009 | Rusch |
| 2009/0147618 A1 | 6/2009 | Kovacic et al. |
| 2009/0179042 A1 | 7/2009 | Milan et al. |
| 2009/0191318 A1 | 7/2009 | Cocchi et al. |
| 2009/0223386 A1 | 9/2009 | Edwards et al. |
| 2009/0269452 A1 | 10/2009 | Dufort |
| 2009/0291170 A1 | 11/2009 | Roussel et al. |
| 2009/0304866 A1 | 12/2009 | Bovetto et al. |
| 2010/0034937 A1 | 2/2010 | Schmit et al. |
| 2010/0068340 A1 | 3/2010 | Wille et al. |
| 2010/0068354 A1 | 3/2010 | Roberson et al. |
| 2010/0124599 A1 | 5/2010 | Saikali et al. |
| 2010/0132310 A1 | 6/2010 | Dose et al. |
| 2010/0189866 A1 | 7/2010 | Denger |
| 2010/0196551 A1 | 8/2010 | Harlaux-Pasquier et al. |
| 2010/0203202 A1 | 8/2010 | Quessette et al. |
| 2010/0203215 A1 | 8/2010 | Russo |
| 2010/0206220 A1 | 8/2010 | Belzowski et al. |
| 2010/0206875 A1 | 8/2010 | Bratsch |
| 2010/0209562 A1 | 8/2010 | Henriet et al. |
| 2010/0209571 A1 | 8/2010 | Vaghela et al. |
| 2010/0269534 A1 | 10/2010 | Kumakiri et al. |
| 2010/0285178 A1 | 11/2010 | Labbe et al. |
| 2011/0000872 A1 | 1/2011 | Aneas |
| 2011/0003041 A1 | 1/2011 | Garbi et al. |
| 2011/0027427 A1 | 2/2011 | Panyam et al. |
| 2011/0088558 A1 | 4/2011 | Farrel et al. |
| 2011/0217425 A1 | 9/2011 | Puaud et al. |
| 2011/0229608 A1 | 9/2011 | Plessier et al. |
| 2011/0262600 A1 | 10/2011 | McGill |
| 2011/0311703 A1 | 12/2011 | Ummadi et al. |
| 2012/0096875 A1 | 4/2012 | Ravji et al. |
| 2012/0096876 A1 | 4/2012 | Ravji et al. |
| 2012/0100271 A1 | 4/2012 | Leas et al. |
| 2012/0138621 A1 | 6/2012 | Bratsch |
| 2012/0201932 A1 | 8/2012 | Kihnke |
| 2012/0320707 A1 | 12/2012 | Planet et al. |
| 2013/0008321 A1 | 1/2013 | Bravo |
| 2013/0045310 A1 | 2/2013 | Ricco et al. |
| 2013/0052308 A1 | 2/2013 | Palzer et al. |
| 2013/0074535 A1 | 3/2013 | Schmidt |
| 2013/0101702 A1 | 4/2013 | Nalur |
| 2013/0122176 A1 | 5/2013 | Ummadi et al. |
| 2013/0129896 A1 | 5/2013 | Ummadi et al. |
| 2013/0129897 A1 | 5/2013 | Lallemand et al. |
| 2013/0136842 A1 | 5/2013 | Ummadi et al. |
| 2013/0149421 A1 | 6/2013 | Vaghela et al. |
| 2013/0152620 A1 | 6/2013 | Ugolini |
| 2013/0206771 A1 | 8/2013 | Arnold et al. |
| 2013/0216660 A1 | 8/2013 | Green et al. |
| 2013/0236581 A1 | 9/2013 | Mercenier et al. |
| 2013/0259975 A1 | 10/2013 | Schaffer-Lequart et al. |
| 2013/0323393 A1 | 12/2013 | Olmos et al. |
| 2013/0340456 A1 | 12/2013 | Hoare et al. |
| 2014/0000302 A1 | 1/2014 | Cocchi et al. |
| 2014/0004230 A1 | 1/2014 | Ricco et al. |
| 2014/0033969 A1 | 2/2014 | Leas et al. |
| 2014/0065270 A1 | 3/2014 | Huynh-Ba et al. |
| 2014/0083879 A1 | 3/2014 | Ulstad |
| 2014/0099422 A1 | 4/2014 | Panyam et al. |
| 2014/0141147 A1 | 5/2014 | Dopfer et al. |
| 2014/0161940 A1 | 6/2014 | Aviles et al. |
| 2014/0178534 A1 | 6/2014 | Amend et al. |
| 2014/0197195 A1 | 7/2014 | Peuker et al. |
| 2014/0242229 A1 | 8/2014 | Whitehouse |
| 2014/0255558 A1 | 9/2014 | Amend et al. |
| 2014/0272016 A1 | 9/2014 | Nowak |
| 2014/0335232 A1 | 11/2014 | Halachmi |
| 2014/0335255 A1 | 11/2014 | Jung et al. |
| 2014/0370173 A1 | 12/2014 | Gunes et al. |
| 2015/0017286 A1 | 1/2015 | Ural et al. |
| 2015/0064330 A1 | 3/2015 | Ummadi et al. |
| 2015/0099050 A1 | 4/2015 | Ummadi et al. |
| 2015/0128619 A1 | 5/2015 | Wild |
| 2015/0140193 A1 | 5/2015 | Desai et al. |
| 2015/0157040 A1 | 6/2015 | Althaus et al. |
| 2015/0157042 A1 | 6/2015 | Amend et al. |
| 2015/0164106 A1 | 6/2015 | Ricco et al. |
| 2015/0166222 A1 | 6/2015 | Danesin et al. |
| 2015/0201646 A1 | 7/2015 | Olmos et al. |
| 2015/0245638 A1 | 9/2015 | Ummadi et al. |
| 2015/0282502 A1 | 10/2015 | Ummadi et al. |
| 2015/0289538 A1 | 10/2015 | Ummadi et al. |
| 2015/0289540 A1 | 10/2015 | Imer |

(56) References Cited

U.S. PATENT DOCUMENTS

| | | |
|---|---|---|
| 2015/0296831 A1 | 10/2015 | Noth et al. |
| 2015/0296833 A1 | 10/2015 | Ummadi et al. |
| 2015/0327571 A1 | 11/2015 | Amend |
| 2015/0351426 A1 | 12/2015 | Ricco et al. |
| 2015/0351430 A1 | 12/2015 | Pipe et al. |
| 2016/0135479 A1 | 5/2016 | Ummadi et al. |
| 2016/0192675 A1 | 7/2016 | Abu-Ali |
| 2016/0213026 A1 | 7/2016 | Lepagnol et al. |
| 2016/0214787 A1 | 7/2016 | Iotti |
| 2016/0235089 A1 | 8/2016 | Ricco et al. |
| 2016/0255858 A1 | 9/2016 | Noth et al. |
| 2016/0270424 A1 | 9/2016 | Noth et al. |
| 2016/0278401 A1 | 9/2016 | Noth et al. |
| 2016/0309739 A1 | 10/2016 | Chandrsekaran |
| 2016/0309740 A1 | 10/2016 | Bunce et al. |
| 2016/0309741 A1 | 10/2016 | Zhou et al. |
| 2016/0309742 A1 | 10/2016 | Ma et al. |
| 2016/0316778 A1 | 11/2016 | Nagy et al. |
| 2016/0316784 A1 | 11/2016 | Chandrasekaran |
| 2016/0338378 A1 | 11/2016 | Ummadi et al. |
| 2016/0347525 A1 | 12/2016 | Butscher et al. |
| 2017/0000162 A1 | 1/2017 | Lallemand et al. |
| 2017/0042182 A1 | 2/2017 | Olmos et al. |
| 2017/0042183 A1 | 2/2017 | Puaud et al. |
| 2017/0042184 A1 | 2/2017 | Olmos et al. |
| 2017/0079305 A1 | 3/2017 | Barniol Gutierrez et al. |
| 2017/0183210 A1 | 6/2017 | Wyatt et al. |
| 2017/0188600 A1 | 7/2017 | Scharfman et al. |
| 2017/0215456 A1 | 8/2017 | Noth et al. |
| 2017/0217648 A1 | 8/2017 | Bouzaid et al. |
| 2017/0225879 A1 | 8/2017 | Stein et al. |
| 2017/0265495 A1 | 9/2017 | Amend |
| 2017/0275086 A1 | 9/2017 | Perentes et al. |
| 2017/0275088 A1 | 9/2017 | Bouzaid et al. |
| 2017/0280745 A1 | 10/2017 | Herbert et al. |
| 2017/0318833 A1 | 11/2017 | Curschellas et al. |
| 2017/0318995 A1 | 11/2017 | Rai |
| 2017/0326749 A1 | 11/2017 | Amend |
| 2017/0332656 A1 | 11/2017 | Amend |
| 2017/0339976 A1 | 11/2017 | Amend |
| 2017/0360061 A1 | 12/2017 | Fonte |
| 2017/0367371 A1 | 12/2017 | Lebleu et al. |
| 2018/0008087 A1 | 1/2018 | Miller et al. |
| 2018/0042258 A1 | 2/2018 | Roberts et al. |
| 2018/0042279 A1 | 2/2018 | Kerler et al. |
| 2018/0064127 A1 | 3/2018 | Chisholm et al. |
| 2018/0064131 A1 | 3/2018 | Noth |
| 2018/0064132 A1 | 3/2018 | Noth |
| 2018/0084800 A1 | 3/2018 | Noth |
| 2018/0092378 A1 | 4/2018 | Webering et al. |
| 2018/0141011 A1 | 5/2018 | Mou |
| 2018/0146695 A1 | 5/2018 | Amend et al. |
| 2018/0146699 A1 | 5/2018 | Vafeiadi et al. |
| 2018/0177545 A1 | 6/2018 | Boudreaux et al. |
| 2018/0199760 A1 | 7/2018 | Rai |
| 2018/0213816 A1 | 8/2018 | Amend |
| 2018/0263274 A1 | 9/2018 | Ray et al. |
| 2018/0271115 A1 | 9/2018 | Ray et al. |
| 2019/0021548 A1 | 1/2019 | Eisner |
| 2019/0029248 A1 | 1/2019 | Cutting |
| 2019/0053513 A1 | 2/2019 | Halachmi |
| 2019/0053514 A1 | 2/2019 | Fonte et al. |
| 2019/0239534 A1 | 8/2019 | Halachmi |
| 2019/0254307 A1 | 8/2019 | Noth et al. |
| 2019/0269148 A1 | 9/2019 | Bouzaid et al. |
| 2019/0270555 A1 | 9/2019 | Noth et al. |
| 2019/0291947 A1 | 9/2019 | Kruger |
| 2019/0320679 A1 | 10/2019 | Halachmi |
| 2019/0325182 A1 | 10/2019 | Noth et al. |
| 2019/0329948 A1 | 10/2019 | Ritzenhoff et al. |
| 2019/0344955 A1 | 11/2019 | Fonte |
| 2019/0357564 A1 | 11/2019 | Yang et al. |
| 2020/0055664 A1 | 2/2020 | Fonte et al. |
| 2020/0056814 A1 | 2/2020 | Fonte et al. |
| 2020/0056835 A1 | 2/2020 | Fonte et al. |
| 2020/0146311 A1 | 5/2020 | Halachmi |
| 2020/0292212 A1 | 9/2020 | Fonte et al. |
| 2020/0292229 A1 | 9/2020 | Fonte et al. |
| 2020/0315206 A1 | 10/2020 | Fonte |
| 2020/0326124 A1 | 10/2020 | Fonte et al. |
| 2020/0333056 A1 | 10/2020 | Ito et al. |
| 2021/0002066 A1 | 1/2021 | Fonte |
| 2021/0002067 A1 | 1/2021 | Fonte |
| 2021/0003342 A1 | 1/2021 | Fonte et al. |
| 2021/0007370 A1 | 1/2021 | Fonte |
| 2021/0032015 A1 | 2/2021 | Fonte |
| 2021/0084930 A1 | 3/2021 | Fonte |
| 2021/0127706 A1 | 5/2021 | Fonte |
| 2021/0130083 A1 | 5/2021 | Fonte et al. |
| 2021/0212337 A1 | 7/2021 | Fonte et al. |
| 2021/0212338 A1 | 7/2021 | Fonte et al. |

FOREIGN PATENT DOCUMENTS

| | | |
|---|---|---|
| EP | 1009678 | 6/2000 |
| EP | 1139837 | 10/2001 |
| EP | 1415543 | 5/2004 |
| EP | 1907300 | 4/2008 |
| EP | 2266418 | 12/2010 |
| EP | 2281464 | 2/2011 |
| EP | 2679100 | 1/2014 |
| EP | 2775855 | 9/2014 |
| EP | 3044125 | 7/2016 |
| EP | 3160870 | 5/2017 |
| FR | 2501080 | 9/1982 |
| JP | H11507295 A | 6/1999 |
| JP | 2002/068304 A | 3/2002 |
| JP | 2005/318869 | 11/2005 |
| WO | WO 1996/001224 | 1/1996 |
| WO | WO 2004/054380 | 7/2004 |
| WO | WO 2010/103483 | 9/2010 |
| WO | WO 2013/121421 | 8/2013 |
| WO | WO 2015/063092 | 5/2015 |
| WO | WO 2015/063094 | 5/2015 |
| WO | WO 2015/077825 | 6/2015 |
| WO | WO 2016/079641 | 5/2016 |
| WO | WO 2016/081477 | 5/2016 |
| WO | WO 2017/087970 | 5/2017 |
| WO | WO 2017/139395 | 8/2017 |
| WO | WO 2017/176580 | 10/2017 |
| WO | WO 2017/214357 | 12/2017 |
| WO | WO 2018/109765 | 6/2018 |
| WO | WO 2019/140251 | 7/2019 |
| WO | WO 2020/039439 | 2/2020 |
| WO | WO 2020/053859 | 3/2020 |
| WO | WO 2020/089919 | 5/2020 |
| WO | WO 2020/163369 | 8/2020 |

OTHER PUBLICATIONS

Allpax, "Shaka Retorts 1300 and 1600," 2020, retrieved Apr. 16, 2020 from URL <https://www.allpax.com/products/production-shaka-retorts/>, 4 pages.

Arellano et al., "Online ice crystal size measurements during sorbet freezing by means of the focused beam reflectance measurement (FBRM) technology," Influence of Operating Conditions, Journal of Food Engineering, Nov. 1, 2012, 1;113(2):351-9.

Caldwell et al., "A low-temperature scanning electron microscopy study of ice cream. II. Influence of selected ingredients and processes," Food Structure, 1992;11(1):2, 10 pages.

Cook et al., "Mechanisms of Ice Crystallization in Ice Cream production," Comprehensive Reviews in Food Science and Food safety, Mar. 2010, 9(2):213-22.

Design Integrated Technology, "Propellant Equipment Used by Arsenals Worldwide," 2016, retrieved on Apr. 16, 2020 from URL <https://www.ditusa.com/sc_helicone_mixers.php>, 3 pages.

Drewett et al., "Ice crystallization in a scraped surface freezer," Journal of Food Engineering, Feb. 1, 2007, 78(3):1060-6.

EP Extended Search Report in European Appln. No. 17814210.5, dated Jan. 24, 2020, pp. 1-3 of 12 pages.

(56) References Cited

OTHER PUBLICATIONS

Gonzalez-Ramirez et al., "Moments model for a continuous sorbet crystallization process," The 23rd IIR International Congress of Refrigeration, Refrigeration for Sustainable Development, Prague, Czech Republic, Aug. 2011, 21-6.

Hagiwara et al., "Effect of sweetener, stabilizer, and storage temperature on ice recrystallization in ice cream," Journal of Dairy Science, May 1, 1996, 79(5):735-44.

Ice Cream Science, "How Long Does Homemade Ice Cream Last in the Freezer," Jun. 3, 2016, retrieved Apr. 16, 2020 form URL <http://icecreamscience.com/long-ice-cream-last-freezer/>, 18 pages.

Ice Cream Science, "Ice Crystals in Ice Cream," Oct. 20, 2016, retrieved on Apr. 16, 2020 from URL <http://icecreamscience.com/ice-crystals-in-ice-cream/>, 18 pages.

Inoue et al., "Modeling of the effect of freezer conditions on the principal constituent parameters of ice cream by using response surface methodology," Journal of Dairy Science, May 1, 2008, 91(5):1722-32.

JP Office Action in Japanese Appln. No. 2019-518176, dated Jan. 6, 2021, 8 pages (with English translation).

PCT Authorized Officer Gwenaelle Llorca, European Patent Office, International Application No. PCT/US2019/013286, "Invitation to Pay Additional Fees and, Where Applicable, Protest Fee", International Searching Authority, Apr. 4, 2019, pp. 1-16 of 19 pages.

PCT International Preliminary Report on Patentability in International Appln. No. PCT/US2019/046946, dated Feb. 23, 2021, 16 pages.

PCT International Preliminary Report on Patentability in International Appln. No. PCT/US2019/046954, dated Feb. 23, 2021, 14 pages.

PCT International Preliminary Report on Patentability in International Appln. No. PCT/US2019/046958, dated Feb. 23, 2021, 17 pages.

PCT International Report on Patentability in International Appln. No. PCT/2019/013286, dated Jul. 23, 2020, 16 pages.

PCT International Search Report and Written Opinion in International Appln. No. PCT/US17/37972, dated October 27, 2017, 16 pages.

PCT International Search Report and Written Opinion in International Appln. No. PCT/US19/13286, dated May 31, 2019, 21 pages.

PCT International Search Report and Written Opinion in International Appln. No. PCT/US2019/013286, dated Jan. 11, 2019, 21 pages.

PCT International Search Report and Written Opinion in International Appln. No. PCT/US2019/046946, dated Jan. 24, 2020, 24 pages.

PCT International Search Report and Written Opinion in International Appln. No. PCT/US2019/046954, dated Nov. 21, 2019, 20 pages.

PCT International Search Report and Written Opinion in International Appln. No. PCT/US2020/051664, dated Dec. 17, 2020, 44 pages.

PCT International Search Report and Written Opinion in International Appln. No. PCT/US2021/013619, dated Jun. 2, 2021, 15 pages.

PCT Invitation to Pay Additional Fees in International Appln. No. PCT/US2019/046946, dated Dec. 2, 2019, 19 pages.

Reichart, "Speed of Dasher and Scraper as Affecting the Quality of Ice Cream and Sherbet," Journal of Dairy Science, Mar. 1, 1931, 14(2):107-15.

Shaka Process, "Higher Quality Ambient Foods," 2018, retrieved Apr. 16, 2020 from URL <http://shakaprocess.com/>, 2 pages.

Tetra Pak Homogenizers, "Ice Cream Homogenization for Sounds Performance," 2014, retrieved Apr. 16, 2020 from URL <https://assets.tetrapak.com/static/documents/tetra_pak_homogenizers_br_63880_low.pdf>, 4 pages.

U.S. Notice of Allowance in U.S. Appl. No. 16/592,031, dated Jan. 10, 2020, 8 pages.

Waste Management Inc. et al "Tip: Aluminum Trays and Pans Are Recyclable," Nov. 2016 pp. 1-2 https://www.stocktonrecycles.conn/alunninunn-trays-pans-recyclable/.

Xiao-Wim, "This New Kitchen Gadget Makes Fro-Yo in Minutes", by Bloomberg, Aug. 8, 2017, 4 pages, http://fortune.com/2017/08/08/wim-frozen-yogurt-minutes/ Oct. 12, 2018.

U.S. Appl. No. 15/625,690.
U.S. Appl. No. 16/518,045.
U.S. Appl. No. 17/025,806.
U.S. Appl. No. 17/025,813.
U.S. Appl. No. 16/104,758.
U.S. Appl. No. 16/360,220.
U.S. Appl. No. 16/588,086.
U.S. Appl. No. 16/889,328.
U.S. Appl. No. 16/459,388.
U.S. Appl. No. 16/892,062.
U.S. Appl. No. 16/459,176.
U.S. Appl. No. 16/824,483.
U.S. Appl. No. 16/459,322.
U.S. Appl. No. 16/592,031.
U.S. Appl. No. 16/591,975.
U.S. Appl. No. 16/824,616.
U.S. Appl. No. 17/001,170.
U.S. Appl. No. 17/028,650.
U.S. Appl. No. 17/031,425.
U.S. Appl. No. 17/122,757.
U.S. Appl. No. 17/061,981.
U.S. Appl. No. 17/026,090.
U.S. Appl. No. 17/061,986.
U.S. Appl. No. 17/124,296.
U.S. Appl. No. 17/335,891.
U.S. Appl. No. 17/403,393.
U.S. Appl. No. 17/403,424.

EP European Office Action by European Appln. No. 19762064.4, dated Oct. 25, 2021, 10 pages.

EP European Search Report in European Appln. No. 21181499.1, dated Nov. 3, 2021, 14 pages.

PCT International Search Report and Written Opinion in International Appln. No. PCT/US2021/035260, dated Oct. 1, 2021, 18 pages.

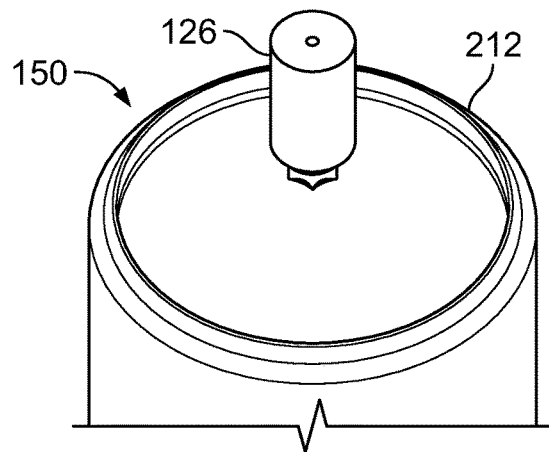
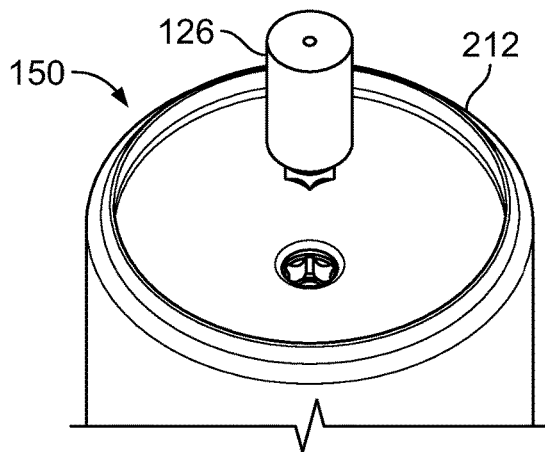
FIG. 7A  FIG. 7B
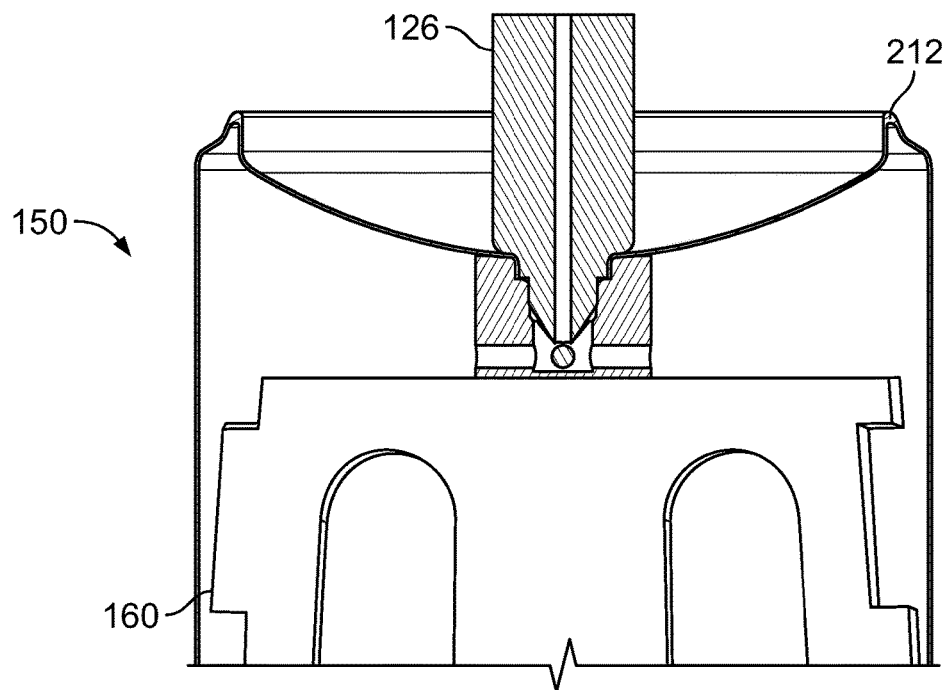
FIG. 7C

RAPIDLY COOLING FOOD AND DRINKS

RELATED APPLICATIONS

This patent application is a continuation of patent application U.S. Ser. No. 17/031,425, filed on Sep. 24, 2020, which is a continuation of patent application U.S. Ser. No. 16/824,483, filed Mar. 19, 2020, now U.S. Pat. No. 10,830,529, which is a continuation of patent application U.S. Ser. No. 16/459,176, filed Jul. 1, 2019, now U.S. Pat. No. 10,612,835, which claims the benefit of continuation-in part patent application U.S. Ser. No. 16/104,758, filed on Aug. 17, 2018, now U.S. Pat. No. 10,334,868, and claims the benefit of provisional patent applications U.S. Ser. No. 62/758,110, filed on Nov. 9, 2018; U.S. Ser. No. 62/801,587, filed on Feb. 5, 2019; U.S. Ser. No. 62/831,657, filed on Apr. 9, 2019; U.S. Ser. No. 62/831,600, filed on Apr. 9, 2019; U.S. Ser. No. 62/831,646, filed on Apr. 9, 2019; and U.S. Ser. No. 62/831,666, filed on Apr. 9, 2019, all of which are hereby incorporated herein by reference in their entirety.

TECHNICAL FIELD

This disclosure relates to systems and methods for rapidly cooling food and drinks.

BACKGROUND

Beverage brewing system have been developed that rapidly prepare single servings of hot beverages. Some of these brewing systems rely on single use pods to which water is added before brewing occurs. The pods can be used to prepare hot coffees, teas, and cocoas.

Home use ice cream makers can be used to make larger batches (e.g., 1.5 quarts or more) of ice cream for personal consumption. These ice cream maker appliances typically prepare the mixture by employing a hand-crank method or by employing an electric motor that is used, in turn, to assist in churning the ingredients within the appliance. The resulting preparation is often chilled using a pre-cooled vessel that is inserted into the machine.

SUMMARY

This specification describes systems and methods for rapidly cooling food and drinks. Some of these systems and methods can cool food and drinks in a container inserted into a counter-top or installed machine from room temperature to freezing in less than two minutes. For example, the approach described in this specification has successfully demonstrated the ability make soft-serve ice cream from room-temperature pods in approximately 90 seconds. This approach has also been used to chill cocktails and other drinks including to produce frozen drinks. These systems and methods are based on a refrigeration cycle with low startup times and a pod-machine interface that is easy to use and provides extremely efficient heat transfer. Some of the pods described are filled with ingredients in a manufacturing line and subjected to a sterilization process (e.g., retort, aseptic packaging, ultra-high temperature processing (UHT), ultra-heat treatment, ultra-pasteurization, or high pressure processing (HPP)). HPP is a cold pasteurization technique by which products, already sealed in its final package, are introduced into a vessel and subjected to a high level of isostatic pressure (300-600 megapascals (MPa) (43,500-87,000 pounds per square inch (psi)) transmitted by water. The pods can be used to store ingredients including, for example, dairy products at room temperature for long periods of time (e.g., 9-12 months) following sterilization.

Cooling is used to indicate the transfer of thermal energy to reduce the temperature, for example, of ingredients contained in a pod. In some cases, cooling indicates the transfer of thermal energy to reduce the temperature, for example, of ingredients contained in a pod to below freezing.

Some machines for reducing the temperature of ingredients in a pod containing the ingredients and a mixing paddle include: a housing; an evaporator of a refrigeration system, the evaporator defining a receptacle sized to receive the pod; a motor disposed in the housing, the motor operable to move the mixing paddle of a pod in the receptacle; and a driveshaft operable to pierce through a wall of the pod and engage the mixing paddle and rotate the mixing paddle.

Some machines for reducing the temperature of ingredients in a pod containing the ingredients and a mixing paddle include: a housing; an evaporator of a refrigeration system, the evaporator defining a receptacle sized to receive the pod; a driveshaft configured to pierce thru the pod and engage the mixing paddle; a motor disposed in the housing, the motor operable to move driveshaft and the mixing paddle of a pod in the receptacle; and a dispenser configured to engage with the pod inserted into the evaporator to open the pod to allow the cooled food or drink to be dispensed from the pod.

Some machines for reducing the temperature of ingredients in a pod containing the ingredients and a mixing paddle include: a housing with a second base; an evaporator of a refrigeration system, the evaporator defining a receptacle with an opening oriented towards the second base, the opening sized to receive the pod, the evaporator fixed in position relative to the housing; a lid sized to close the opening of the receptacle, the lid movable between a first position spaced apart from the evaporator towards the second base of the housing and a second position engaging the evaporator and closing the opening; and a motor disposed in the housing, the motor operable to move the mixing paddle of a pod in the receptacle.

Some machines for reducing the temperature of ingredients in pods containing the ingredients and a mixing paddle include: a housing; a condenser of a refrigeration system; a plurality of evaporators of the refrigeration system fluidly connected in series with the condenser, each evaporator defining a receptacle sized to receive a pod and having an open position and a closed position; and a motor disposed in the housing, the motor operable to move the mixing paddle of a pod in a receptacle of one of the evaporators. In some cases, the plurality of evaporators of the refrigeration system are fluidly connected in series with the condenser.

Some machines for reducing the temperature of ingredients in a pod containing the ingredients and a mixing paddle include: a housing; an evaporator of a refrigeration system, the evaporator defining a receptacle sized to receive the pod, the evaporator having a clamshell configuration with a first portion of the evaporator attached to a second portion of the evaporator by a hinge, the evaporator having an open position and a closed position; and a motor disposed in the housing, the motor operable to move the mixing paddle of a pod in the receptacle when the evaporator is in the closed position.

Embodiments of these machines and include one or more of the following features.

In some embodiments, the driveshaft is mechanically coupled to the motor and extends into the receptacle when the evaporator is in a closed position. In some cases, the driveshaft has a barbed end.

In some embodiments, the evaporator is fixed in position relative to the housing. In some cases, machines also include a lid with a first position covering the receptacle and a second position exposing the receptacle. In some cases, the driveshaft which extends into the receptacle when the lid is in its first position. In some cases, machines also include a handle mechanically coupled to the lid, the handle having a first position corresponding to the open position of the lid and a second position corresponding to the closed position of the lid. In some cases, the handle is mechanically coupled to the driveshaft such that movement of the handle from its first position to its second position forces the driveshaft into the receptacle.

In some embodiments, machines also include a dispenser configured to engage with the pod inserted into the evaporator to open the pod to allow the cooled food or drink to be dispensed from the pod. In some cases, the dispenser comprises a rotatable member configured to engage a cap of the pod. In some cases, the rotatable member is an annular member. In some cases, the rotatable member comprises protrusions extending towards the receptacle to engage the cap of the pod. In some cases, machines also include a worm gear engaged to the rotatable member. In some cases, machines also include a reader operable identify pods inserted in the machine based on labels on the pods. In some cases, the labels are UPC bar code tags, RFID tags, or QR code tags. In some cases, machines also include a controller which selects specific cooling and mixing algorithms based on the labels. In some cases, machines also include a communication module capable of transmitting information about identified pods to a network.

In some embodiments, machines also include a stem mechanically coupled to the motor, the stem extending into the receptacle when the evaporator is in the closed position. 14. In some cases, the stem has a barbed end adjacent threads defined in an exterior surface of the stem. In some cases, the evaporator is fixed in position relative to the housing. In some cases, machines also include a lid with a first position covering the receptacle and a second position exposing the receptacle. In some cases, machines also include a driveshaft which extends into the receptacle when the lid is in its first position. In some cases, the evaporator is movable relative to the housing between a first position in which the housing covers the receptacle and a second position in which the receptacle is exposed.

In some embodiments, the evaporator has a clamshell configuration with a first portion of the evaporator hingably attached to a second portion of the evaporator. In some cases, a living hinge attaches the first portion of the evaporator to the second portion of the evaporator. In some cases, a working fluid channel extends through the first portion of the evaporator to the living hinge to the second portion of the evaporator.

In some embodiments, machines also include an evaporator that has a clamshell configuration with a first portion of the evaporator attached to a second portion of the evaporator by a hinge. In some cases, the first portion of the evaporator defines a channel for working fluid extending from an inlet adjacent the hinge to an outlet opposite the hinge and the second portion of the evaporator defines a channel for working fluid extending from an inlet opposite the hinge to an outlet adjacent the hinge. In some cases, machines also include a lid covering the receptacle when the evaporator is in the closed position and the lid has projections extending toward the evaporator that engage the first and second portions of the evaporator and bias the first and second portions of the evaporator towards each other when the evaporator is in the closed position. In some cases, the first portion of the evaporator comprises multiple channels for working fluid extending generally parallel to an axis of the evaporator. In some cases, the first portion of the evaporator comprises a cap provides a fluid connection between ends of pairs of adjacent channels.

Some systems for reducing the temperature of ingredients in a pod containing the ingredients and a mixing paddle include: an evaporator disposed in a door of a refrigerator or freezer and in fluid communication with a condenser of the refrigerator or freezer, the evaporator defining a receptacle sized to receive the pod, and the evaporator having an open position and a closed position; and a motor operable to move the mixing paddle of a pod in the receptacle when the evaporator is in the closed position. Embodiments of these systems can include one or more of the features described above with respect to machines for reducing the temperature of ingredients in a pod. Embodiments of these systems can include one or more of the following features.

In some embodiments, the evaporator displaceable relative to the door.

In some embodiments, the motor is disposed in the door of the refrigerator.

In some embodiments, the evaporator is rotatable about a hinge attached to the door. In some cases, systems also include a resilient member that biases a pod in the receptacle away from sides of the receptacle when the evaporator is in the open position. In some cases, the evaporator has a clamshell configuration with a first portion of the evaporator hingably attached to a second portion of the evaporator.

The systems and methods described in this specification can provide a number of advantages. Some embodiments of these systems and methods can provide single servings of cooled food or drink. This approach can help consumers with portion control. Some embodiments of these systems and methods can provide consumers the ability to choose their single-serving flavors, for example, of soft serve ice cream. Some embodiments of these systems and methods incorporate shelf-stable pods that do not require pre-cooling, pre-freezing or other preparation. Some embodiments of these systems and methods can generate frozen food or drinks from room-temperature pods in less than two minutes (in some cases, less than one minute). Some embodiments of these systems and methods do not require post-processing clean up once the cooled or frozen food or drink is generated. Some embodiments of these systems and methods utilize aluminum pods that are recyclable.

For ease of description, terms such as "upward", "downward" "left" and "right" are relative to the orientation of system components in the figures rather than implying an absolute direction. For example, movement of a driveshaft described as vertically upwards or downwards relative to the orientation of the illustrated system. However, the translational motion of such a driveshaft depends on the orientation of the system and is not necessarily vertical.

The details of one or more embodiments of these systems and methods are set forth in the accompanying drawings and the description below. Other features, objects, and advantages of these systems and methods will be apparent from the description and drawings, and from the claims.

DESCRIPTION OF FIGURES

FIGS. 7A and 7B are perspective views of a pod and an associated driveshaft. FIG. 7C is a cross-sectional view of a portion of the pod with the driveshaft 126 engaged with a mixing paddle in the pod.

Like reference symbols in the various drawings indicate like elements.

DETAILED DESCRIPTION

This specification describes systems and methods for rapidly cooling food and drinks. Some of these systems and methods use a counter-top or installed machine to cool food and drinks in a container from room temperature to freezing in less than two minutes. For example, the approach described in this specification has successfully demonstrated the ability make soft-serve ice cream, frozen coffees, frozen smoothies, and frozen cocktails, from room temperature pods in approximately 90 seconds. This approach can also be used to chill cocktails, create frozen smoothies, frozen protein and other functional beverage shakes (e.g., collagen-based, energy, plant-based, non-dairy, and CBD shakes), frozen coffee drinks and chilled coffee drinks with and without nitrogen in them, create hard ice cream, create milk shakes, create frozen yogurt and chilled probiotic drinks. These systems and methods are based on a refrigeration cycle with low startup times and a pod-machine interface that is easy to use and provides extremely efficient heat transfer. Some of the pods described can be sterilized (e.g., using retort sterilization) and used to store ingredients including, for example, dairy products at room temperature for up to 18 months.

Figure 1A:
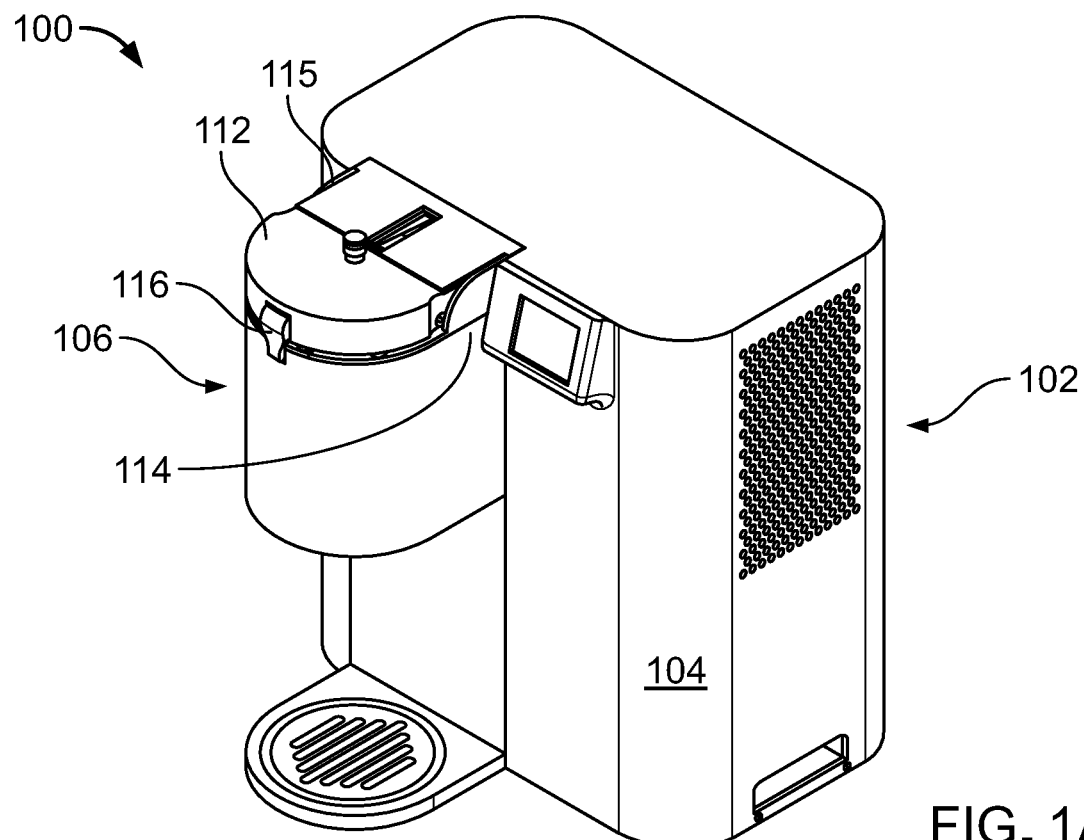
FIG. 1A is a perspective view of a machine for rapidly cooling food and drinks.
Figure 1B:
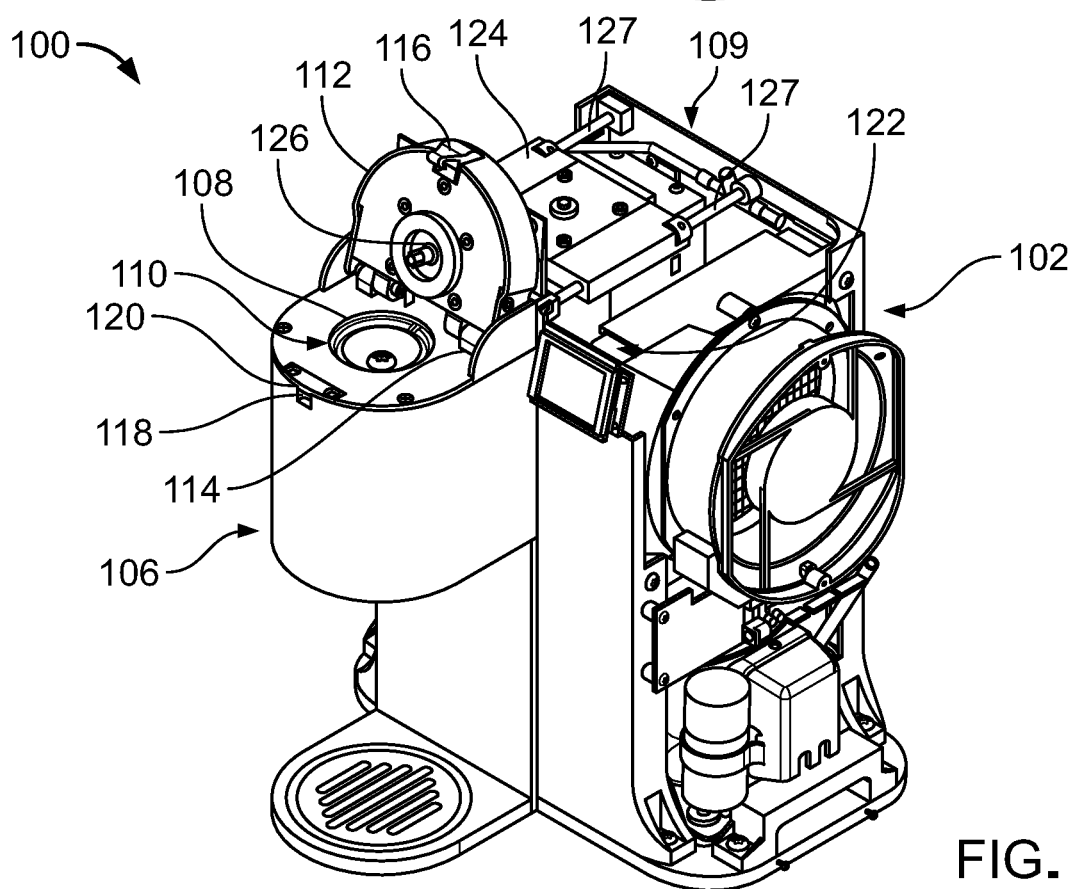
FIG. 1B shows the machine without its housing.

FIG. 1A is a perspective view of a machine 100 for cooling food or drinks. FIG. 1B shows the machine without its housing. The machine 100 reduces the temperature of ingredients in a pod containing the ingredients. Most pods include a mixing paddle used to mix the ingredients before dispensing the cooled or frozen products. The machine 100 includes a body 102 that includes a compressor, a condenser, a fan, an evaporator, capillary tubes, a control system, a lid system and a dispensing system with a housing 104 and a pod-machine interface 106. The pod-machine interface 106 includes an evaporator 108 of a refrigeration system 109 whose other components are disposed inside the housing 104. As shown on FIG. 1B, the evaporator 108 defines a receptacle 110 sized to receive a pod.

A lid 112 is attached to the housing 104 via a hinge 114. The lid 112 can rotate between a closed position covering the receptacle 110 (FIG. 1A) and an open position exposing the receptacle 110 (FIG. 1B). In its closed position, the lid 112 covers the receptacle 110 and is locked in place. In the machine 100, a latch 116 on the lid 112 engages with a latch recess 118 on the pod-machine interface 106. A latch sensor 120 is disposed in the latch recess 118 to determine if the latch 116 is engaged with the latch recess 118. A processor 122 is electronically connected to the latch sensor 120 and recognizes that the lid 112 is closed when the latch sensor 120 determines that the latch 116 and the latch recess 118 are engaged. Not all machines include latch sensors.

An auxiliary cover 115 rotates upward as the lid 112 is moved from its closed position to its open position. A slot in the auxiliary cover 115 receives a handle of the lid 112 during this movement. Some auxiliary covers slide into the housing when the lid moves into the open position.

In the machine 100, the evaporator 108 is fixed in position with respect to the body 102 of the machine 100 and access to the receptacle 110 is provided by movement of the lid 112. In some machines, the evaporator 108 is displaceable relative to the body 102 and movement of the evaporator 108 provides access to the receptacle 110.

A motor 124 disposed in the housing 104 is mechanically connected to a driveshaft 126 that extends from the lid 112. When the lid 112 is in its closed position, the driveshaft 126 extends into the receptacle 110 and, if a pod is present, engages with the pod to move a paddle or paddles within the pod. The processor 122 is in electronic communication with the motor 124 and controls operation of the motor 124. In some machines, the shaft associated with the paddle(s) of the pod extends outward from the pod and the lid 112 has a rotating receptacle (instead of the driveshaft 126) mechanically connected to the motor 124.

Figure 1C:
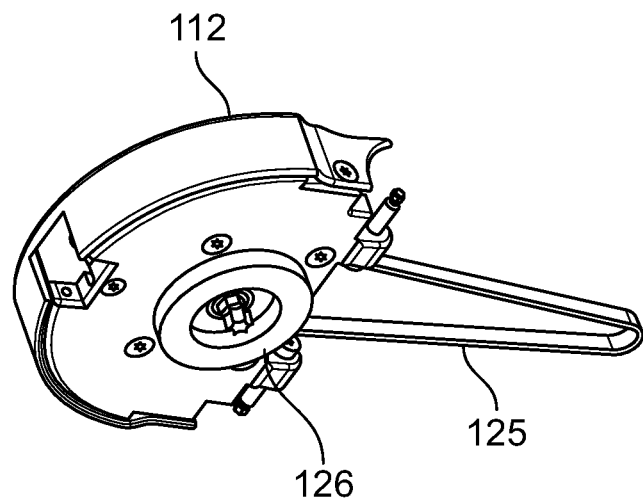
FIG. 1C is a perspective view of a portion of the machine of FIG. 1A.

FIG. 1C is perspective view of the lid 112 shown separately so the belt 125 that extends from motor 124 to the driveshaft 126 is visible. Referring again to FIG. 1B, the motor 124 is mounted on a plate that runs along rails 127. The plate can move approximately 0.25 inches to adjust the tension on the belt 125. During assembly, the plate slides along the rails. Springs disposed between the plate and the lid 112 bias the lid 112 away from the plate to maintain tension in the belt.

Figure 2A:
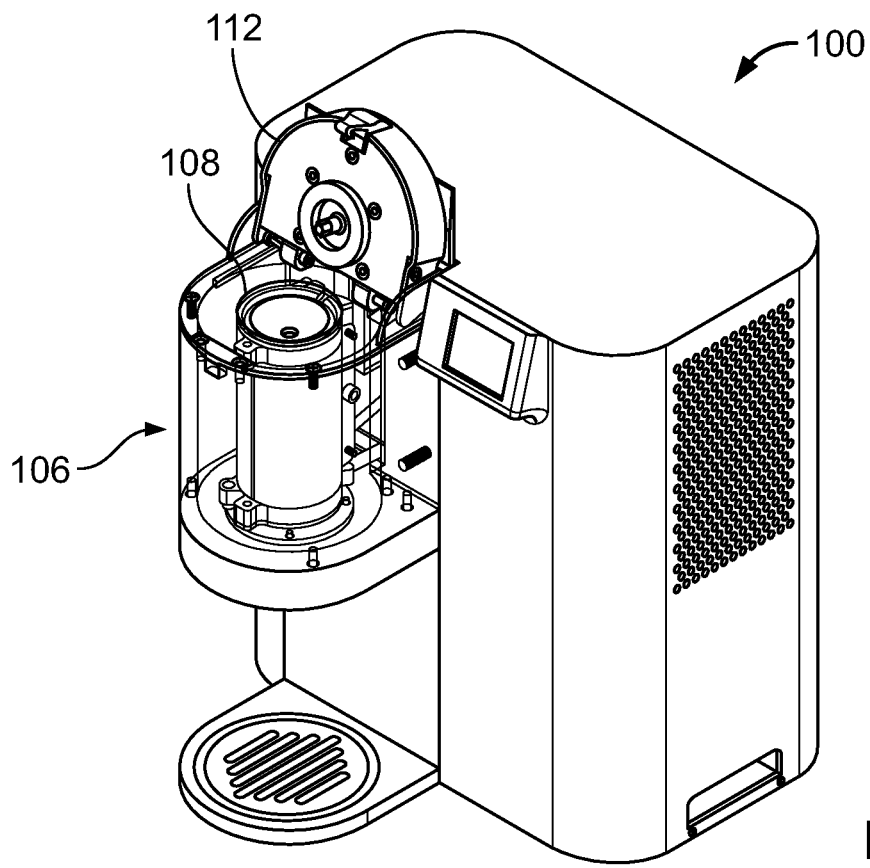
FIG. 2A is perspective view of the machine of FIG. 1A with the cover of the pod-machine interface illustrated as being transparent to allow a more detailed view of the evaporator to be seen.
Figure 2B:
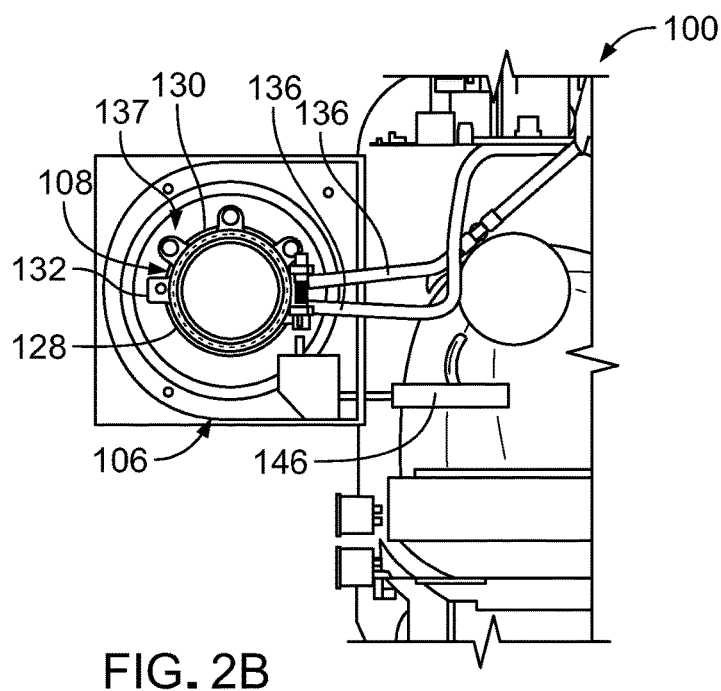
FIG. 2B is a top view of a portion of the machine without the housing and the pod-machine interface without the lid.
Figure 2C:
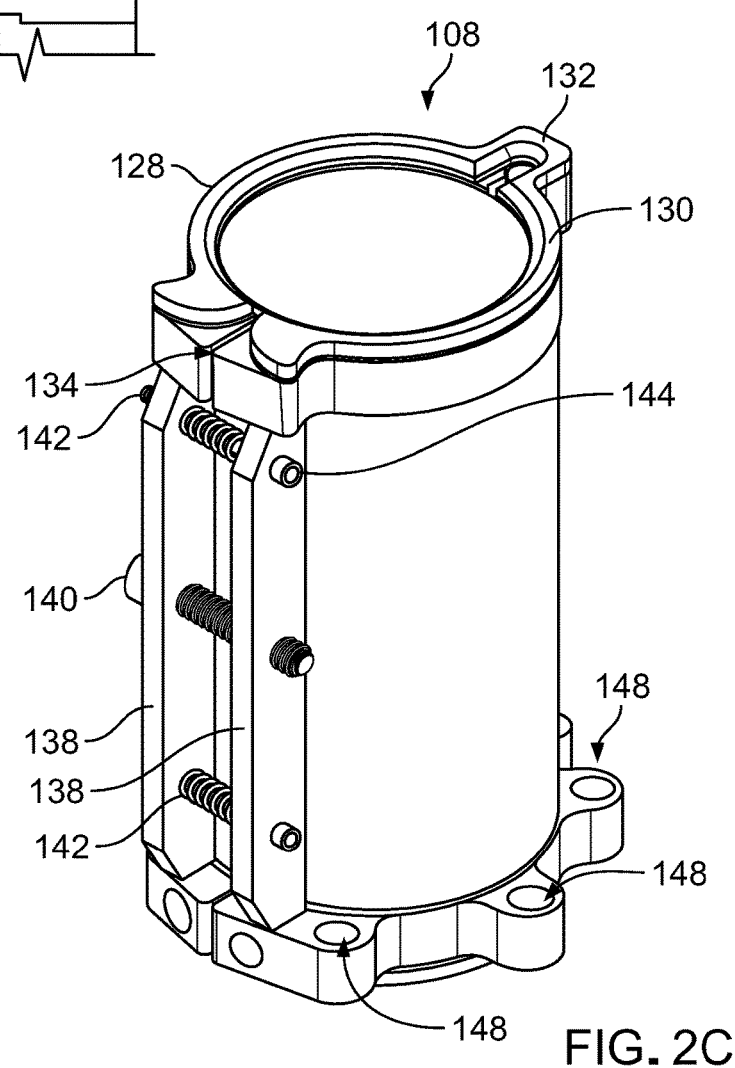
FIGS. 2C and 2D are, respectively, a perspective view and a side view of the evaporator.
Figure 2D:
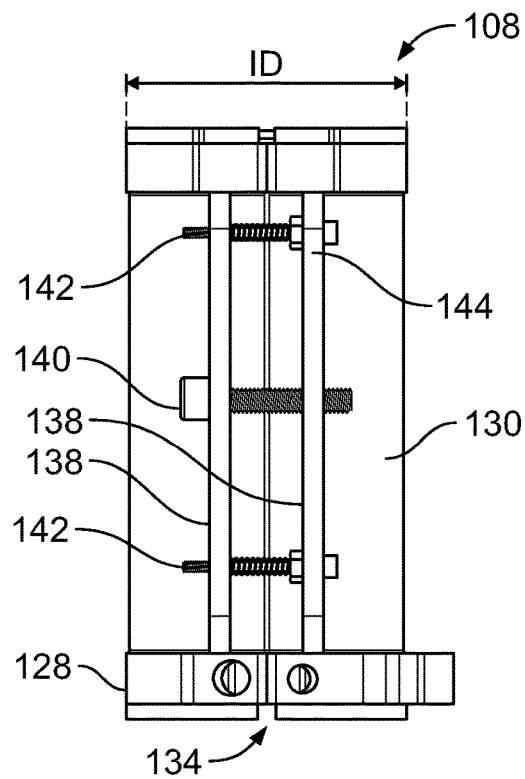

FIG. 2A is a perspective view of the machine 100 with the cover of the pod-machine interface 106 illustrated as being transparent to allow a more detailed view of the evaporator 108 to be seen. FIG. 2B is a top view of a portion of the machine 100 without housing 104 and the pod-machine interface 106 without the lid 112. FIGS. 2C and 2D are, respectively, a perspective view and a side view of the evaporator 108. The evaporator 108 is described in more detail in U.S. patent application Ser. No. 16/459,388 filed contemporaneously with this application and incorporated herein by reference in its entirety.

The evaporator 108 has a clamshell configuration with a first portion 128 attached to a second portion 130 by a living hinge 132 on one side and separated by a gap 134 on the other side. Refrigerant flows to the evaporator 108 from other components of the refrigeration system through fluid channels 136 (best seen on FIG. 2B). The refrigerant flows through the evaporator 108 in internal channels through the first portion 128, the living hinge 132, and the second portion 130.

The space 137 (best seen on FIG. 2B) between the outer wall of the evaporator 108 and the inner wall of the casing of the pod-machine interface 106 is filled with an insulating material to reduce heat exchange between the environment and the evaporator 108. In the machine 100, the space 137 is filled with an aerogel (not shown). Some machines use other insulating material, for example, an annulus (such as an airspace), insulating foams made of various polymers, or fiberglass wool.

The evaporator 108 has an open position and a closed position. In the open position, the gap 134 opens to provide an air gap between the first portion 128 and the second portion 130. In the machine 100, the first portion 128 and the second portion 130 are pressed together in the closed position. In some machines, the first and second portion are pressed towards each other and the gap is reduced, but still defined by a space between the first and second portions in the closed position.

The inner diameter ID of the evaporator 108 is slightly larger in the open position than in the closed position. Pods can inserted into and removed from the evaporator 108 while the evaporator is in its open position. Transitioning the evaporator 108 from its open position to its closed position after a pod is inserted tightens the evaporator 108 around the outer diameter of the pod. For example, the machine 100 is configured to use pods with 2.085" outer diameter. The evaporator 108 has an inner diameter of 2.115" in the open position and an inner diameter inner diameter of 2.085" in the closed position. Some machines have evaporators sized and configured to cool other pods. The pods can be formed from commercially available can sizes, for example, "slim" cans with diameters ranging from 2.080 inches-2.090 inches and volumes of 180 milliliters (ml)-300 ml, "sleek" cans with diameters ranging from 2.250 inches-2.400 inches and volumes of 180 ml-400 ml and "standard" size cans with diameters ranging from 2.500 inches-2.600 inches and volumes of 200 ml-500 ml. The machine 100 is configured to use pods with 2.085 inches outer diameter. The evaporator 108 has an inner diameter of 2.115 inches in its open position and an inner diameter inner diameter of 2.085 inches in its closed position. Some machines have evaporators sized and configured to cool other pods.

The closed position of evaporator 108 improves heat transfer between inserted pod 150 and the evaporator 108 by increasing the contact area between the pod 150 and the evaporator 108 and reducing or eliminating an air gap between the wall of the pod 150 and the evaporator 108. In some pods, the pressure applied to the pod by the evaporator 108 is opposed by the mixing paddles, pressurized gases within the pod, or both to maintain the casing shape of the pod.

In the evaporator 108, the relative position of the first portion 128 and the second portion 130 and the size of the gap 134 between them is controlled by two bars 138 connected by a bolt 140 and two springs 142. Each of the bars 138 has a threaded central hole through which the bolt 140 extends and two end holes engaging the pins 144. Each of the two springs 142 is disposed around a pin 144 that extends between the bars 138. Some machines use other systems to control the size of the gap 134, for example, circumferential cable systems with cables that extend around the outer diameter of the evaporator 108 with the cable being tightened to close the evaporator 108 and loosened to open the evaporator 108. In other evaporators, there are a plurality of bolts and end holes, one or more than two springs, and one or more than engaging pins.

One bar 138 is mounted on the first portion 128 of the evaporator 108 and the other bar 138 is mounted on the second portion 130 of the evaporator 108. In some evaporators, the bars 138 are integral to the body of the evaporator 108 rather than being mounted on the body of the evaporator. The springs 142 press the bars 138 away from each other. The spring force biases the first portion 128 and the second portion 130 of the evaporator 108 away from each at the gap 134. Rotation of the bolt 140 in one direction increases a force pushing the bars 138 towards each and rotation of the bolt in the opposite direction decreases this force. When the force applied by the bolt 140 is greater than the spring force, the bars 138 bring the first portion 128 and the second portion 130 of the evaporator together.

The machine 100 includes an electric motor 146 (shown on FIG. 2B) that is operable to rotate the bolt 140 to control the size of the gap 134. Some machines use other mechanisms to rotate the bolt 140. For example, some machines use a mechanical linkage, for example, between the lid 112 and the bolt 140 to rotate the bolt 140 as the lid 112 is opened and closed. Some machines include a handle that can be attached to the bolt to manually tighten or loosen the bolt. Some machines have a wedge system that forces the bars into a closed position when the machine lid is shut. This approach may be used instead of the electric motor 146 or can be provided as a backup in case the motor fails.

The electric motor 146 is in communication with and controlled by the processor 122 of the machine 100. Some electric drives include a torque sensor that sends torque measurements to the processor 122. The processor 122 signals to the motor to rotate the bolt 140 in a first direction to press the bars 138 together, for example, when a pod sensor indicates that a pod is disposed in the receptacle 110 or when the latch sensor 120 indicates that the lid 112 and pod-machine interface 106 are engaged. It is desirable that the clamshell evaporator be shut and holding the pod in a tightly fixed position before the lid closes and the shaft pierces the pod and engages the mixing paddle. This positioning can be important for shaft-mixing paddle engagement. The processor 122 signals to the electric drive to rotate the bolt 140 in the second direction, for example, after the food or drink being produced has been cooled/frozen and dispensed from the machine 100, thereby opening the evaporator gap 134 and allowing for easy removal of pod 150 from evaporator 108.

The base of the evaporator 108 has three bores 148 (see FIG. 2C) which are used to mount the evaporator 108 to the floor of the pod-machine interface 106. All three of the bores 148 extend through the base of the second portion 130 of the evaporator 108. The first portion 128 of the evaporator 108 is not directly attached to the floor of the pod-machine interface 106. This configuration enables the opening and closing movement described above. Other configurations that enable the opening and closing movement of the evaporator 108 can also be used. Some machines have more or fewer than three bores 148. Some evaporators are mounted to components other than the floor of the pod-machine interface, for example, the dispensing mechanism.

Many factors affect the performance of a refrigeration system. Important factors include mass velocity of refrigerant flowing through the system, the refrigerant wetted surface area, the refrigeration process, the area of the pod/evaporator heat transfer surface, the mass of the evaporator, and the thermal conductivity of the material of the heat transfer surface. Extensive modeling and empirical studies in the development of the prototype systems described in this specification have determined that appropriate choices for the mass velocity of refrigerant flowing through the system and the refrigerant wetted surface area are the most important parameters to balance to provide a system capable of freezing up to 10-12 ounces of confection in less than 2 minutes.

The evaporators described in this specification have the following characteristics:

| | |
|---|---|
| Mass Velocity | 60,000 to 180,000 lb/(hour feet squared) |
| Refrigerant Wetted Surface Area | 35 to 110 square inches |
| Pressure drop Through Refrigeration Process | less than 2 psi pressure drop across the evaporator |
| Pod/Evaporator Heat Transfer Surface | 15 to 50 square inches |
| Mass of Evaporator | 0.100 to 1.50 pounds |
| Conductivity of the Material | 160 W/mK |

The following paragraphs describe the significance of these parameters in more detail.

Mass velocity accounts for the multi-phase nature or refrigerant flowing through an evaporator. The two-phase process takes advantage of the high amounts of heat absorbed and expended when a refrigerant fluid (e.g., R-290 propane) changes state from a liquid to gas and a gas to a liquid, respectively. The rate of heat transfer depends in part on exposing the evaporator inner surfaces with a new liquid refrigerant to vaporize and cool the liquid ice cream mix. To do this the velocity of the refrigerant fluid must be high enough for vapor to channel or flow down the center of the flow path within the walls of evaporator and for liquid refrigerant to be pushed thru these channel passages within the walls. One approximate measurement of fluid velocity in a refrigeration system is mass velocity—the mass flow of refrigerant in a system per unit cross sectional area of the flow passage in units of pounds/(hour-square foot) (lb/hr ft$^2$). Velocity as measured in feet/second (ft/s) (a more familiar way to measure "velocity") is difficult to apply in a two-phase system since the velocity (ft/s) is constantly changing as the fluid flow changes state from liquid to gas. If liquid refrigerant is constantly sweeping across the evaporator walls, it can be vaporized and new liquid can be pushed against the wall of the cooling channels by the "core" of vapor flowing down the middle of the passage. At low velocities, flow separates based on gravity and liquid remains on the bottom of the cooling passage within the evaporator and vapor rises to the top side of the cooling passage channels. If the amount of area exposed to liquid is reduced by half, for example, this could cut the amount of heat transfer almost half.

According to the American Society of Heating, Refrigerating and Air-Conditioning Engineers (ASHRAE), a mass velocity of 150,000 lb/hr ft^2 maximizes performance for the majority of the evaporator flow path. Mass velocity is one of the parameters that must be balanced to optimize a refrigerant system. The parameters that affect the performance of the evaporator are mass flow rate, convective heat transfer coefficient, and pressure drop. The nominal operating pressure of the evaporator is determined by the required temperature of the evaporator and the properties of the refrigerant used in the system. The mass flow rate of refrigerant through the evaporator must be high enough for it to absorb the amount of thermal energy from the confection to freeze it, in a given amount of time. Mass flow rate is primarily determined by the size of the compressor. It is desirable to use the smallest possible compressor to reduce, cost, weight and size. The convective heat transfer coefficient is influenced by the mass velocity and wetted surface area of the evaporator. The convective heat transfer coefficient will increase with increased mass velocity. However, pressure drop will also increase with mass velocity. This in turn increases the power required to operate the compressor and reduces the mass flow rate the compressor can deliver. It is desirable to design the evaporator to meet performance objectives while using the smallest least expensive compressor possible. We have determined that evaporators with a mass velocity of 75,000-125,000 lb/hr ft^2 are effective in helping provide a system capable of freezing up to 12 ounces of confection in less than 2 minutes. The latest prototype has a mass velocity of approximately 100,000 lb/hr ft^2 and provides a good balance of high mass velocity, manageable pressure drop in the system, and a reasonable sized compressor.

Another important factor that affects performance in an evaporator is the surface area wetted by refrigerant which is the area of all the cooling channels within the evaporator as long as at least some liquid refrigerant is present throughout these channels. Increasing the wetted surface area can improve heat transfer characteristics of an evaporator. However, increasing the wetted surface area can increase the mass of the evaporator which would increase thermal inertia and degrade heat transfer characteristics of the evaporator.

The amount of heat that can be transferred out of the liquid in a pod is proportional ice cream mix to the surface area of the pod/evaporator heat transfer surface. A larger surface area is desirable but increases in surface area can require increasing the mass of the evaporator which would degrade heat transfer characteristics of the evaporator. We have determined that evaporators in which the area of the pod/evaporator heat transfer surface is between 20 and 40 square inches are effectively combined with the other characteristics to help provide a system capable of freezing up to 12 ounces of confection in less than 2 minutes.

Thermal conductivity is the intrinsic property of a material which relates its ability to conduct heat. Heat transfer by conduction involves transfer of energy within a material without any motion of the material as a whole. An evaporator with walls made of a high conductivity material (e.g., aluminum) reduces the temperature difference across the evaporator walls. Reducing this temperature difference reduces the work required for the refrigeration system to cool the evaporator to the right temperature.

For the desired heat transfer to occur, the evaporator must be cooled. The greater the mass of the evaporator, the longer this cooling will take. Reducing evaporator mass reduces the amount of material that must be cooled during a freezing cycle. An evaporator with a large mass will increase the time require to freeze up to 12 ounces of confection.

The effects of thermal conductivity and mass can be balanced by an appropriate choice of materials. There are materials with higher thermal conductivity than aluminum such as copper. However, the density of copper is greater that the density of aluminum. For this reason, some evaporators have been constructed that use high thermal conductive copper only on the heat exchange surfaces of the evaporator and use aluminum everywhere else.

FIGS. 3A-3F show components of the pod-machine interface 106 that are operable to open pods in the evaporator 108 to dispense the food or drink being produced by the machine 100. This is an example of one approach to opening pods but some machines and the associated pods use other approaches.

Figure 3A:
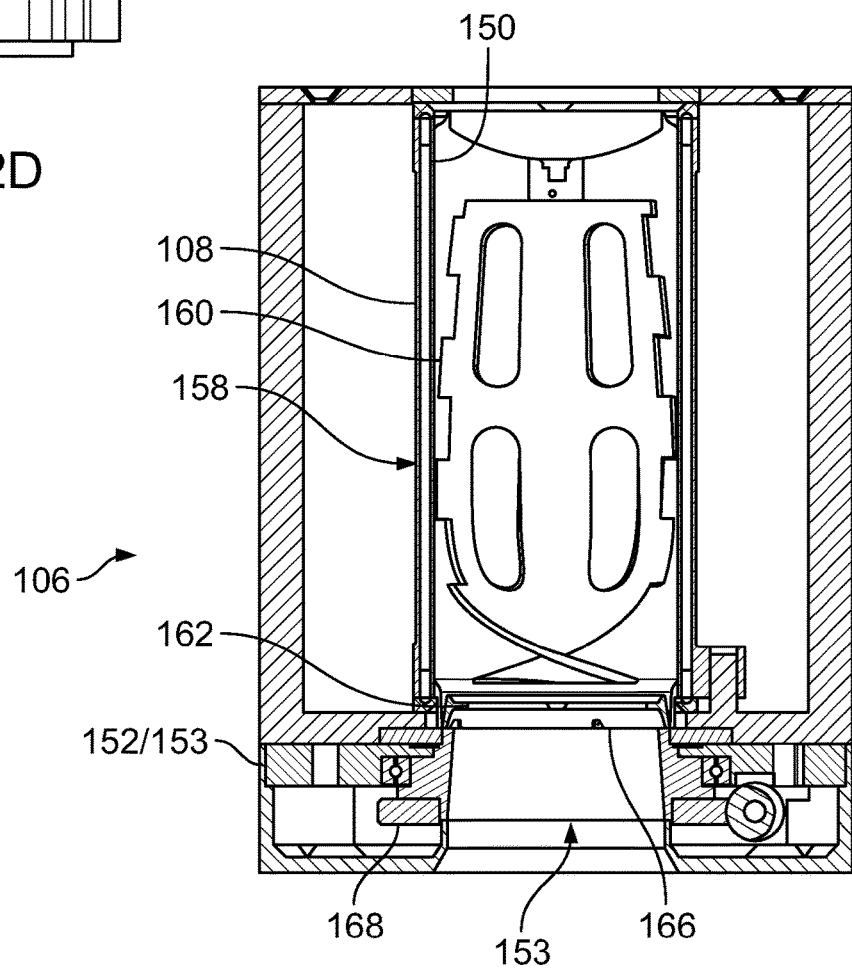
FIGS. 3A-3F show components of a pod-machine interface that are operable to open and close pods in the evaporator to dispense the food or drink being produced.
Figure 3B:
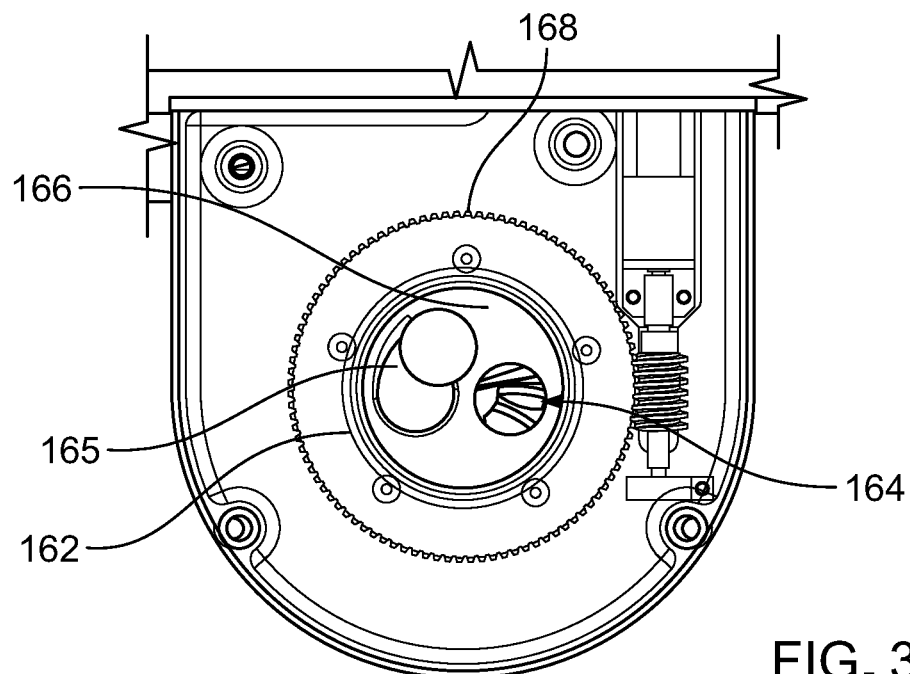
Figure 3C:
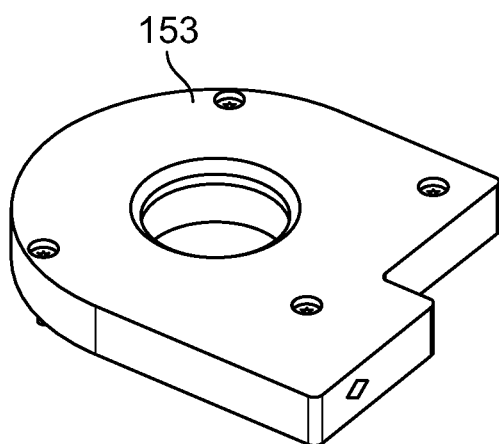
Figure 3D:
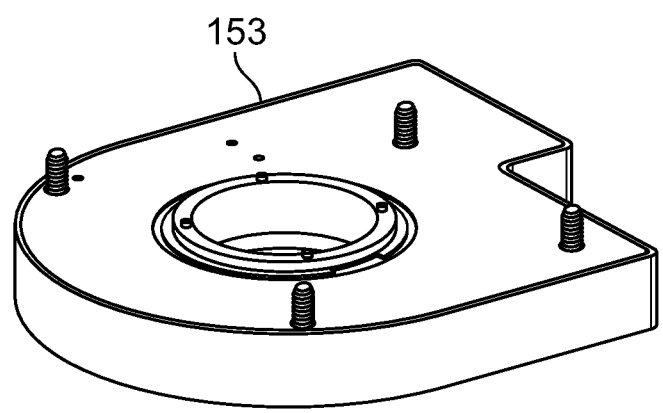
Figure 3E:
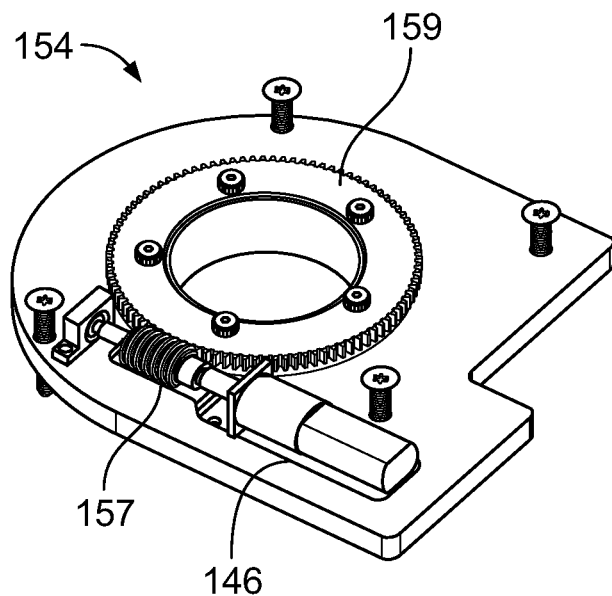
Figure 3F:
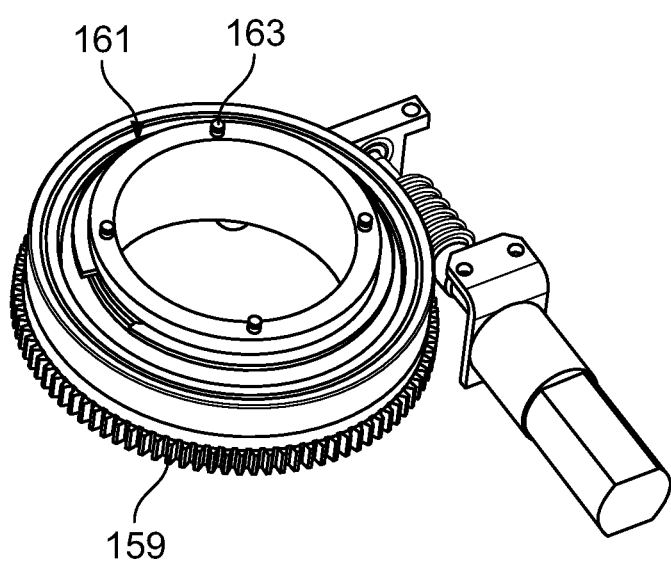

FIG. 3A is a partially cutaway schematic view of the pod-machine interface 106 with a pod 150 placed in the evaporator 108. FIG. 3B is a schematic plan view looking upwards that shows the relationship between the end of the pod 150 and the floor 152 of the pod-machine interface 106. The floor 152 of the pod-machine interface 106 is formed by a dispenser 153. FIGS. 3C and 3D are perspective views of a dispenser 153. FIGS. 3E and 3F are perspective views of an insert 154 that is disposed in the dispenser 153. The insert 154 includes an electric motor 146 operable to drive a worm gear 157 floor 152 of the pod-machine interface 106. The worm gear 157 is engaged with a gear 159 with an annular configuration. An annular member 161 mounted on the gear 159 extends from the gear 159 into an interior region of the pod-machine interface 106. The annular member 161 has protrusions 163 that are configured to engage with a pod inserted into the pod-machine interface 106 to open the pod. The protrusions 163 of the annular member 161 are four dowel-shaped protrusions. Some annular gears have more protrusions or fewer protrusions and the protrusions can have other shapes, for example, "teeth".

The pod 150 includes a body 158 containing a mixing paddle 160 (see FIG. 3A). The pod 150 also has a base 162 defining an aperture 164 and a cap 166 extending across the base 162 (see FIG. 3B). The base 162 is seamed/fixed onto the body 158 of the pod 150. The base 162 includes a protrusion 165. The cap 166 mounted over base 162 is rotatable around the circumference/axis of the pod 150. In use, when the product is ready to be dispensed from the pod 150, the dispenser 153 of the machine engages and rotates the cap 166 around the first end of the pod 150. Cap 166 is rotated to a position to engage and then separate the protrusion 165 from the rest of the base 162. The pod 150 and its components are described in more detail with respect to FIGS. 6A-10.

The aperture 164 in the base 162 is opened by rotation of the cap 166. The pod-machine interface 106 includes an electric motor 146 with threading that engages the outer circumference of a gear 168. Operation of the electric motor 146 causes the gear 168 to rotate. The gear 168 is attached to An annular member 161 and rotation of the gear 168 rotates the annular member 161. The gear 168 and the annular member 161 are both annular and together define a central bore through which food or drink can be dispensed from the pod 150 through the aperture 164 without contacting the gear 168 or the annular member 161. When the pod 150 is placed in the evaporator 108, the annular member 161 engages the cap 166 and rotation of the annular member 161 rotates the cap 166.

Figure 4:
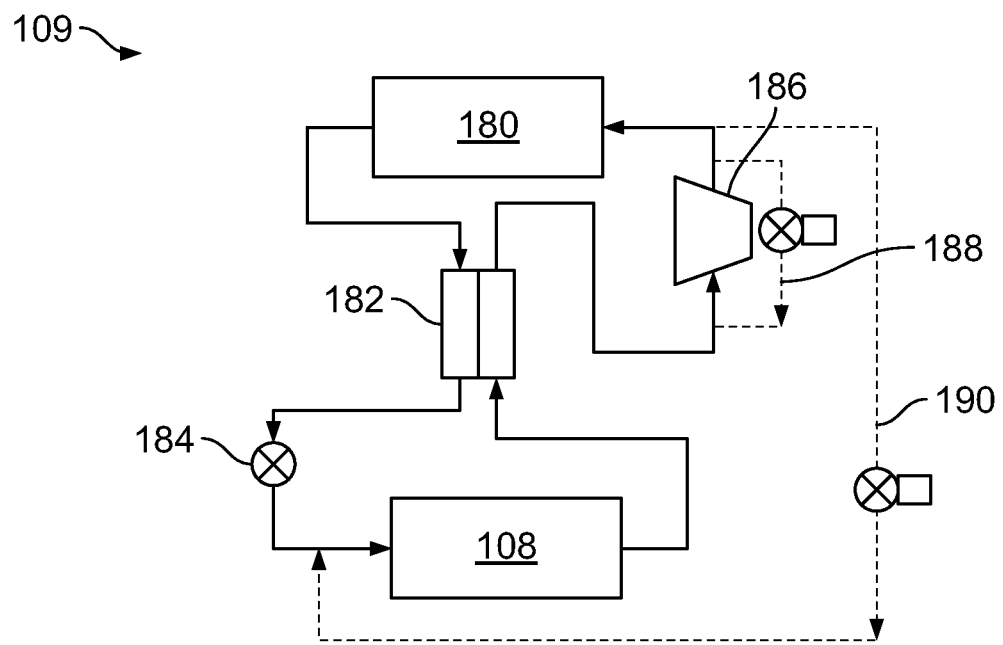
FIG. 4 is a schematic of a refrigeration system.

FIG. 4 is a schematic of the refrigeration system 109 that includes the evaporator 108. The refrigeration system also includes a condenser 180, a suction line heat exchanger 182, an expansion valve 184, and a compressor 186. High-pressure, liquid refrigerant flows from the condenser 180 through the suction line heat exchanger 182 and the expansion valve 184 to the evaporator 108. The expansion valve 184 restricts the flow of the liquid refrigerant fluid and lowers the pressure of the liquid refrigerant as it leaves the expansion valve 184. The low-pressure liquid then moves to the evaporator 108 where heat absorbed from a pod 150 and its contents in the evaporator 108 changes the refrigerant from a liquid to a gas. The gas-phase refrigerant flows from the evaporator 108 to the compressor 186 through the suction line heat exchanger 182. In the suction line heat exchanger 182, the cold vapor leaving the evaporator 108 pre-cools the liquid leaving the condenser 180. The refrigerant enters the compressor 186 as a low-pressure gas and leaves the compressor 186 as a high-pressure gas. The gas then flows to the condenser 180 where heat exchange cools and condenses the refrigerant to a liquid.

The refrigeration system 109 includes a first bypass line 188 and second bypass line 190. The first bypass line 188 directly connects the discharge of the compressor 186 to the inlet of the compressor 186. Disposed on the both the first bypass line and second bypass line are bypass valves that open and close the passage to allow refrigerant bypass flow. Diverting the refrigerant directly from the compressor discharge to the inlet can provide evaporator defrosting and temperature control without injecting hot gas to the evaporator. The first bypass line 188 also provides a means for rapid pressure equalization across the compressor 186, which allows for rapid restarting (i.e., freezing one pod after another quickly). The second bypass line 190 enables the application of warm gas to the evaporator 108 to defrost the evaporator 108. The bypass valves may be, for example, solenoid valves or throttle valves.

Figure 5A:
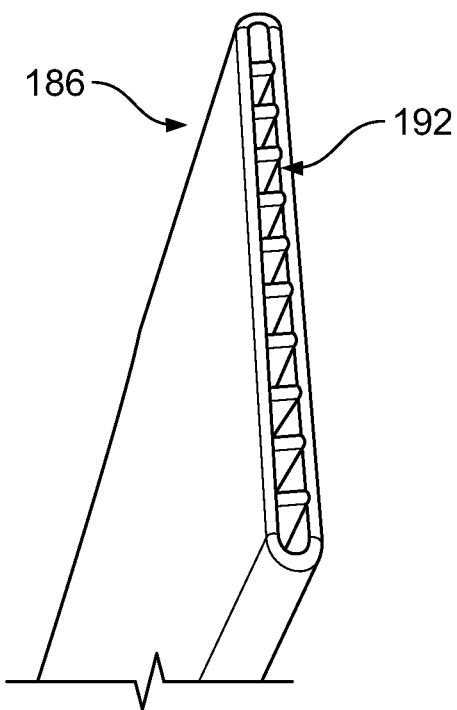
FIGS. 5A and 5B are views of a prototype of a condenser.
Figure 5B:
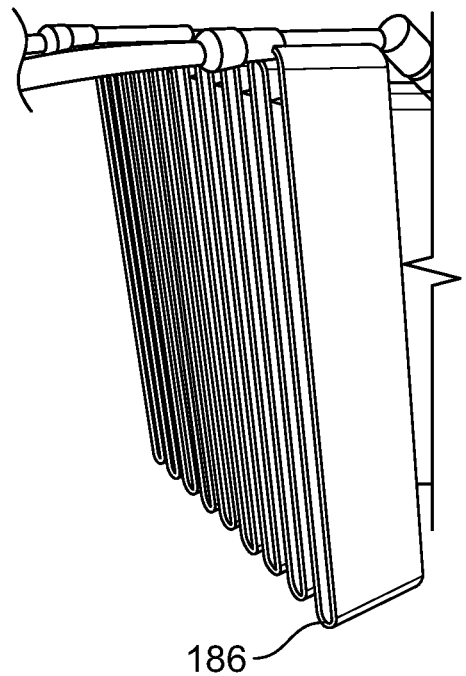

FIGS. 5A and 5B are views of a prototype of the condenser 180. The condenser has internal channels 192. The internal channels 192 increase the surface area that interacts with the refrigerant cooling the refrigerant quickly. These images show micro-channel tubing which are used because they have small channels which keeps the coolant velocity up and are thin wall for good heat transfer and have little mass to prevent the condenser for being a heat sink.

Figure 6A:
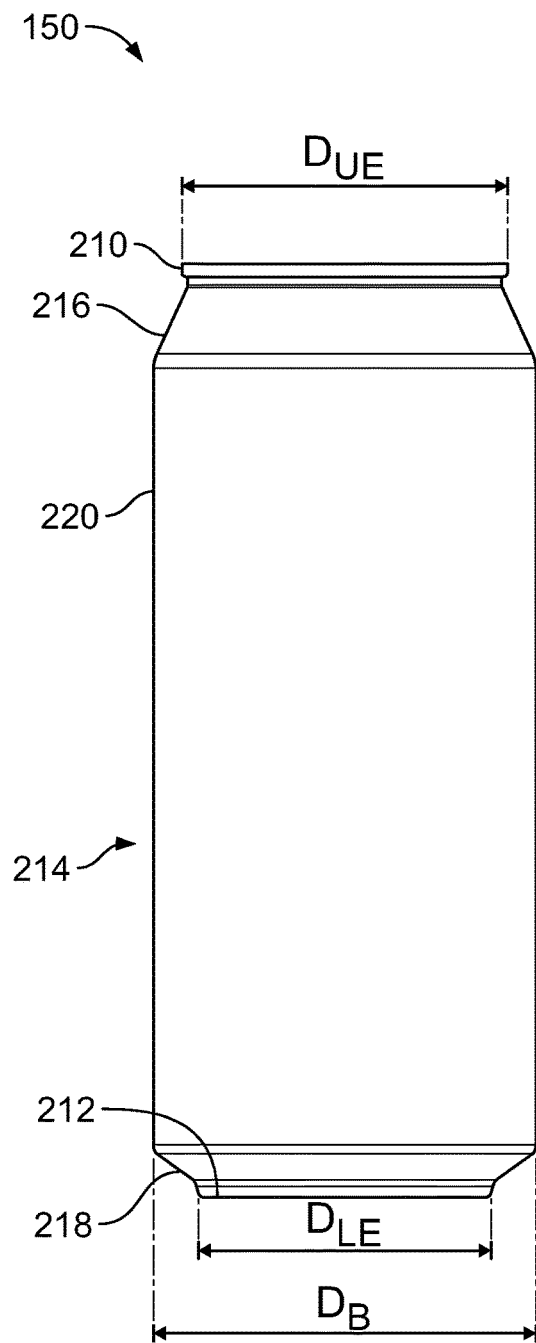
FIG. 6A is a side view of a pod.
Figure 6B:
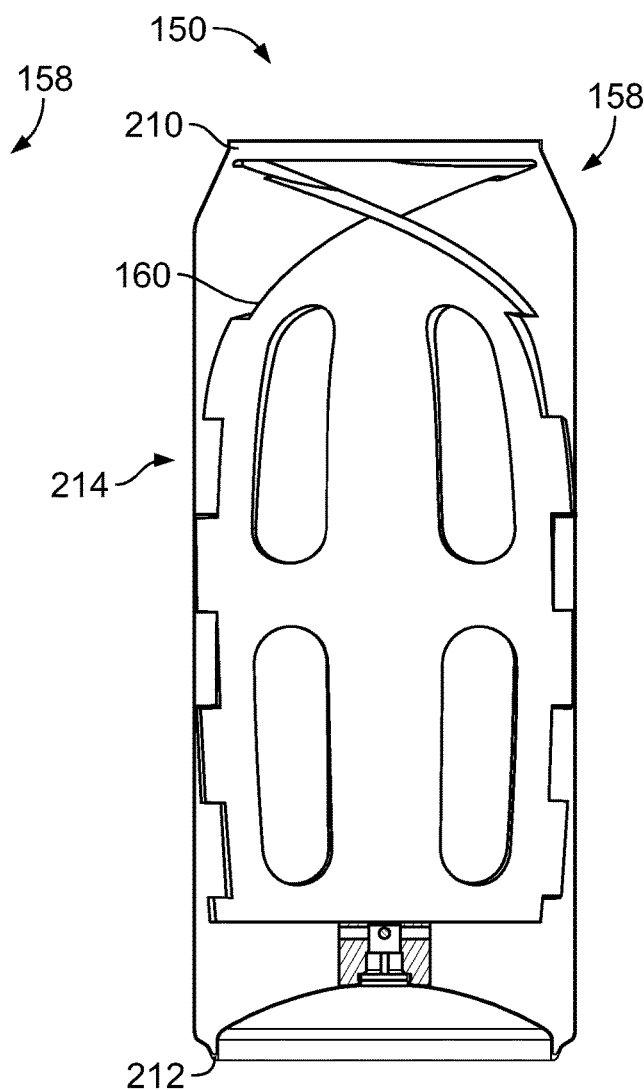
FIG. 6B is a schematic side view of the pod and a mixing paddle disposed in the pod.

FIGS. 6A and 6B show an example of a pod 150 for use with the machine 100 described with respect to FIGS. 1A-3F. FIG. 6A is a side view of the pod 150. FIG. 6B is a schematic side view of the pod 150 and the mixing paddle 160 disposed in the body 158 of the pod 150.

The pod 150 is sized to fit in the receptacle 110 of the machine 100. The pods can be sized to provide a single serving of the food or drink being produced. Typically, pods have a volume between 6 and 18 fluid ounces. The pod 150 has a volume of approximately 8.5 fluid ounces.

The body 158 of the pod 150 is a can that contains the mixing paddle 160. The body 158 extends from a first end 210 at the base to a second end 212 and has a circular cross-section. The first end 210 has a diameter $D_{UE}$ that is slightly larger than the diameter $D_{LE}$ of the second end 212. This configuration facilitates stacking multiple pods 200 on top of one another with the first end 210 of one pod receiving the second end 212 of another pod.

A wall 214 connects the first end 210 to the second end 212. The wall 214 has a first neck 216, second neck 218, and a barrel 220 between the first neck 216 and the second neck 218. The barrel 220 has a circular cross-section with a diameter $D_B$. The diameter $D_B$ is larger than both the diameter $D_{UE}$ of the first end 210 and the diameter $D_{LE}$ of the second end 212. The first neck 216 connects the barrel 220 to the first end 210 and slopes as the first neck 216 extends from the smaller diameter $D_{UE}$ to the larger diameter $D_B$ the barrel 220. The second neck 218 connects the barrel 220 to the second end 212 and slopes as the second neck 218 extends from the larger diameter $D_B$ of the barrel 220 to the smaller diameter $D_{LE}$ of the second end 212. The second neck 218 is sloped more steeply than the first neck 216 as the second end 212 has a smaller diameter than the first end 210.

This configuration of the pod 150 provides increased material usage; i.e., the ability to use more base material (e.g., aluminum) per pod. This configuration further assists with the columnar strength of the pod.

The pod 150 is designed for good heat transfer from the evaporator to the contents of the pod. The body 158 of the pod 150 is made of aluminum and is between 5 and 50 microns thick. The bodies of some pods are made of other materials, for example, tin, stainless steel, and various polymers such as polyethylene terephthalate (PTE).

Pod 150 may be made from a combination of different materials to assist with the manufacturability and performance of the pod. In one embodiment, the pod walls and the second end 212 may be made of Aluminum 3104 while the base may be made of Aluminum 5182.

In some pods, the internal components of the pod are coated with a lacquer to prevent corrosion of the pod as it comes into contact with the ingredients contained within pod. This lacquer also reduces the likelihood of "off notes" of the metal in the food and beverage ingredients contained within pod. For example, a pod made of aluminum may be internally coated with one or a combination of the following coatings: Sherwin Williams/Valspar V70Q11, V70Q05, 32SO2AD, 40Q60AJ; PPG Innovel 2012-823, 2012-820C; and/or Akzo Nobel Aqualure G1 50. Other coatings made by the same or other coating manufacturers may also be used.

Some mixing paddles are made of similar aluminum alloys and coated with similar lacquers/coatings. For example, Whitford/PPG coating 8870 may be used as a coating for mixing paddles. The mixing paddle lacquer may have additional non-stick and hardening benefits for mixing paddle.

Other pod-machine interfaces that can be used with this and similar machines are described in more detail in U.S. patent application Ser. No. 16/459,322 filed contemporaneously with this application and incorporated herein by reference in its entirety.

FIGS. 7A-7C illustrate the engagement between the driveshaft 126 of the machine 100 and the mixing paddle 160 of a pod 150 inserted in the machine 100. FIGS. 7A and 7B are perspective views of the pod 150 and the driveshaft 126. In use, the pod 150 is inserted into the receptacle 110 of the evaporator 108 with the first end 210 of the pod 150 downward. This orientation exposes the second end 212 of the pod 150 to the driveshaft 126 as shown in FIG. 7A. Closing the lid 112 (see FIG. 1A) presses the driveshaft 126 against the second end 212 of the pod 150 with sufficient force that the driveshaft 126 pierces the second end 212 of the pod 150. FIG. 7B shows the resulting hole exposing the mixing paddle 160 with the driveshaft 126 offset for ease of viewing. FIG. 7C is a cross-section of a portion of the pod 150 with the driveshaft 126 engaged with the mixing paddle 160 after the lid is closed. Typically, there is not a tight seal between the driveshaft 126 and the pod 150 so that air can flow in as the frozen confection is evacuating/dispensing out the other end of the pod 150. In an alternative embodiment, there is a tight seal such that the pod 150 retains pressure in order to enhance contact between the pod 150 and evaporator 108.

Some mixing paddles contain a funnel or receptacle configuration that receives the punctured end of the second end of the pod when the second end is punctured by driveshaft.

Figure 8:
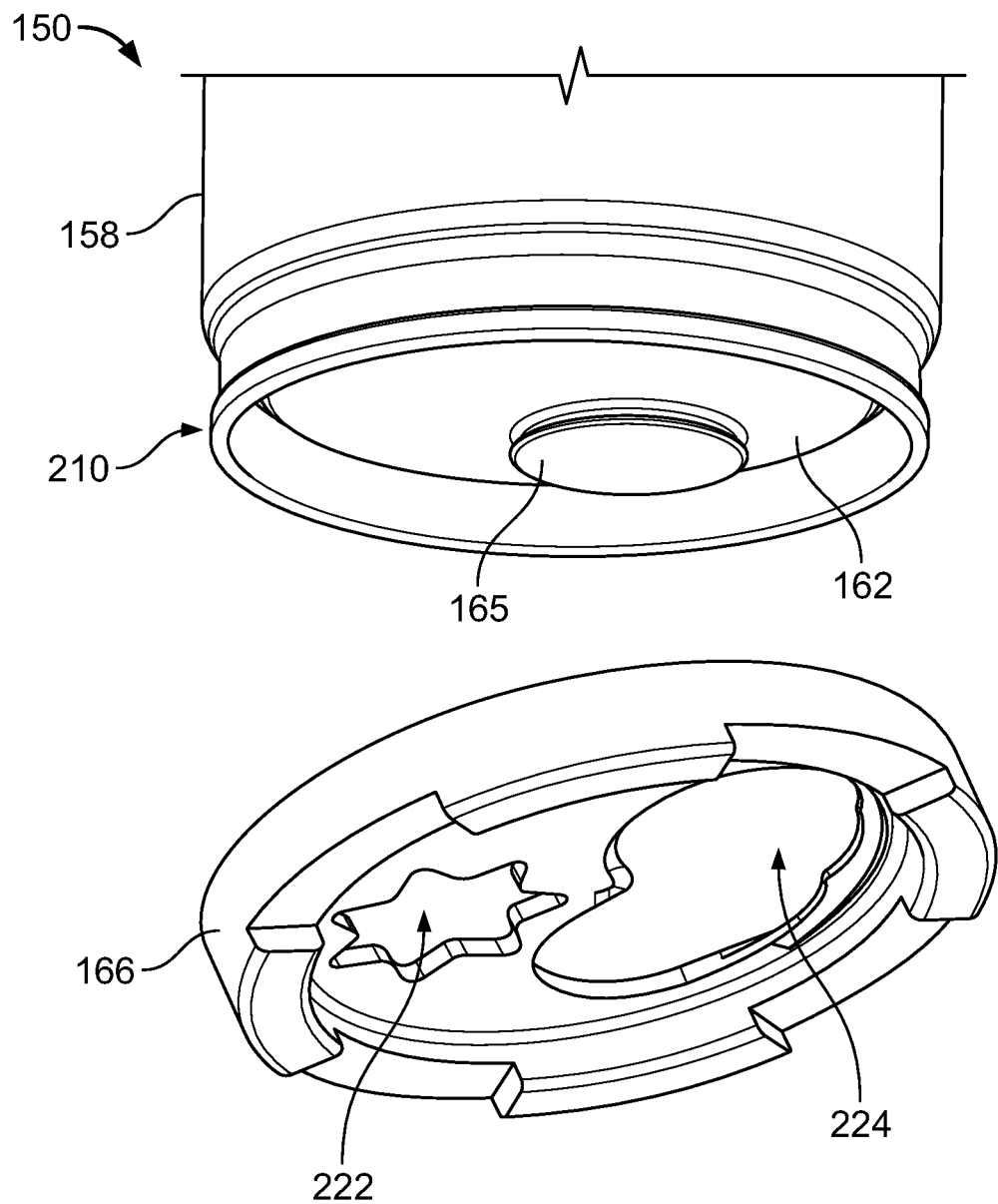
FIG. 8 shows a first end of a pod with its cap spaced apart from its base for ease of viewing.

FIG. 8 shows the first end 210 of the pod 150 with the cap 166 spaced apart from the base 162 for ease of viewing. FIGS. 9A-9D illustrate rotation of the cap 166 around the first end 210 of the pod 150 to cut and carry away protrusion 165 of base 162 and expose aperture 164 extending through the base 162.

The base 162 is manufactured separately from the body 158 of the pod 150 and then attached (for example, by crimping or seaming) to the body 158 of the pod 150 covering an open end of the body 158. The protrusion 165 of the base 162 can be formed, for example, by stamping, deep drawing, or heading a sheet of aluminum being used to form the base. The protrusion 165 is attached to the remainder of the base 162, for example, by a weakened score line 173. The scoring can be a vertical score into the base of the aluminum sheet or a horizontal score into the wall of the protrusion 165. For example, the material can be scored from an initial thickness of 0.008 inches to 0.010 inches to a post-scoring thickness of 0.001 inches-0.008 inches. In an alternative embodiment, there is no post-stamping scoring but rather the walls are intentionally thinned for ease of rupture. In another version, there is not variable wall thickness but rather the cap 166 combined with force of the machine dispensing mechanism engagement are enough to cut the 0.008 inches to 0.010 inches wall thickness on the protrusion 165. With the scoring, the protrusion 165 can be lifted and sheared off the base 162 with 5-75 pounds of force, for example between 15-40 pounds of force.

The cap 166 has a first aperture 222 and a second aperture 224. The first aperture approximately matches the shape of the aperture 164. The aperture 164 is exposed and extends through the base 162 when the protrusion 165 is removed. The second aperture 224 has a shape corresponding to two overlapping circles. One of the overlapping circles has a shape that corresponds to the shape of the protrusion 165 and the other of the overlapping circles is slightly smaller. A ramp 226 extends between the outer edges of the two overlapping circles. There is an additional 0.020" material thickness at the top of the ramp transition. This extra height helps to lift and rupture the protrusion's head and open the aperture during the rotation of the cap as described in more detail with reference to FIGS. 9A-9G.

Figure 9A:
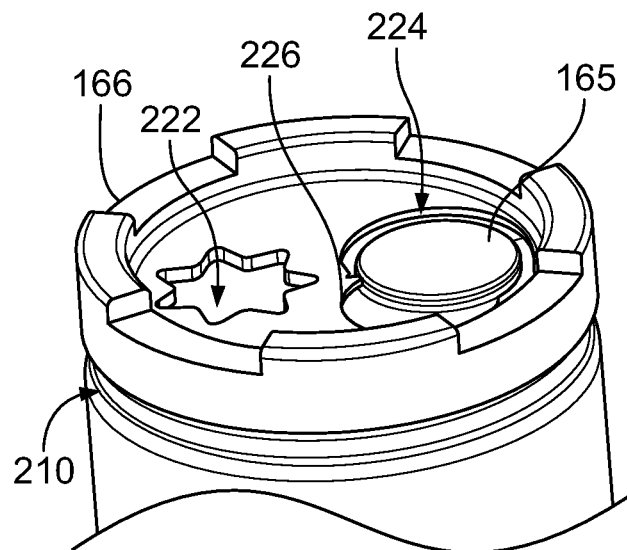
FIGS. 9A-9G illustrate rotation of a cap around the first end of the pod to open an aperture extending through the base.
Figure 9B:
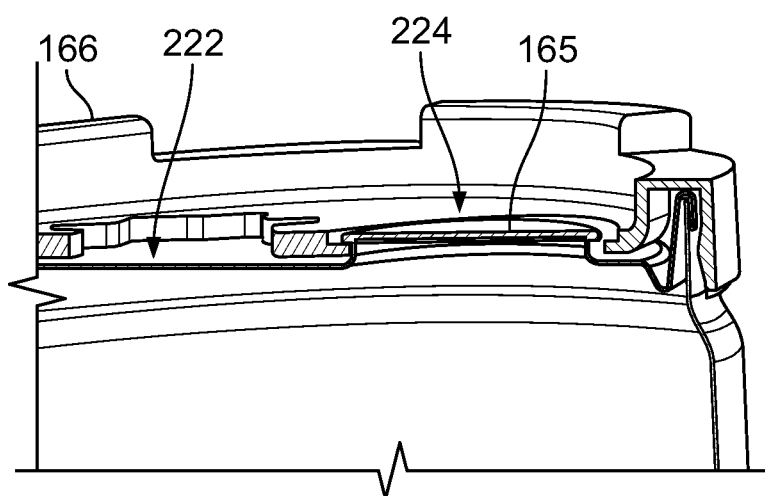
Figure 9C:
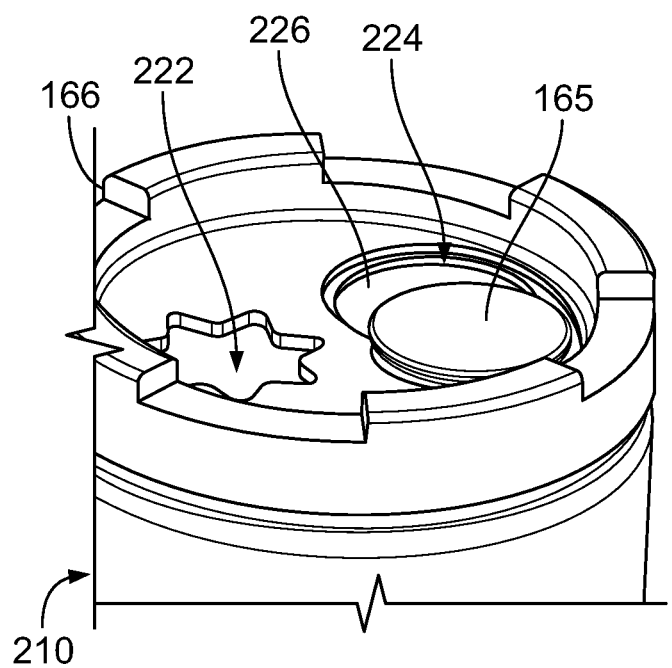
Figure 9D:
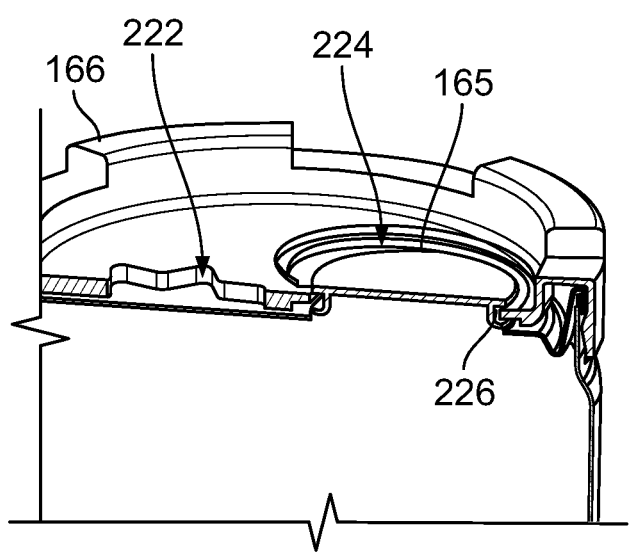
Figure 9E:
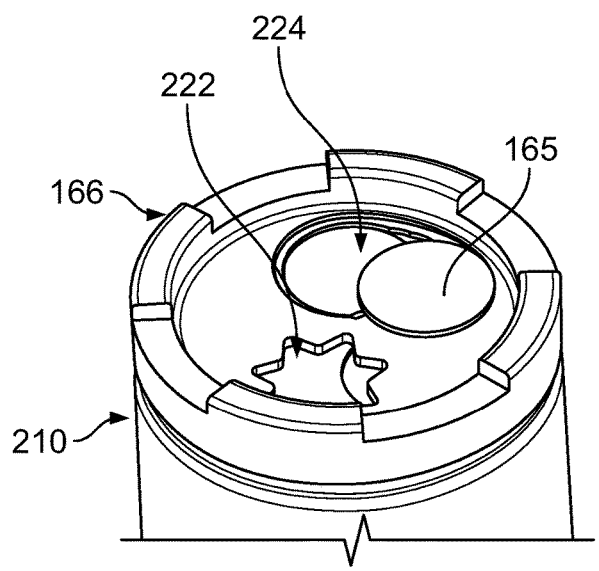
Figure 9F:
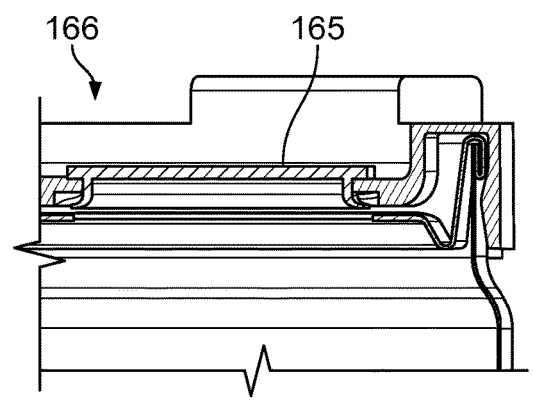
Figure 9G:
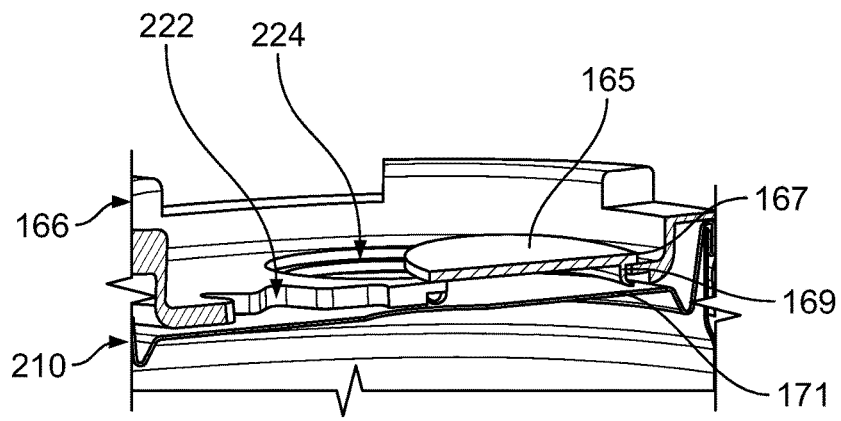

As shown in FIGS. 9A and 9B, the cap 166 is initially attached to the base 162 with the protrusion 165 aligned with and extending through the larger of the overlapping circles of the second aperture 224. When the processor 122 of the machine activates the electric motor 146 to rotate the gear 168 and the annular member 161, rotation of the cap 166 slides the ramp 226 under a lip of the protrusion 165 as shown in FIGS. 9C and 9D. Continued rotation of the cap 166 applies a lifting force that separates the protrusion 165 from the remainder of the base 162 (see FIGS. 9E-9G) and then aligns the first aperture 222 of the cap 166 with the aperture 164 in the base 162 resulting from removal of the protrusion 165.

Some pods include a structure for retaining the protrusion 165 after the protrusion 165 is separated from the base 162. In the pod 150, the protrusion 165 has a head 167, a stem 169, and a foot 171 (best seen in FIG. 9G). The stem 169 extends between the head 167 and the foot 171 and has a smaller cross-section that the head 167 and the foot 171. As rotation of the cap 166 separates the protrusion 165 from the remainder of the base 162, the cap 166 presses laterally against the stem 169 with the head 167 and the foot 171 bracketing the cap 166 along the edges of one of the overlapping circles of the second aperture 224. This configuration retains the protrusion 165 when the protrusion 165 is separated from the base 166. Such a configuration reduces the likelihood that the protrusion falls into the waiting receptacle that when the protrusion 165 is removed from the base.

Some pods include other approaches to separating the protrusion 165 from the remainder of the base 162. For example, in some pods, the base has a rotatable cutting mechanism that is riveted to the base. The rotatable cutting mechanism has a shape similar to that described relative to cap 166 but this secondary piece is riveted to and located within the perimeter of base 162 rather than being mounted over and around base 162. When the refrigeration cycle is complete, the processor 122 of the machine activates an arm of the machine to rotate the riveted cutting mechanism around a rivet. During rotation, the cutting mechanism engages, cuts and carries away the protrusion 165, leaving the aperture 164 of base 162 in its place.

In another example, some pods have caps with a sliding knife that moves across the base to remove the protrusion. The sliding knife is activated by the machine and, when triggered by the controller, slides across the base to separate, remove, and collect the protrusion 165. The cap 166 has a guillotine feature that, when activated by the machine, may slide straight across and over the base 162. The cap 166 engages, cuts, and carries away the protrusion 165. In another embodiment, this guillotine feature may be central to the machine and not the cap 166 of pod 150. In another embodiment, this guillotine feature may be mounted as a secondary piece within base 162 and not a secondary mounted piece as is the case with cap 166.

Some pods have a dispensing mechanism that includes a pop top that can be engaged and released by the machine. When the refrigeration cycle is complete, an arm of the machine engages and lifts a tab of the pod, thereby pressing the puncturing the base and creating an aperture in the base. Chilled or frozen product is dispensed through the aperture. The punctured surface of the base remains hinged to base and is retained inside the pod during dispensing. The mixing avoids or rotates over the punctured surface or, in another embodiment, so that the mixing paddle continues to rotate without obstruction. In some pop tops, the arm of the machine separates the punctured surface from the base.

Figure 10:
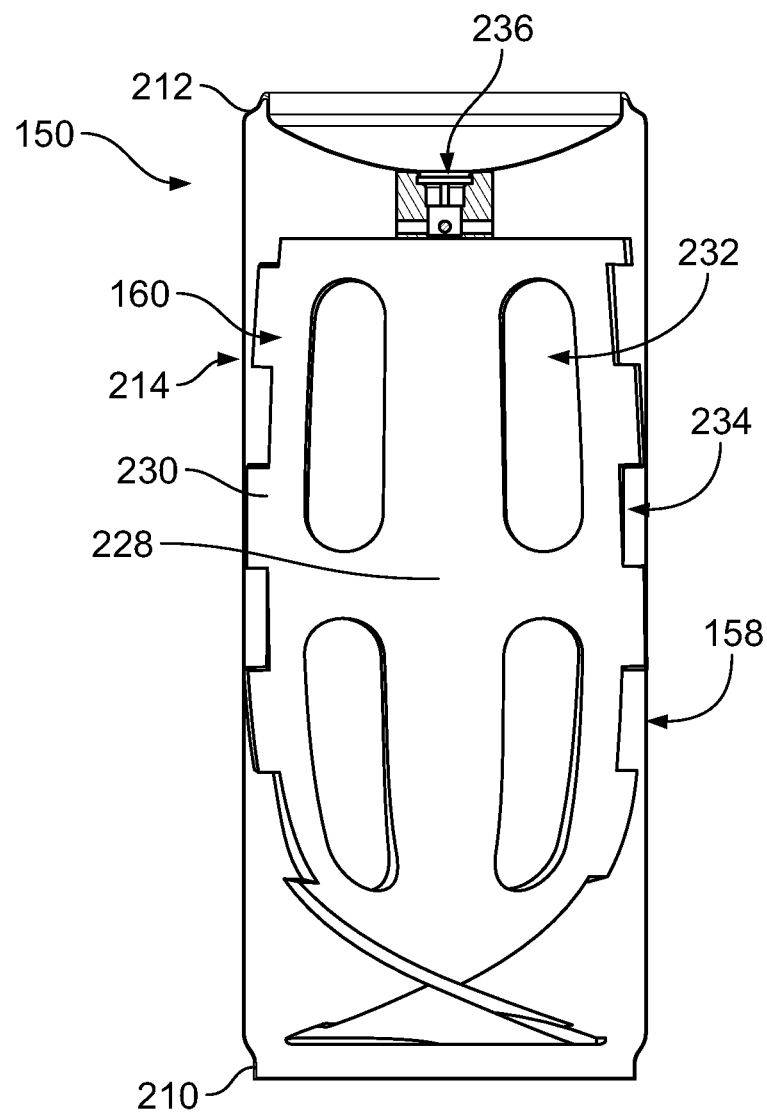
FIG. 10 is an enlarged schematic side view of a pod.

FIG. 10 is an enlarged schematic side view of the pod 150. The mixing paddle 160 includes a central stem 228 and two blades 230 extending from the central stem 228. The blades 230 are helical blades shaped to churn the contents of the pod 150 and to remove ingredients that adhere to inner surface of the body 158 of the pod 150. Some mixing paddles have a single blade and some mixing paddles have more than two mixing paddles.

Fluids (e.g., liquid ingredients, air, or frozen confection) flow through openings 232 in the blades 230 when the mixing paddle 160 rotates. These openings reduce the force required to rotate the mixing paddle 160. This reduction can be significant as the viscosity of the ingredients increases (e.g., as ice cream forms). The openings 232 also assist in mixing and aerating the ingredients within the pod.

The lateral edges of the blades 230 define slots 234. The slots 234 are offset so that most of the inner surface of the body 158 is cleared of ingredients that adhere to inner surface of the body by one of the blades 230 as the mixing paddle 160 rotates. Although the mixing paddle is 160 wider than the first end 210 of the body 158 of the pod 150, the slots 234 are alternating slots that facilitate insertion of the mixing paddle 160 into the body 158 of the pod 150 by rotating the mixing paddle 160 during insertion so that the slots 234 are aligned with the first end 210. In another embodiment, the outer diameter of the mixing paddle are less than the diameter of the pod 150 opening, allowing for a straight insertion (without rotation) into the pod 150. In another embodiment, one blade on the mixing paddle has an outer-diameter that is wider than the second blade diameter, thus allowing for straight insertion (without rotation) into the pod 150. In this mixing paddle configuration, one blade is intended to remove (e.g., scrape) ingredients from the sidewall while the second, shorter diameter blade, is intended to perform more of a churning operation.

Some mixing paddles have one or more blades that are hinged to the central stem. During insertion, the blades can be hinged into a condensed formation and released into an expanded formation once inserted. Some hinged blades are fixed open while rotating in a first direction and collapsible when rotating in a second direction, opposite the first direction. Some hinged blades lock into a fixed, outward, position once inside the pod regardless of rotational directions. Some hinged blades are manually condensed, expanded, and locked.

The mixing paddle 160 rotates clockwise and removes frozen confection build up from the pod 214 wall. Gravity forces the confection removed from the pod wall to fall towards first end 210. In the counterclockwise direction, the mixing paddle 160 rotate, lift and churn the ingredients towards the second end 212. When the paddle changes direction and rotates clockwise the ingredients are pushed towards the first end 210. When the protrusion 165 of the base 162 is removed as shown and described with respect to FIG. 9D, clockwise rotation of the mixing paddle dispenses produced food or drink from the pod 150 through the aperture 164. Some paddles mix and dispense the contents of the pod by rotating a first direction. Some paddles mix by moving in a first direction and a second direction and dispense by moving in the second direction when the pod is opened.

The central stem 228 defines a recess 236 that is sized to receive the drive shaft 126 of the machine 100. The recess and drive shaft 126 have a square cross section so that the drive shaft 126 and the mixing paddle 160 are rotatably constrained. When the motor rotates the drive shaft 126, the drive shaft rotates the mixing paddle 160. In some embodiments, the cross section of the drive shaft is a different shape and the cross section of the recess is compatibly shaped. In some cases the drive shaft and recess are threadedly connected. In some pods, the recess contains a mating structure that grips the drive shaft to rotationally couple the drive shaft to the paddle.

Figure 11:
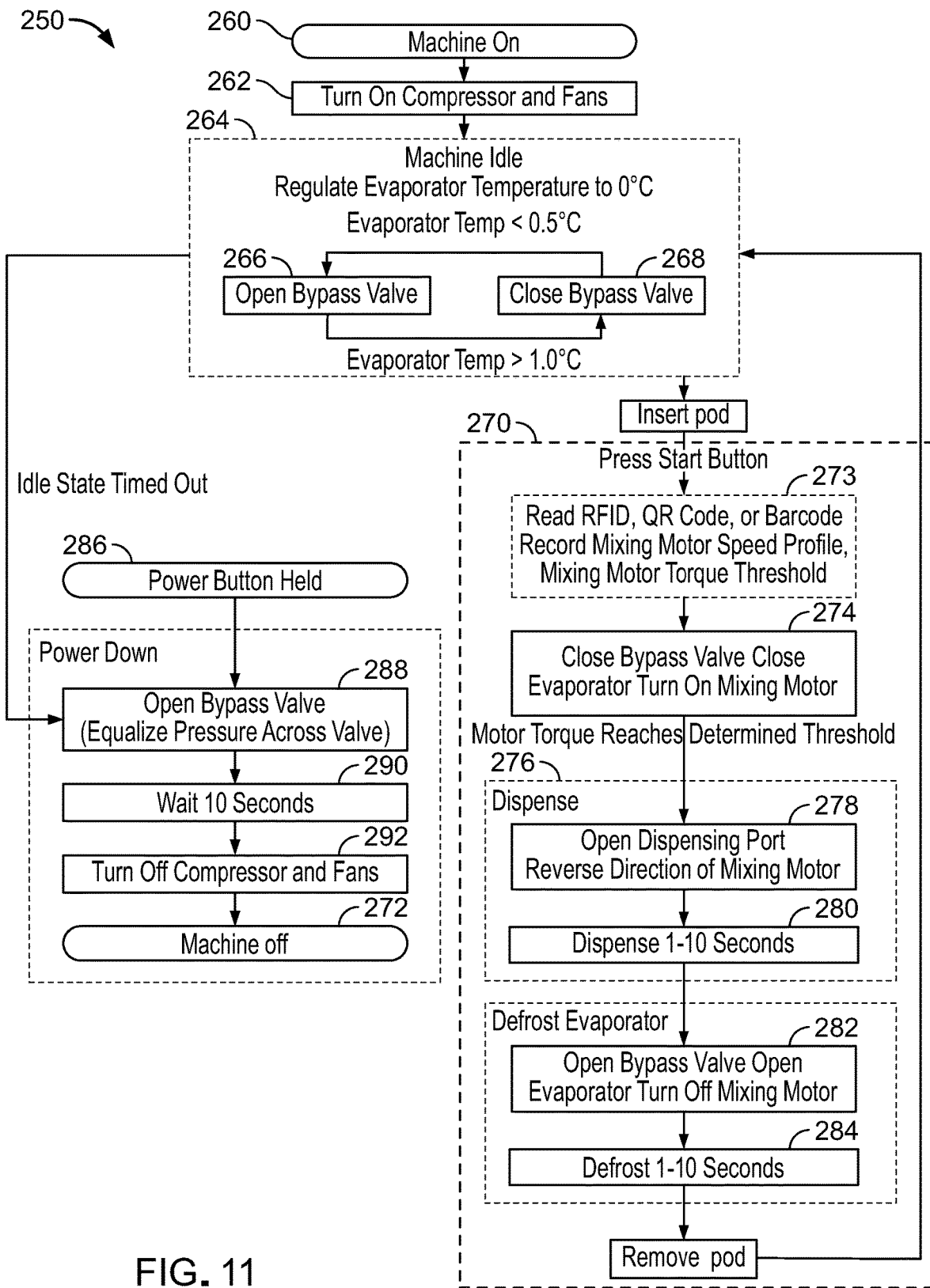
FIG. 11 is a flow chart of a method for operating a machine for producing cooled food or drinks.

FIG. 11 is a flow chart of a method 250 implemented on the processor 122 for operating the machine 100. The method 250 is described with references to refrigeration system 109 and machine 100. The method 250 may also be used with other refrigeration systems and machines. The method 250 is described as producing soft serve ice cream but can also be used to produce other cooled or frozen drinks and foods.

The first step of the method 250 is to turn the machine 100 on (step 260) and turn on the compressor 186 and the fans associated with the condenser 180 (step 262). The refrigeration system 109 then idles at regulated temperature (step 264). In the method 250, the evaporator 108 temperature is controlled to remain around 0.75° C. but may fluctuate by ±0.25° C. Some machines are operated at other idle temperatures, for example, from 0.75° C. to room temperature (22.0° C.). If the evaporator temperature is below 0.5° C., the processor 122 opens the bypass valve 190 to increase the heat of the system (step 266). When the evaporator temperature goes over 1° C., the bypass valve 190 is closed to cool the evaporator (step 268). From the idle state, the machine 100 can be operated to produce ice cream (step 270) or can shut down (step 272).

After inserting a pod, the user presses the start button. When the user presses the start button, the bypass valve 190 closes, the evaporator 108 moves to its closed position, and the motor 124 is turned on (step 274). In some machines, the evaporator is closed electronically using a motor. In some machines, the evaporator is closed mechanically, for example by the lid moving from the open position to the closed position. In some systems, a sensor confirms that a pod 150 is present in the evaporator 108 before these actions are taken.

Some systems include radio frequency identification (RFID) tags or other intelligent bar codes such as UPC bar or QR codes. Identification information on pods can be used to trigger specific cooling and mixing algorithms for specific pods. These systems can optionally read the RFID, QR code, or barcode and identify the mixing motor speed profile and the mixing motor torque threshold (step 273).

The identification information can also be used to facilitate direct to consumer marketing (e.g., over the internet or using a subscription model). This approach and the systems described in this specification enable selling ice cream thru e-commerce because the pods are shelf stable. In the subscription mode, customers pay a monthly fee for a predetermined number of pods shipped to them each month. They can select their personalized pods from various categories (e.g., ice cream, healthy smoothies, frozen coffees or frozen cocktails) as well as their personalized flavors (e.g., chocolate or vanilla).

The identification can also be used to track each pod used. In some systems, the machine is linked with a network and can be configured to inform a vendor as to which pods are being used and need to be replaced (e.g., through a weekly shipment). This method is more efficient than having the consumers go to the grocery store and purchase pods.

These actions cool the pod 150 in the evaporator 108 while rotating the mixing paddle 160. As the ice cream forms, the viscosity of the contents of the pod 150 increases. A torque sensor of the machine measures the torque of the motor 124 required to rotate the mixing paddle 160 within the pod 150. Once the torque of the motor 124 measured by a torque sensor satisfies a predetermined threshold, the machine 100 moves into a dispensing mode (276). The dispensing port opens and the motor 124 reverses direction (step 278) to press the frozen confection out of the pod 150. This continues for approximately 1 to 10 seconds to dispense the contents of the pod 150 (step 280). The machine 100 then switches to defrost mode (step 282). Frost that builds up on the evaporator 108 can reduce the heat transfer efficiency of the evaporator 108. In addition, the evaporator 108 can freeze to the pod 150, the first portion 128 and second portion 130 of the evaporator can freeze together, and/or the pod can freeze to the evaporator. The evaporator can be defrosted between cycles to avoid these issues by opening the bypass valve 170, opening the evaporator 108, and turning off the motor 124 (step 282). The machine then diverts gas through the bypass valve for about 1 to 10 seconds to defrost the evaporator (step 284). The machine is programmed to defrost after every cycle, unless a thermocouple reports that the evaporator 108 is already above freezing. The pod can then be removed. The machine 100 then returns to idle mode (step 264). In some machines, a thermometer measures the temperature of the contents of pod 150 and identifies when it is time to dispense the contents of the pod. In some machines, the dispensing mode begins when a predetermined time is achieved. In some machines, a combination of torque required to turn the mixing paddle, temperature of the pod, and/or time determines when it is time to dispense the contents of the pod.

If the idle time expires, the machine 100 automatically powers down (step 272). A user can also power down the machine 100 by holding down the power button (286). When powering down, the processor opens the bypass valve 190 to equalize pressure across the valve (step 288). The machine 100 waits ten seconds (step 290) then turns off the compressor 186 and fans (step 292). The machine is then off.

FIGS. 12A-12D are perspective views of a machine 300. The machine 300 is substantially similar to the machine 100 but has a different mechanism for opening the lid 112 to insert a pod 150 and to connect the driveshaft of the machine 300 to the pod 150.

Figure 12A:
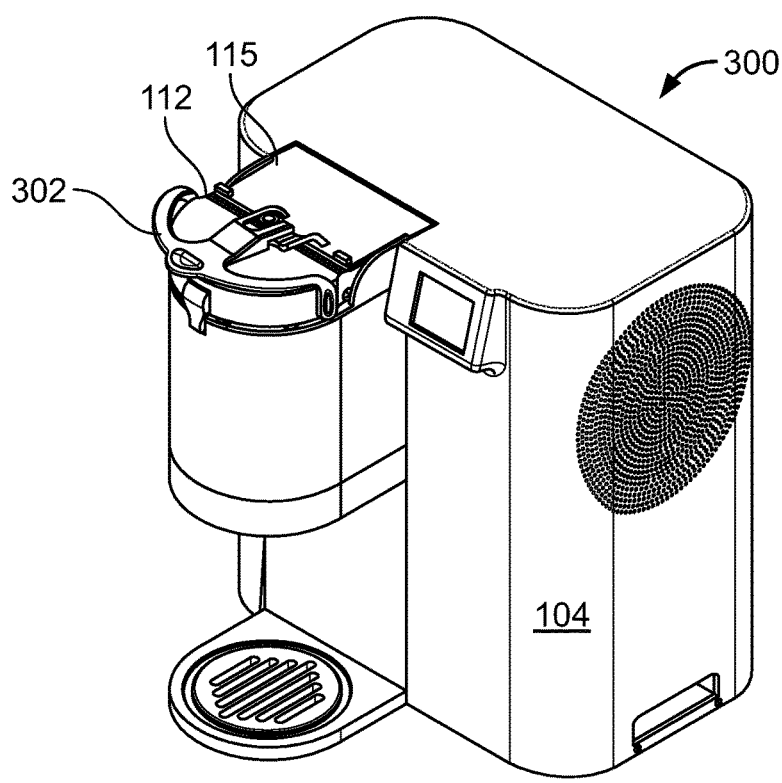
FIGS. 12A-12D are perspective views of a machine for producing cooled food or drinks.
Figure 12B:
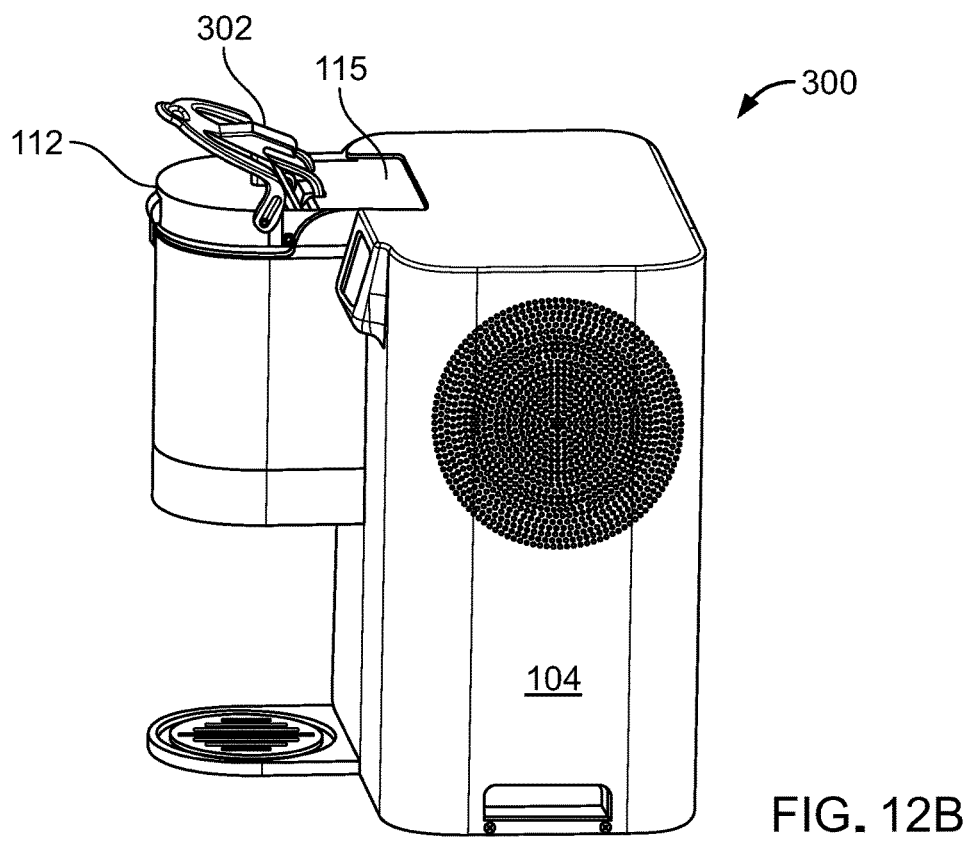

FIG. 12A show the machine 300 with the lid 112 in its closed position. In this position, a handle 302 is flush with the lid 112. FIG. 12B shows the handle 302 raised to an intermediate position. In this position, the lid 112 stills covers the evaporator 108 but, as is explained in more detail with respect to FIGS. 13A and 13B, the driveshaft 126 is raised slightly.

Figure 12C:
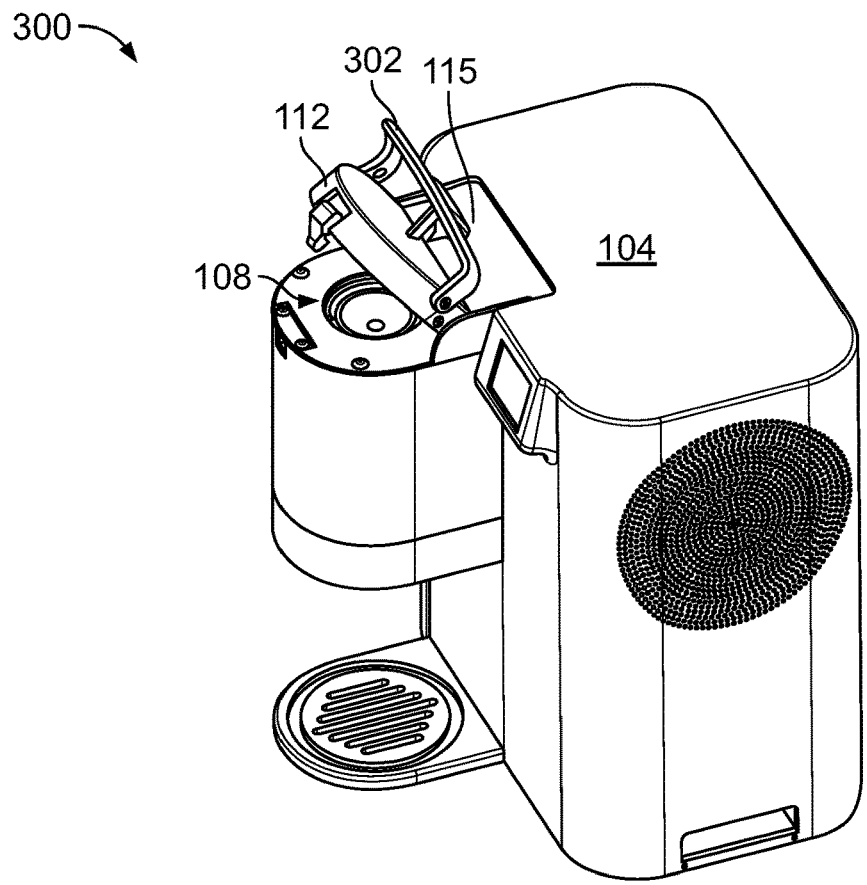
Figure 12D:
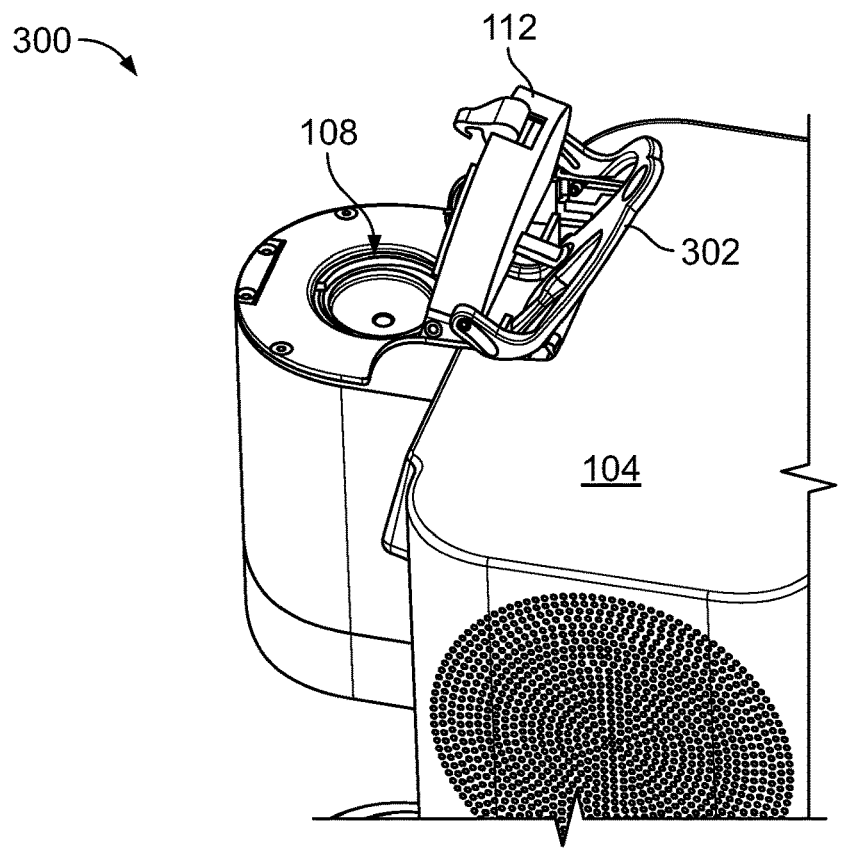

The auxiliary cover 115 of the machine 300 slides back into the housing 104 rather than pivoting like the auxiliary cover 115 of the machine 100. FIG. 12C shows that, as the handle 302 is lifted further, the handle 302 lifts the lid 112 to an open position with the auxiliary cover 115 starting to slide backwards under housing 104. FIG. 12D shows the auxiliary cover 115 fully retracted into the housing 104 leaving space for the handle 302 and the lid 112 to articulate far enough back that a pod 150 can be inserted into the evaporator 108.

Figure 13A:
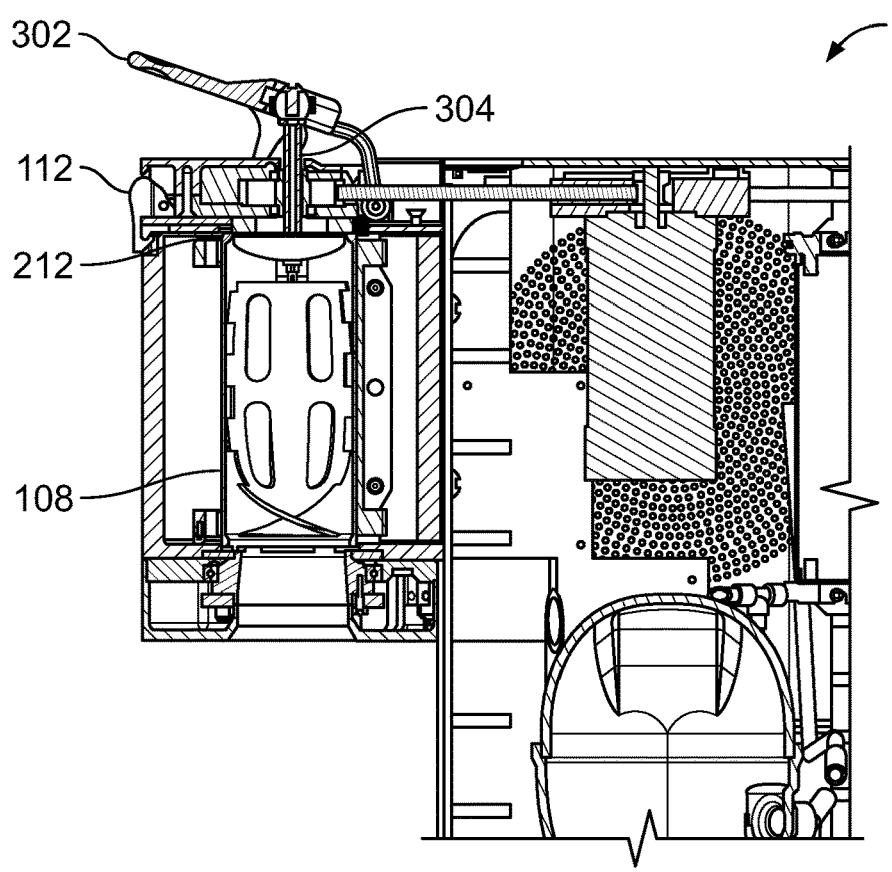
FIGS. 13A and 13B are partial cross-sectional views of the machine of FIGS. 12A-12D.
Figure 13B:
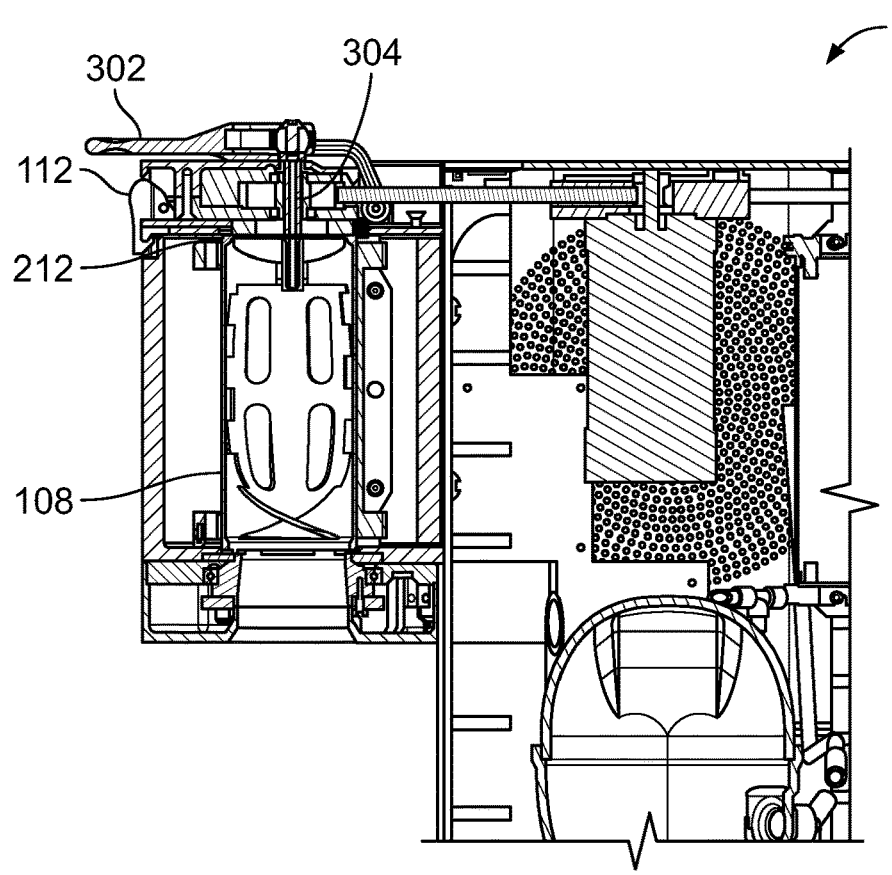

FIGS. 13A and 13B are partial cross-sectional views of the machine 300 illustrating the insertion of a driveshaft 304 into the interior region of the evaporator 108. The driveshaft 304 is attached to the handle 302. As shown in FIG. 13A, the driveshaft 304 is close to but spaced apart from the pod 150 when the handle 302 is in its intermediate position. Moving the handle 302 to its closed position forces the driveshaft 304 through the second end of the pod 150 into engagement with an internal mixing paddle.

Figure 14:
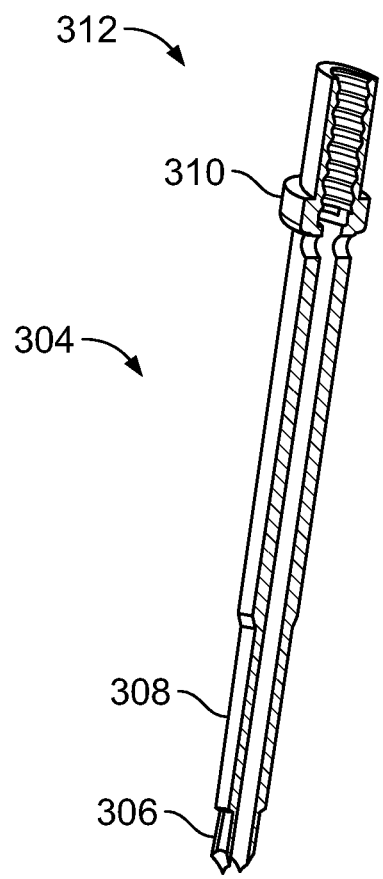
FIG. 14 is a partially cutaway perspective view of a driveshaft.

FIG. 14 is a partially-cutaway perspective view of the driveshaft 304. The driveshaft 304 includes teeth 306, a locking section 308, and a flange 310. The teeth 306 cut through the second end 212 of the pod 150 when movement of the handle 302 to its closed position forces the driveshaft 304 through the second end of the pod 150. In some systems, a sharp edge without teeth is used.

The locking section 308 is received in a bore in the mixing paddle 160. The bore in the mixing paddle 160 and locking section 308 of the driveshaft 304 have matching shapes so rotation of the driveshaft 304 causes rotation of the mixing paddle 160. The driveshaft 304 has a locking section 308 with a square cross-section. Some driveshafts have locking sections with other shapes (e.g., hexagonal or octagonal cross-sections). The flange 310 of the driveshaft 304 is attached to the handle 302. A central bore 312 extends through the driveshaft 304. When the driveshaft 304 is inserted into a pod 150, the central bore 312 of the driveshaft 304 allows air to flow into the pod 150 as cooled food or drink is evacuating/dispensing out the other end of the pod 150. Some driveshafts are made of solid material.

In some machines, the driveshaft 304 is configured so that the piercing/distal end of the driveshaft 304 is wider in diameter than the central portion of the driveshaft 304 so that the hole created in the aluminum pod is wider than the diameter of the central part of driveshaft 304. This configuration reduces the likelihood that the central portion of the driveshaft touches the pod while rotating. In addition, the driveshaft 304 may be coated with self-cleaning and/or hydrophobic coatings that reduce the amount of pod ingredients that adhere to driveshaft 304.

Figure 15:
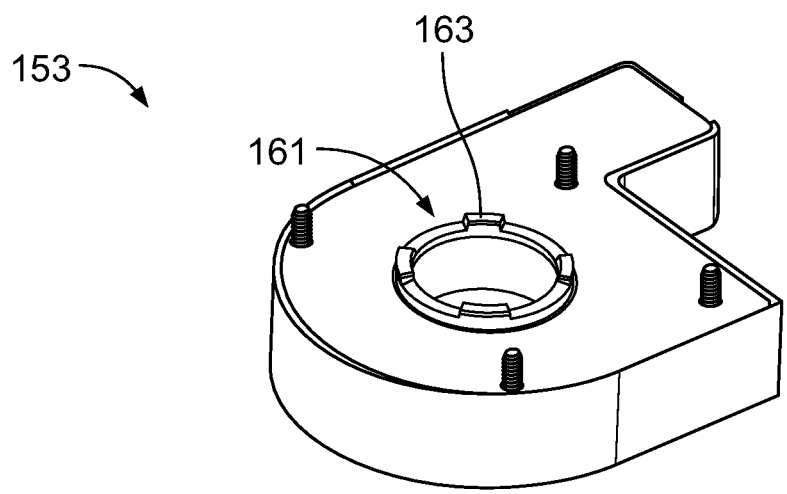
FIG. 15 is a perspective view of a dispenser.

FIG. 15 is a perspective view of the dispenser 153 of the machine 300. The protrusions 163 of the annular member 161 are rectangular-shaped rather than dowel shaped. The dispenser 153 is otherwise substantially the same as the dispenser 153 of the machine 100.

Some machines implement other approaches to the pod-machine interface than the machine 100. For example, some machines have a pod-machine interface that is movable relative to the body of the machine to expose the receptacle defined by the evaporator. A loading system can control the position of the pod-machine interface relative to the body of the machine. In some of these machines, the lid is fixed in position relative to the body of the machine.

Figure 16A:
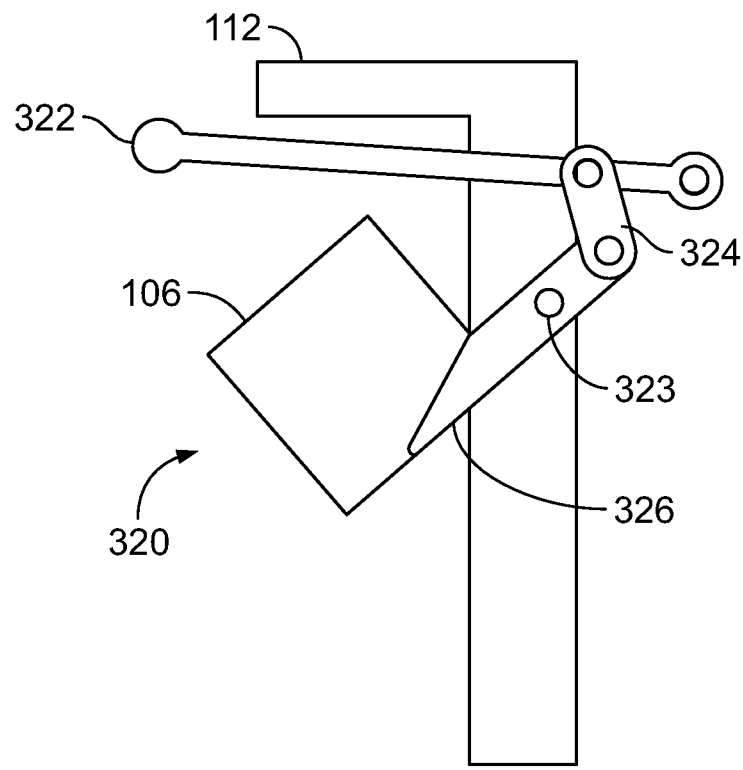
FIGS. 16A and 16B are schematic side views of a system that moves the evaporator to allow for pod loading into the evaporator.
Figure 16B:
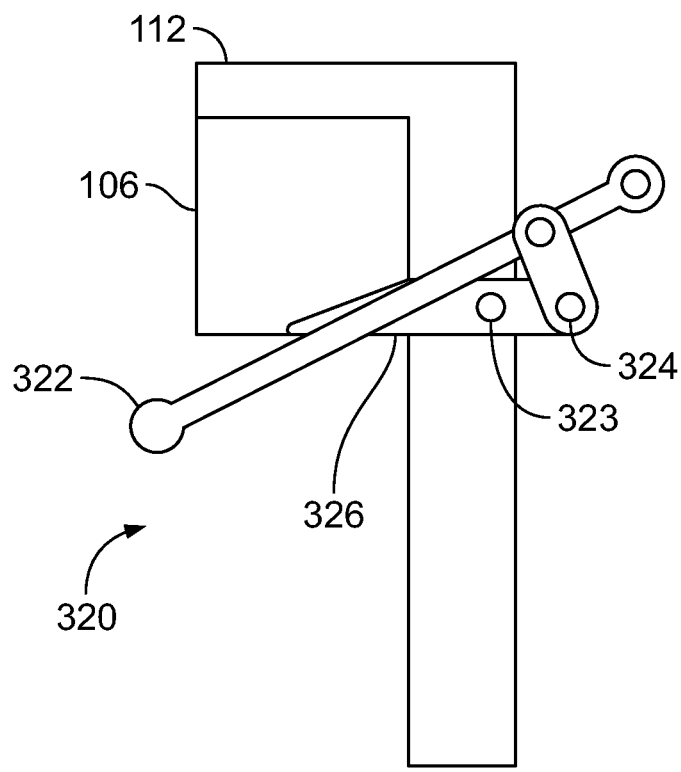

FIGS. 16A and 16B are schematic side views of a loading system 320 for moving the pod-machine interface 106 while keeping the lid 112 fixed in position relative to the body of the machine. In some loading systems, the lid rotates away from the pod-machine interface and the evaporator rotates away from the lid. FIG. 16A shows the loading system 320 in its open position while FIG. 16B shows the loading system 320 in its closed position. For ease of viewing, the loading system 320 is shown in isolation from the rest of the associated machine.

The loading system 320 includes a handle 322 that is part of a three-bar linkage attached to the pod-machine interface 106. A second bar 324 extends between and is pivotably attached to the handle 322 and a support bar 326. The handle 322 and the support bar 326 of the linkage both pivot around pins 323 mounted on the housing.

The pod-machine interface 106 is mounted on the support bar 326. Raising and lowering the handle 322 moves the pod-machine interface 106 between its open position, as shown in FIG. 16A, and its closed position, as shown in FIG. 16B.

Figure 17A:
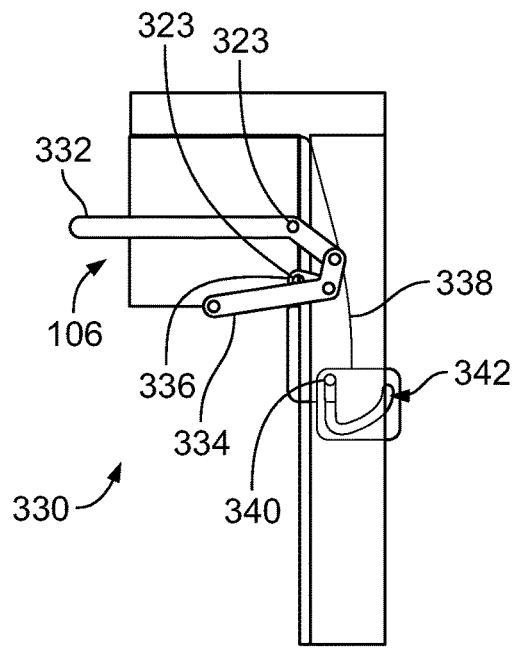
FIGS. 17A, 17B, and 17C are schematic side views of a system that moves the evaporator to allow for pod loading into the evaporator.
Figure 17B:
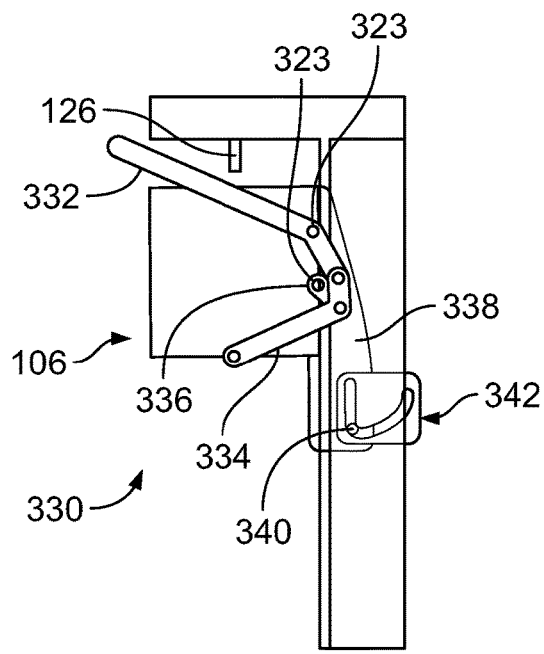
Figure 17C:
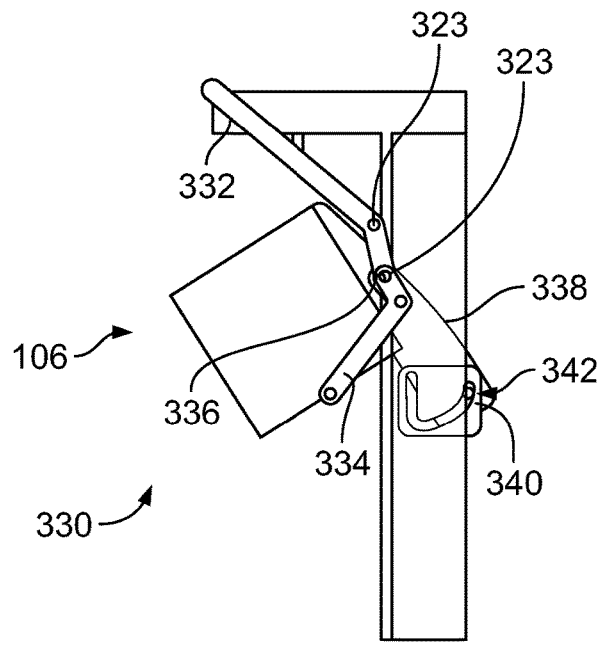

FIGS. 17A, 17B, and 17C show a loading system 330 in its closed position, in its transition position, and in its open position respectively. In the transition position, the driveshaft 126 of the machine is separated from the pod-machine interface 106 before the pod-machine interface 106 is pivoted.

The loading system 330 includes a handle 332 that is part of a three-bar linkage attached to the pod-machine interface 106. A support bar 334 extends between and is pivotably attached to the handle 332 and the pod-machine interface 106. The handle 332 and the support bar 334 both have generally "L" shaped configurations. A third bar 336 is pivotably attached to the support bar 334. The handle 332 and the third bar 336 of the linkage both pivot around pins 323 mounted on the housing.

The pod-machine interface 106 includes an extender 338 with pin 340 that rides along a guide track 342. The guide track 342 causes the pod-machine interface 106 to pivot as the handle is raised and lowered.

When the loading system 330 is in its closed position (FIG. 17A), raising the handle 332 lowers the pod-machine interface 106 without rotation until the loading system 330 is in its intermediate position (FIG. 17B). Continuing to raise the handle 332 drives the pin 340 of the extender 338 along the guide track 342 lowering and rotating the pod-machine interface 106 to facilitate insertion or removal of a pod.

Figure 18A:
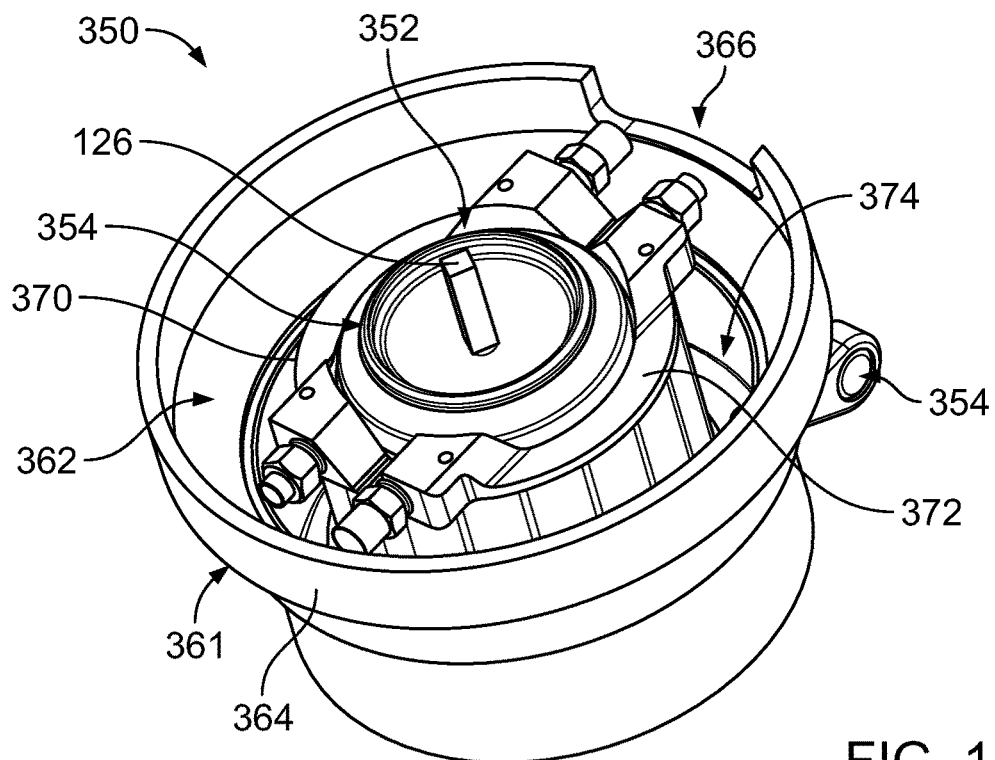
FIGS. 18A-18C are schematic perspective, cross-sectional, and top-down views of a pod-machine interface with an evaporator receiving a pod.
Figure 18B:
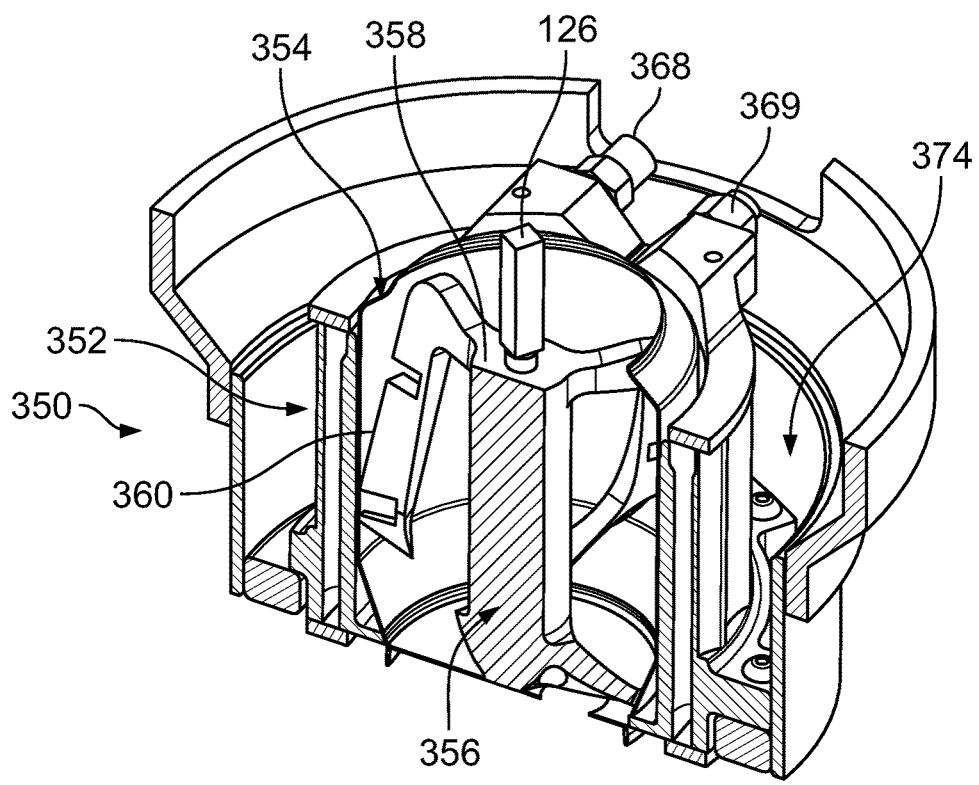
Figure 18C:
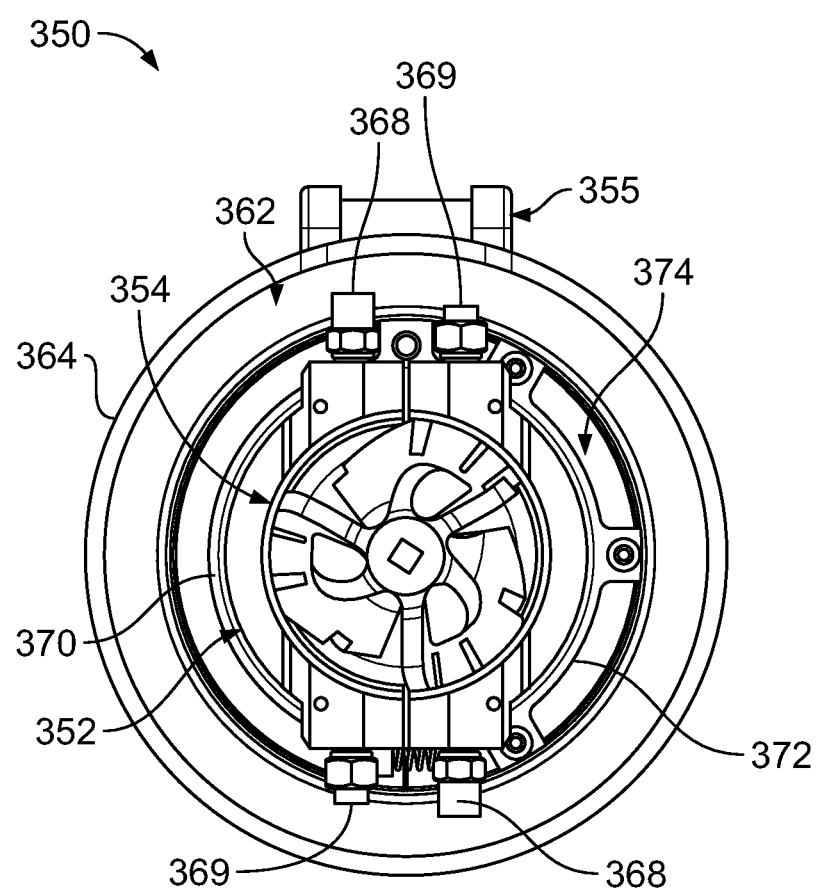

FIGS. 18A-18C are schematic perspective, cross-sectional, and top-down views of a pod-machine interface 350 with an evaporator 352 receiving a pod 354. The pod-machine interface 350 has a bore 355 for hingably attaching the pod-machine interface 350 to the body of a machine for rapidly cooling food or drinks. The driveshaft 126 is the only component of the machine shown.

The evaporator 352 is in its closed position holding the pod 354. The driveshaft 126 engages with the pod 150 to rotate the mixing paddle 356. The mixing paddle 356 is a three-blade paddle with blades that have large openings adjacent a stem 358 of the paddle 356. The angle of inclination of the blades 360 relative to a plane extending along an axis of pod 354 varies with distance from the end of the pod 354. The outer edges of the blades 360 define slots that can receive a rim of the pod 354 during assembly.

The pod-machine interface 350 includes a housing 361 with a ledge 362 and a wall 364 that extends upward from the ledge 362. The ledge 362 and the wall 364 guide and support refrigerant fluid lines (not shown) attached to the evaporator 352. The fluid lines extend from a recess 366 is defined in the wall 364 to an inlet port 368 and an outlet port 369 of the evaporator 352 on the side of the evaporator 352 opposite the recess 366. The evaporator 352 has two inlet ports 368 and two outlet ports 369 (labeled on FIGS. 18B and 18C) because a first portion 370 of the evaporator 352 and a second portion 372 of the evaporator 352 define two separate flow paths.

The evaporator 352 is disposed in the pod-machine interface 350 such that an annular space 374 is defined between the outer wall of the evaporator 352 and the inner wall of the casing of the pod-machine interface 350. The annular space 374 is filled with an insulating material to reduce heat exchange between the environment and the evaporator 108. In the pod-machine interface 350, the annular space 374 is filled with an aerogel (not shown). Some machines use other insulating material, for example, an annulus (such as an airspace), insulating foams made of various polymers, or fiberglass wool.

Figure 19A:
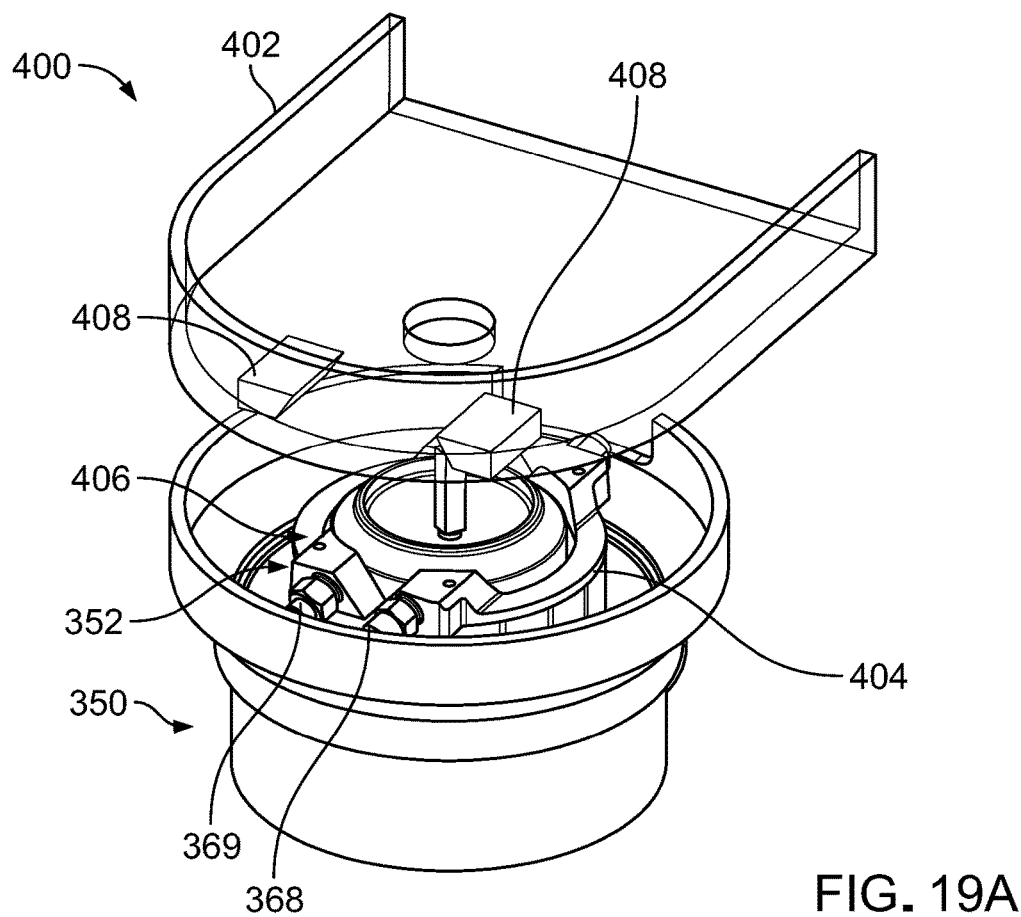
FIGS. 19A-19C are schematic views that illustrate a wedge system associated with the pod-machine interface.
Figure 19B:
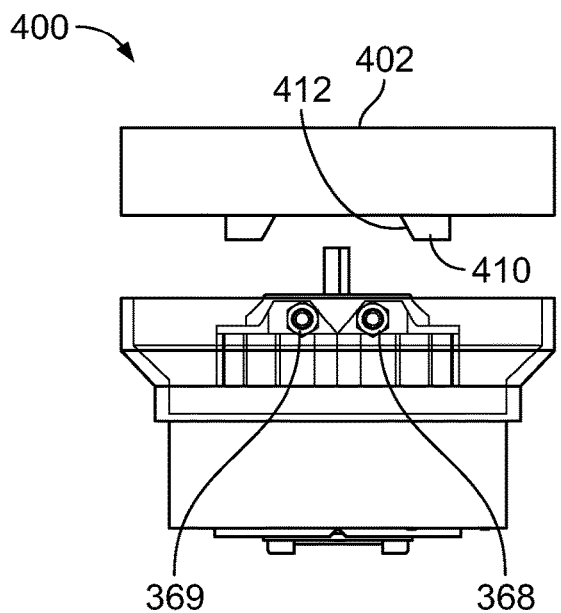
Figure 19C:
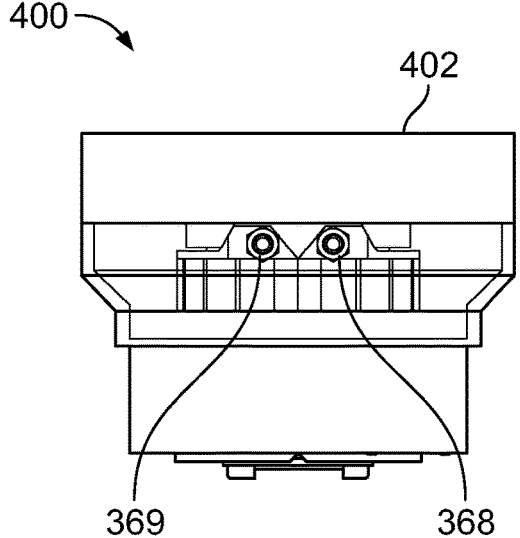

FIGS. 19A-19C illustrate a wedge system 400 associated with the pod-machine interface 350 that uses a lid 402 to clamp the evaporator 352 around the pod 354. FIGS. 19A and 19B are, respectively, a schematic perspective view and a schematic side view of the pod-machine interface 350 with the lid 402 spaced apart from the evaporator. For example, this position can be the functional equivalent of the intermediate position shown in FIG. 17B. FIG. 19C is a schematic side view of the pod-machine interface 350 engaged with the lid 402 in the closed position.

Each side of the evaporator 352 has a manifold 404 that connects channels inside the walls of the evaporator 352 with the inlet ports 368 and the outlet ports 369. The manifold 404 has sloped portions 406 near the inlet ports 368 and the outlet ports 369. The lid 402 has wedges 408 on the side facing the evaporator 352. The wedges 408 have a flat surface 410 and a sloped surface 412. When the pod-machine interface 350 engaged with the lid 402 (e.g., by movement of a lid towards a fixed position evaporator or by movement of an evaporator towards a fixed position lid), the wedges 408 on the lid 402 contact the sloped portions 406 of the manifold 404. The movement applies force to the sloped portions 406 of the manifold 404 on the evaporator and clamps the first portion 370 and the second portion 372 of the evaporator 352 closed around the pod 354 for a tight fit. Latching the lid 402 closed maintains this tight fit.

The loading mechanisms previously described receive a pod by inserting the pod into the receptacle from the top of the pod-machine interface. Some machines load pods from the bottom of the pod-machine interface.

Figure 20A:
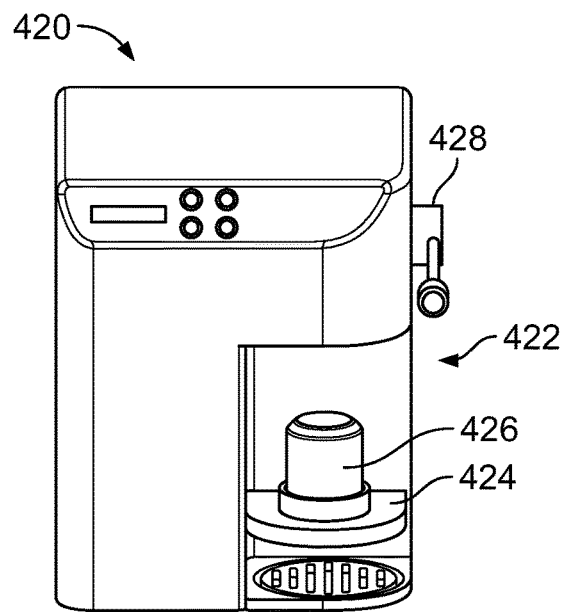
FIGS. 20A-20D are perspective views of a machine with a loading system 422 that incorporates an elevator platform.
Figure 20B:
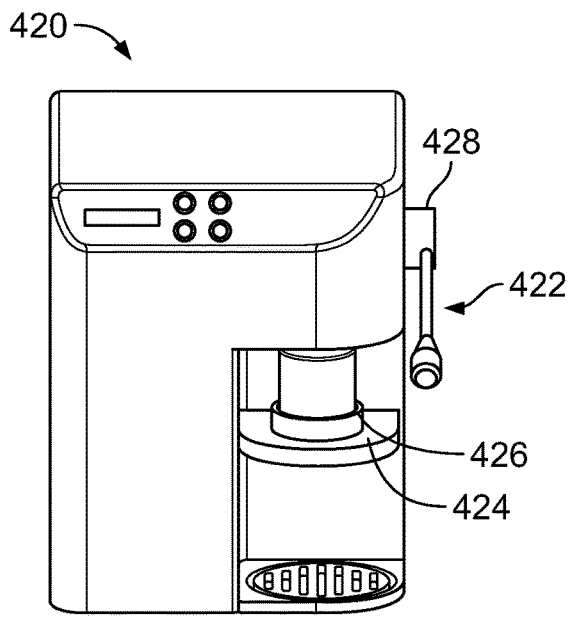
Figure 20C:
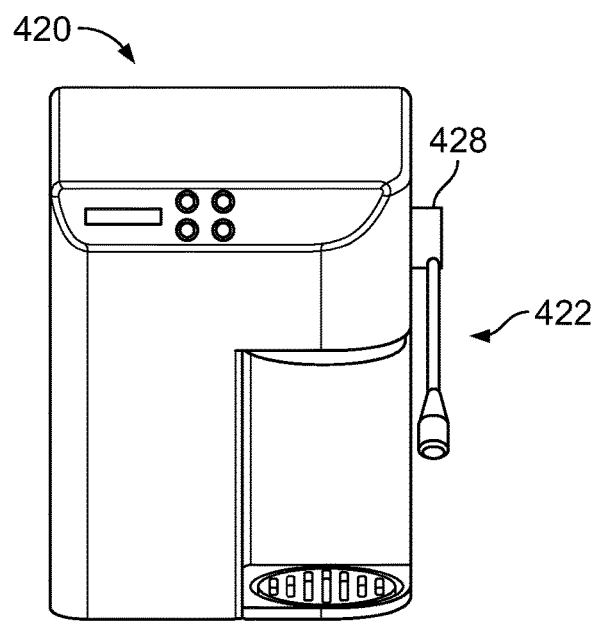
Figure 20D:
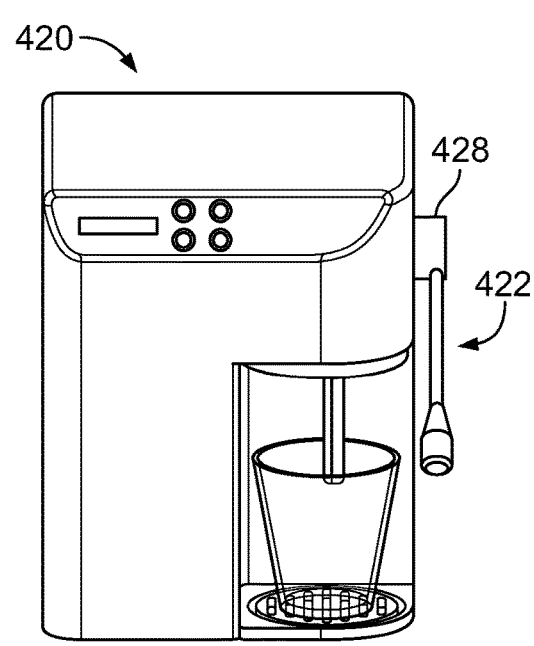

FIGS. 20A-20D are perspective views of a machine 420 incorporating a loading system 422 with an elevator platform 424. A pod 426 is placed on the elevator platform 424 (FIG. 20A). The loading system includes a handle 428 that is pulled down to raise the elevator platform 424 (FIG. 20B). After the elevator platform 424 closes the evaporator (not shown) with the pod 426 inside the evaporator, the machine 420 is operated to cool and mix the ingredients in the pod 426 (FIG. 20C). After production, the food or drink is dispensed from the machine 420 (FIG. 20D). Although elevator platform 424 is controlled by the handle 428, some machines use other systems, for example, an electric motor to move the elevator platform 424.

Figure 21A:
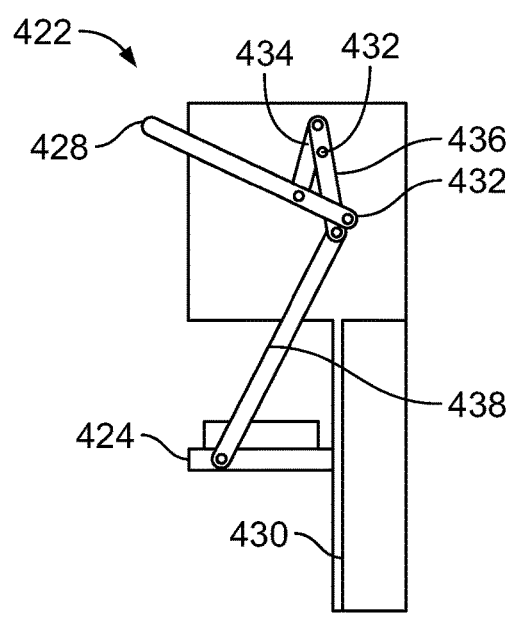
FIGS. 21A and 21B are schematic side views of a pod loading system.
Figure 21B:
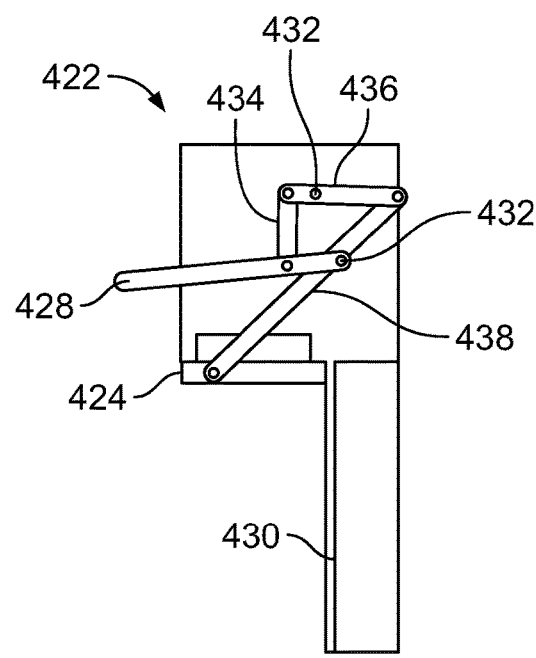

FIGS. 21A and 21B are schematic side views of one embodiment of the loading system 422. In this embodiment, the elevator platform 424 is mounted on and slides along rails 430. The handle 428 is part of a four-bar linkage attached to the elevator platform 424. A second bar 434 of the linkage extends between and is pivotably attached to the handle 428 and a third bar 436 of the linkage. The third bar 436 of the linkage extends between and is pivotably attached to the second bar 434 and a fourth bar 438 of the linkage. A fourth bar 438 of the linkage extends between and is pivotably attached to the third bar 436 of the linkage and the elevator platform 424. The handle 428 and the third bar 436 of the linkage both pivot around pins 432 mounted on the housing of the pod-machine interface. Pushing down on the handle 428 raises the elevator platform 424 and pulling up on the handle 428 lowers the elevator platform 424.

Figure 22A:
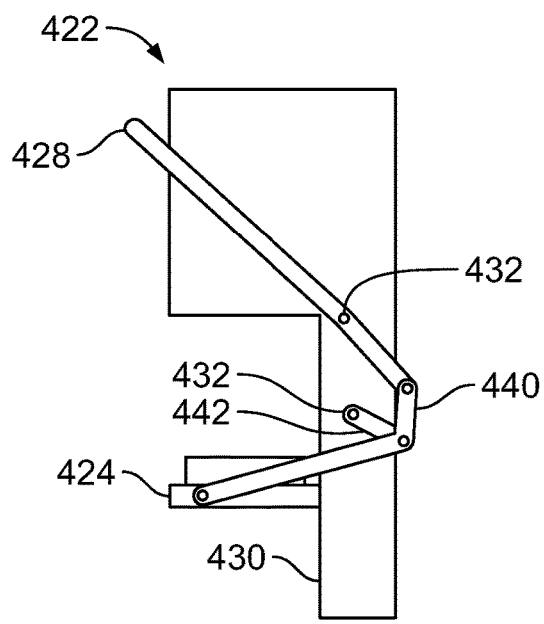
FIGS. 22A and 22B are schematic side views of a pod loading system.
Figure 22B:
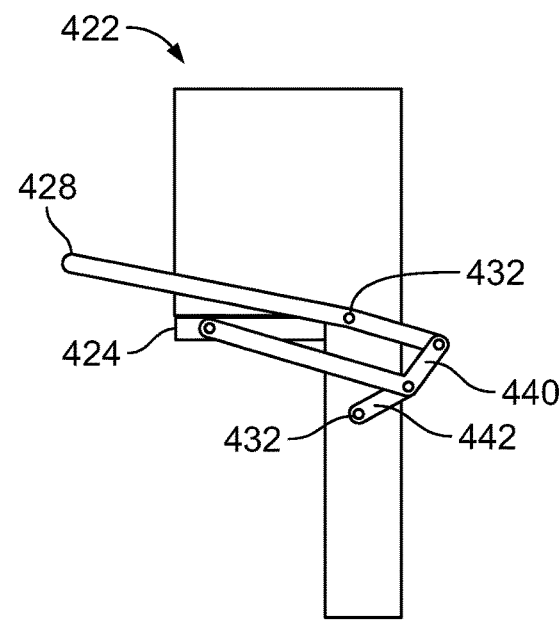

FIGS. 22A and 22B are schematic side views of another embodiment of the loading system 422. The elevator platform 424 is mounted on and slides along rails 430. In this embodiment, the handle 428 is part of a three-bar linkage attached to the elevator platform 424. A second bar 440 of the linkage extends between and is pivotably attached to the handle 428 and the elevator platform 424. The third bar 442 of the linkage extends between and is pivotably attached to the pin 432 and the second bar 440. The handle 428 and the third bar 442 of the linkage both pivot around pins 432 mounted on the housing of the pod-machine interface. Pushing down on the handle 428 raises the elevator platform 424 and pulling up on the handle 428 lowers the elevator platform 424.

Figure 23A:
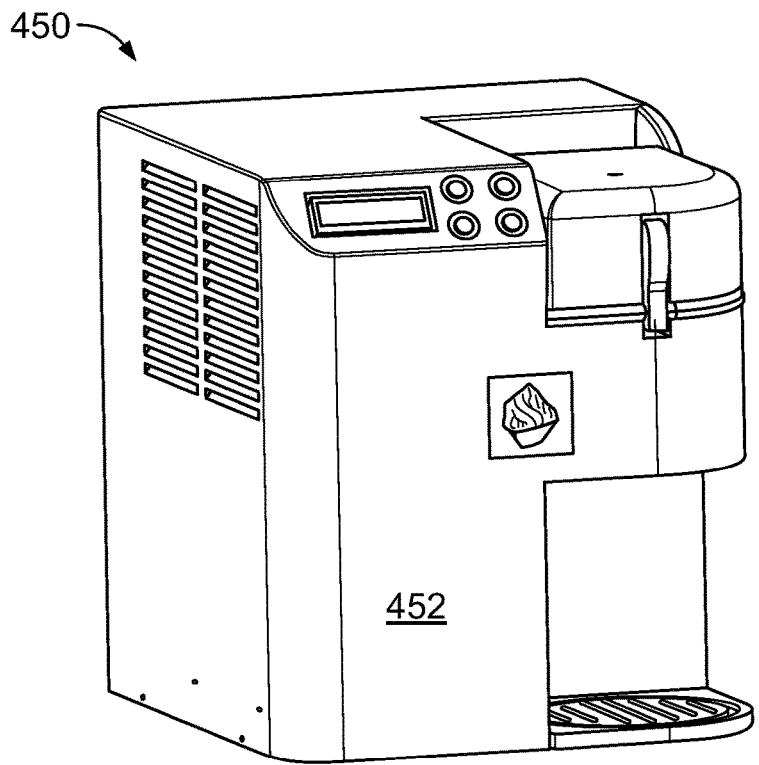
FIGS. 23A and 23B are perspective views of a machine for producing cooled food or drinks.
Figure 23B:
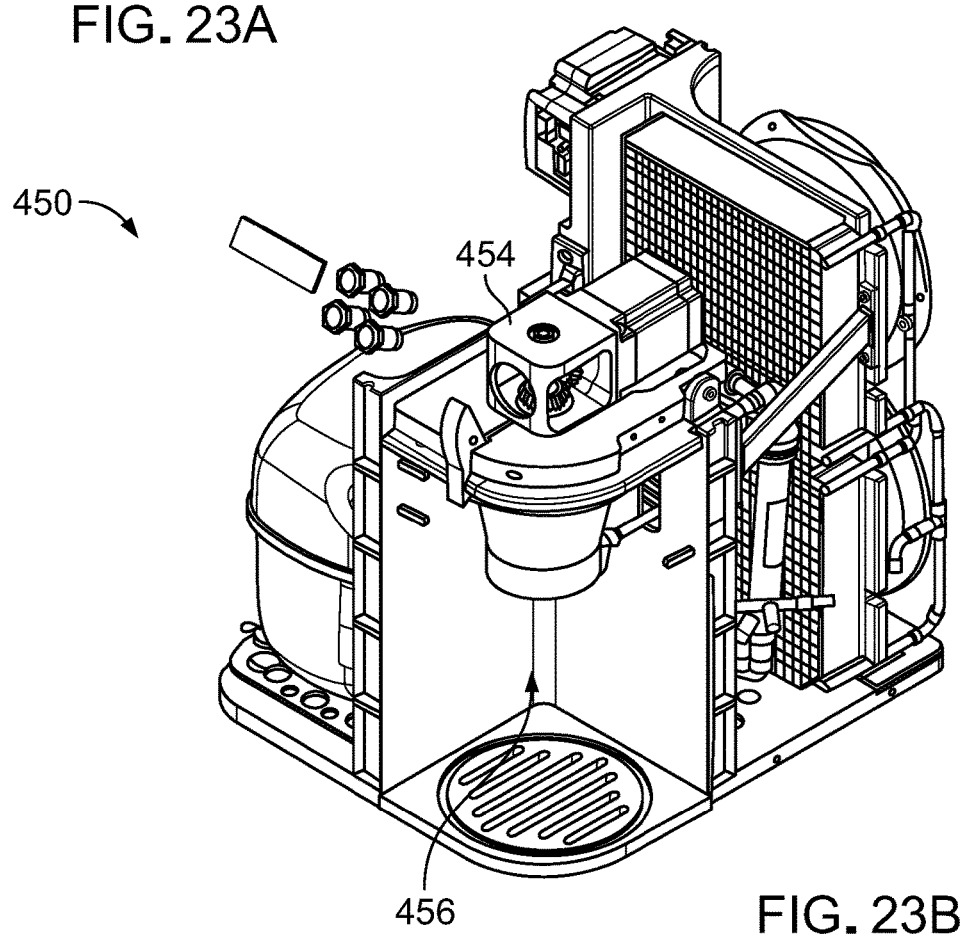

FIGS. 23A and 23B are perspective views of a machine 450 that is substantially similar to the machine 100 shown in FIG. 1. The machine 450 is shown with (FIG. 23A) and without (FIG. 23B) a housing 452. The machine 450 was a prototype that demonstrated the ability to freeze room-temperature pods in less than 90 seconds. In the machine 450, a motor 454 to rotate mixing paddles is mounted on the pod-machine interface 456 rather than in the body of the machine 450. This configuration provides for less complicated mechanical connections between the motor and the driveshaft than are used in the machine 100. However, machines with this configuration tend to have a greater overall height than machines configured like the machine 100.

Figure 24A:
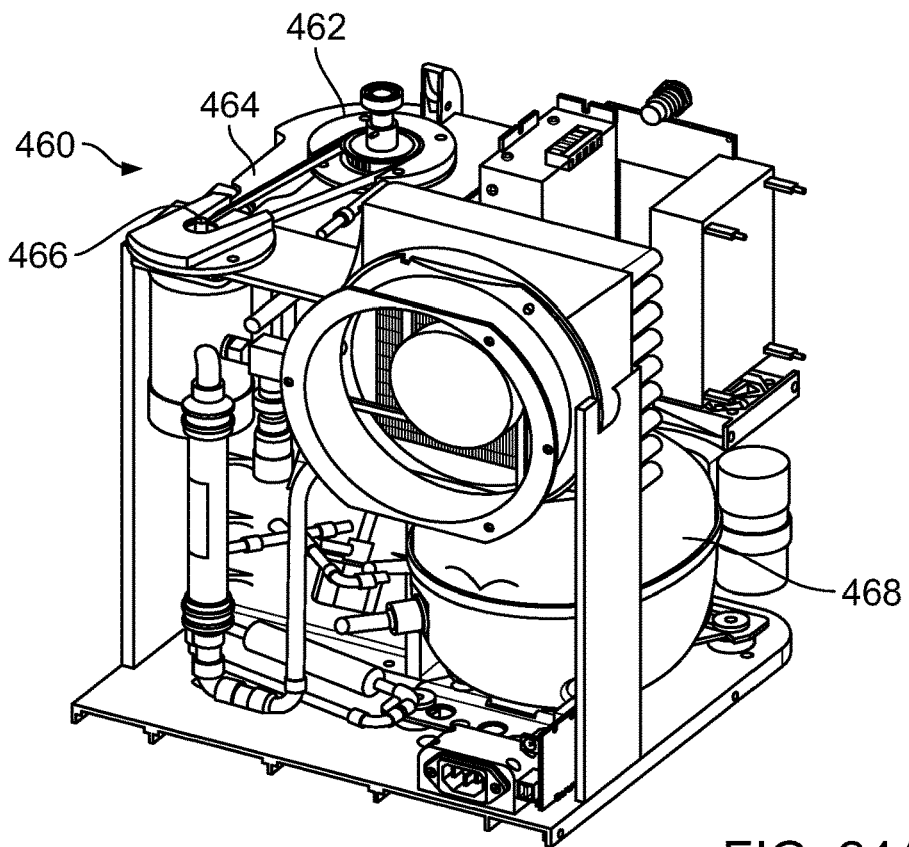
FIGS. 24A and 24B are perspective views of a machine for producing cooled food or drinks.
Figure 24B:
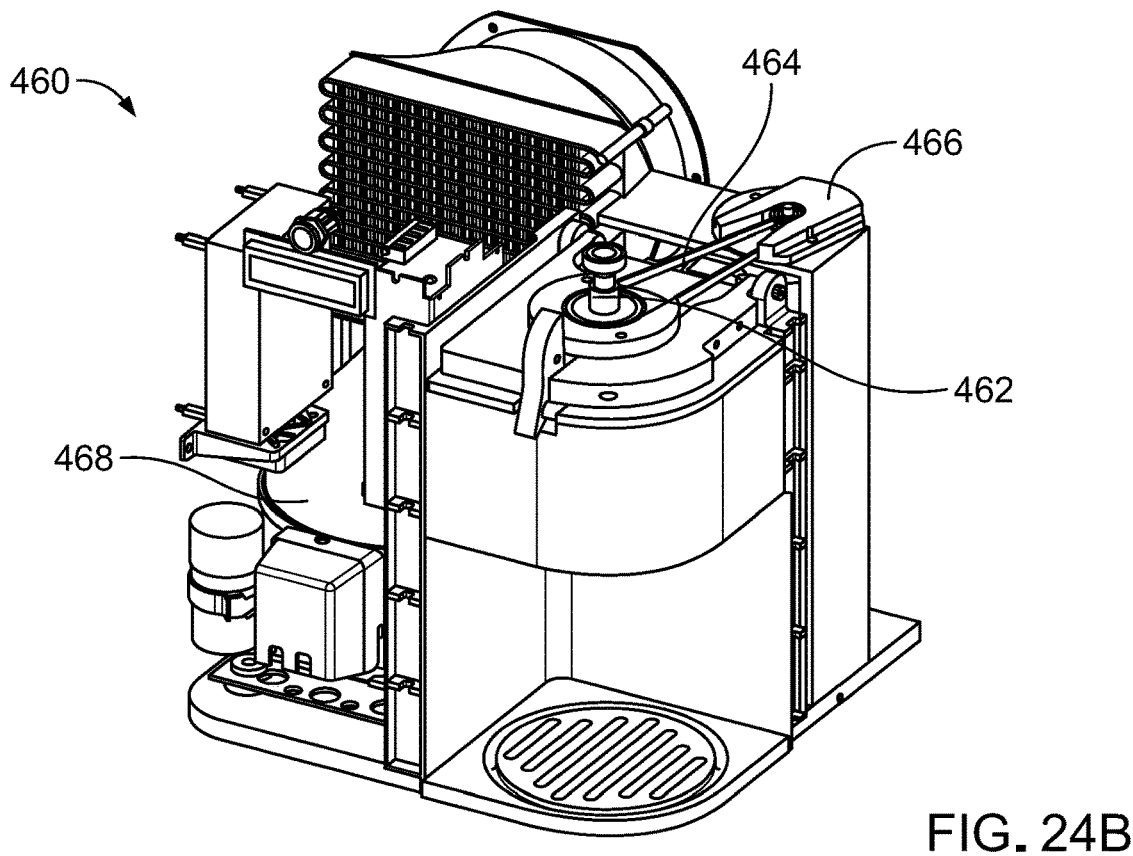

FIGS. 24A and 24B are front and back perspective views of a machine 460 shows the internal components of the machine 460 without its housing. The housing may be similar to the housing 104 shown in FIG. 1A or the housing 452 shown in FIG. 28A. The machine 460 is substantially similar to machine 100 and machine 450. The machine 460 has a motor 462 that is disposed in the body of the machine rather than in the lid of the machine 460. A belt 464 connects the motor 462 connects to a driveshaft 466. The machine 460 also includes a compressor 468.

Figure 25A:
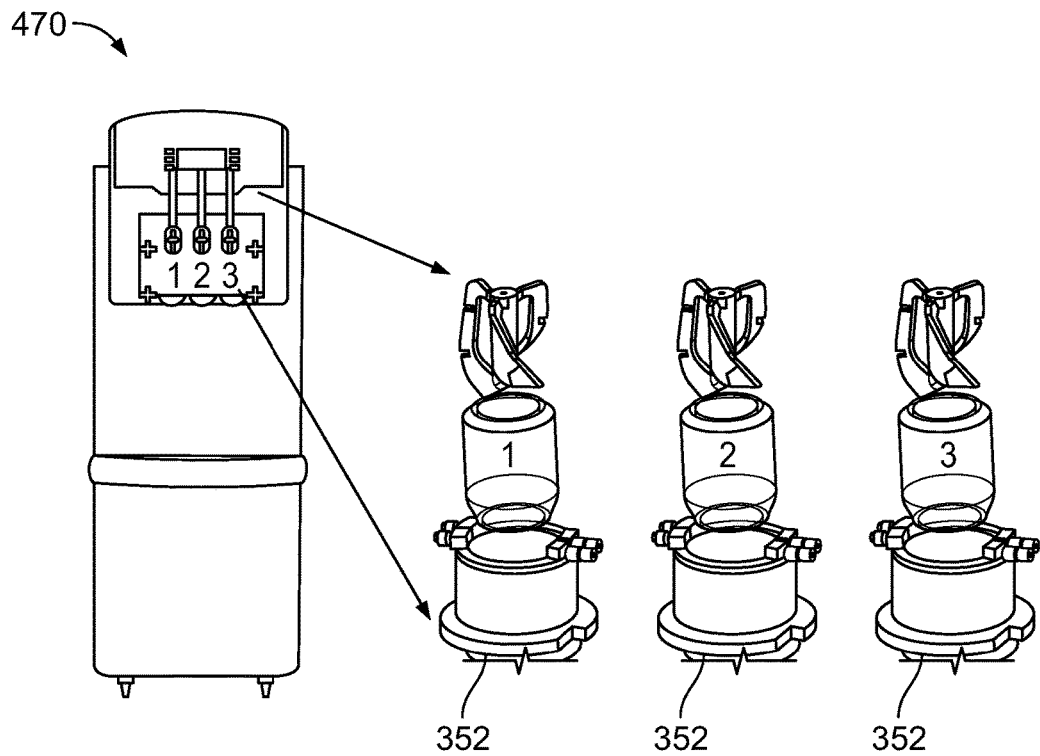
FIGS. 25A and 25B are schematic views of a machine with three evaporators.
Figure 25B:
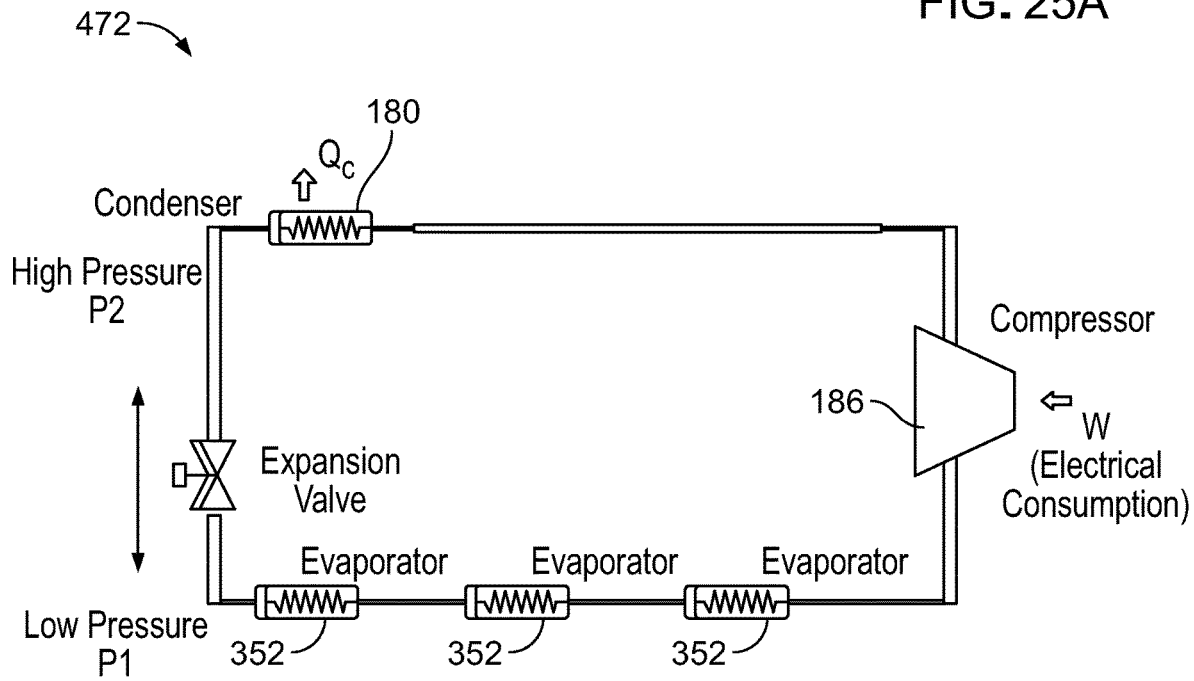

FIG. 25A is a schematic view of a machine 470 with three evaporators. FIG. 25B is a flow diagram of the refrigeration cycle 472 for the machine 470. The machine 470 is shown with the evaporators 352 described in more detail with respect to FIGS. 18A-18C. Some multiple evaporator machines use other evaporators, for example, the evaporators 108 described with respect to FIGS. 2A-2D. Other evaporators that can be used with this and other machines are described in more detail in U.S. patent application Ser. No. 16/459,388 filed contemporaneously with this application and incorporated herein by reference in its entirety.

Some multiple evaporator machines have more or fewer evaporators than the machine 470. The three evaporators 352 of the refrigeration cycle 472 of the machine 470 are in series with a compressor 186 and a condenser 180. Each evaporator 352 can operate independently of the other evaporators.

Figure 26A:
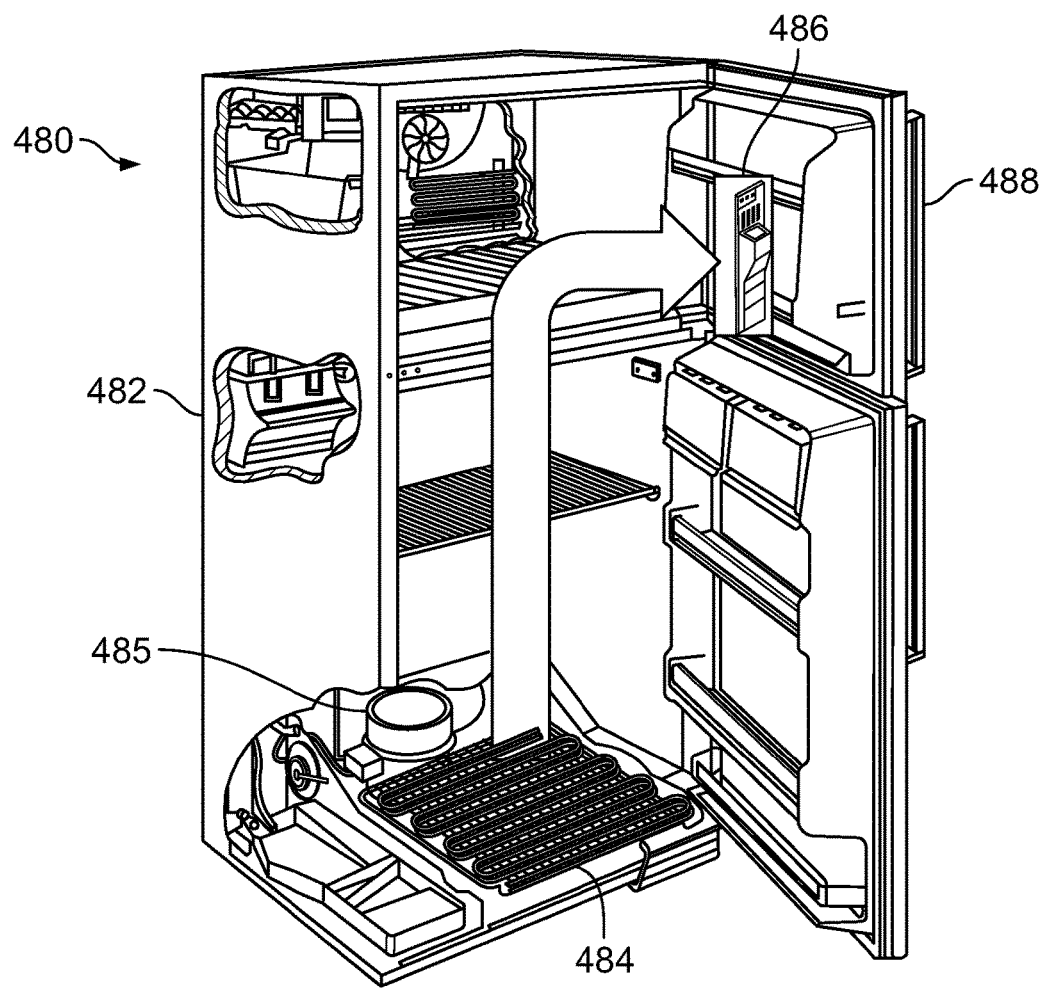
FIGS. 26A and 26B are schematic views illustrating a system for producing a cooled beverage or food product using the refrigeration system of a refrigerator.
Figure 26B:
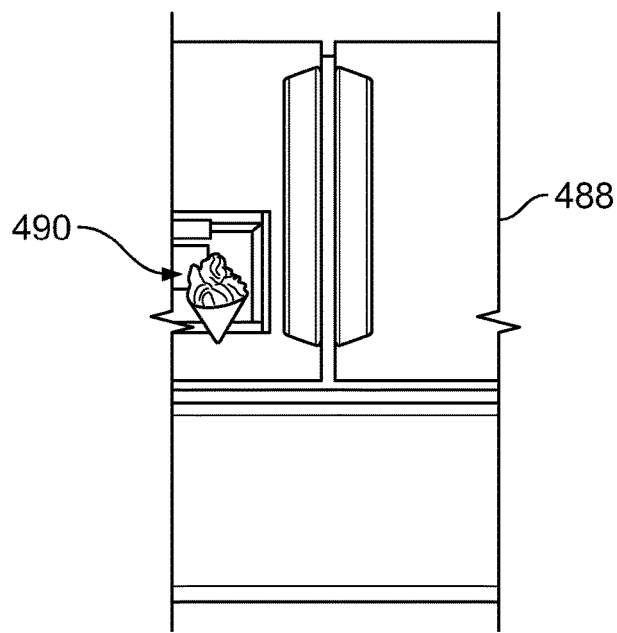

FIGS. 26A and 26B are schematic views illustrating a system 480 for producing a chilled or frozen beverage or food product using the refrigeration system of a refrigerator 482. The system 480 can also be incorporated in a freezer. The system 480 provides a fluid connection between condenser coils 484 and compressor 485 of the refrigerator 482 and an evaporator 486 disposed in the door 488 of the refrigerator 482. The user may insert a pod into the evaporator 486 in the inside of the refrigerator 482. The dispensing mechanism 490 is integrated with the door so that when the contents of the pod is frozen, the user can press a lever with a cup or bowl and the pod will dispense the frozen or chilled beverage or food product.

Figure 27A:
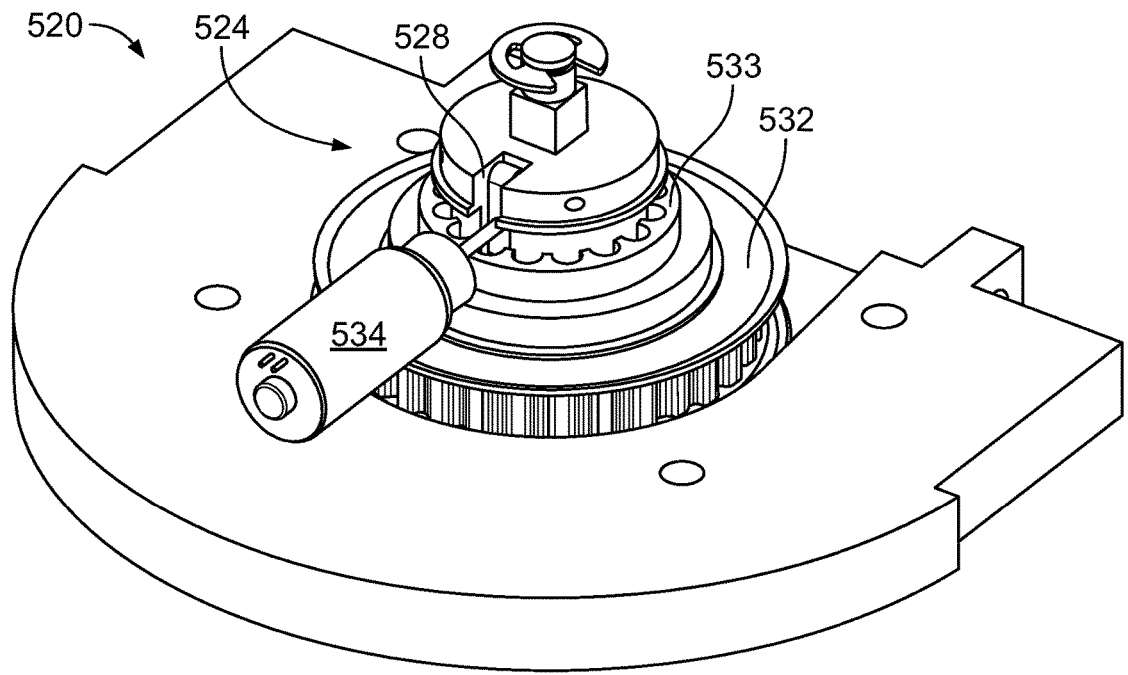
FIGS. 27A-27C are schematic views of a lid with a telescoping driveshaft.
Figure 27B:
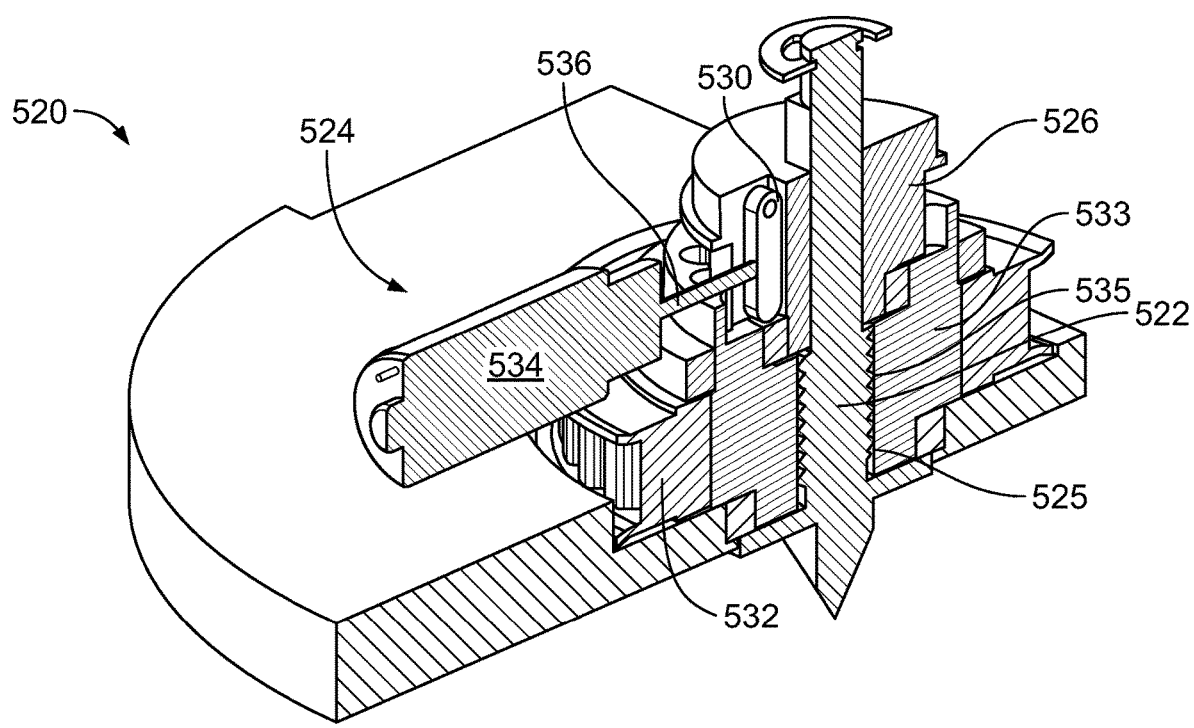
Figure 27C:
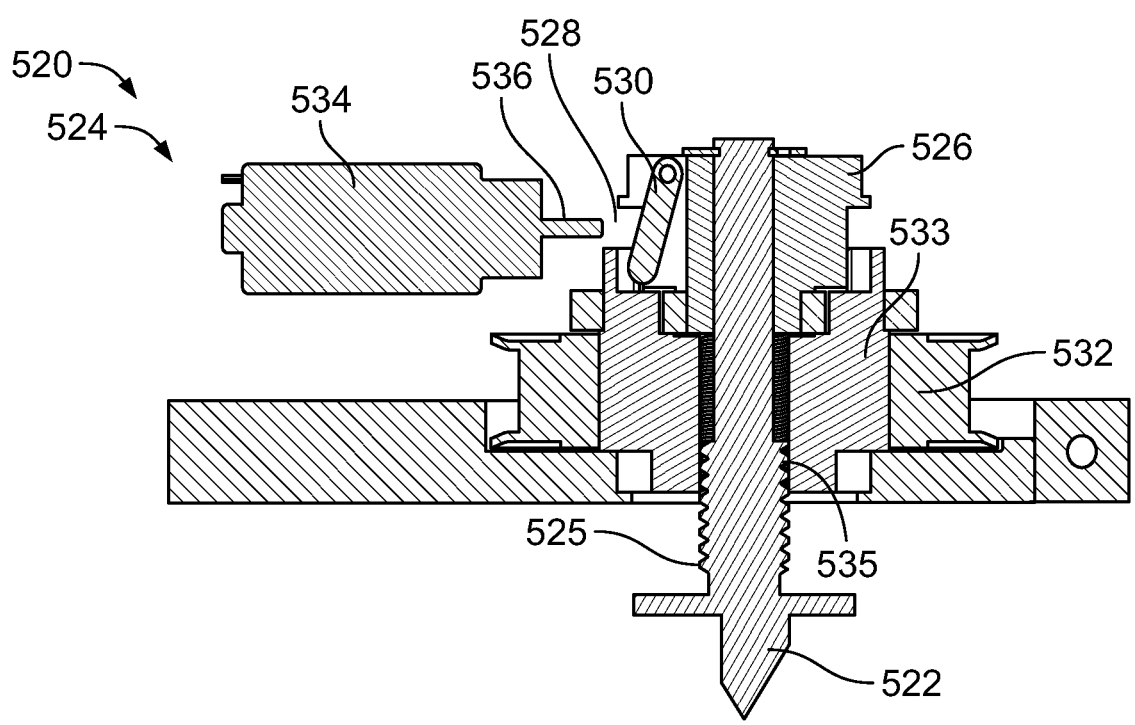

FIGS. 27A-27C are perspective and cross-sectional views of a lid 520 with an extendable driveshaft 522. The lid 520 is configured so that rotation of a handle around an axis of the driveshaft 522 moves the driveshaft towards and away from a pod. For ease of description, movement of the driveshaft is described as vertically upwards or downwards relative to the orientation of the illustrated system. However, the translational motion of the driveshaft depends on the orientation of the system and is not necessarily vertical.

The lid 520 includes components of a system 524 for extending or retracting the driveshaft 522. A portion of the driveshaft 522 includes threads 525 on an outside surface. An annular member 526 defines a central bore and a notch 528. The annular member 526 receives the driveshaft 522 in the central bore. The driveshaft 522 is rotationally coupled to the annular member 526 but is free to translate relative to the annular member 526 along an axis of the central bore.

The annular member 526 is received in the inner component 533 of a gear wheel 532. The inner component 533 has inwardly extending teeth (best seen on FIG. 27A). The teeth of the inner component 533 are adjacent the notch 528 defined by the annular member. The internal component 533 also has internal threads 535 that engage the external threads 525 of the driveshaft 522. The gearwheel 532 is connected to a motor (not shown) via a drive belt (not shown).

A lock 530 is hingably mounted in the notch 528. The lock 530 is biased towards the locked position shown in FIG. 27C by a spring (not shown). Some locks are made of resilient materials such that the shape of the resilient material biases the lock towards its locked position. The system 524 also includes a solenoid 534 that has a rod 536 that is aligned with the lock 530. The solenoid is mounted to other components of the machine and fixed in position. The solenoid 534 is energized and de-energized by a power source. When energized, the solenoid 534 extends the rod 536 into the notch 528 of the annular member 526 to move the lock 530 from its locked position (see FIG. 27C) to its unlocked position (see FIG. 27B).

In its locked position, the lock 530 engages the teeth of the inner component 533 so that rotation of the gear wheel 533 rotates the annular member 526 and the driveshaft 522. In the absence of relative motion between the driveshaft 522 and the inner component 533 of the gear wheel 532, rotation of the gear wheel 532 does apply upward or downward force to the driveshaft. Rather rotation of the gear wheel 532 rotates the annular member 526 and the driveshaft 522 and rotation of the driveshaft 522 rotates the mixing paddle if a pod is engaged.

In its unlocked position, the lock 530 is disengaged from the teeth of the inner component 533 by the rod 530. The rod 530 keeps the inner component 533 and the driveshaft from rotating. Due to the engagement between the internal threads 535 of the internal component 533 and the external threads 525 of the driveshaft 522, rotation of the internal component 533 applies an upward or downward force on the driveshaft depending on the direction of rotation.

Figure 28A:
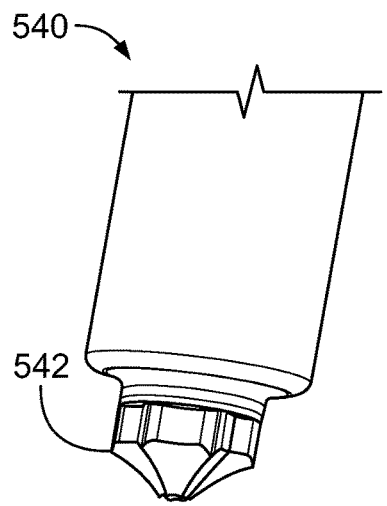
FIGS. 28A-28C are schematic views of a driveshaft with a barbed head and a matching recess on a mixing paddle.
Figure 28B:
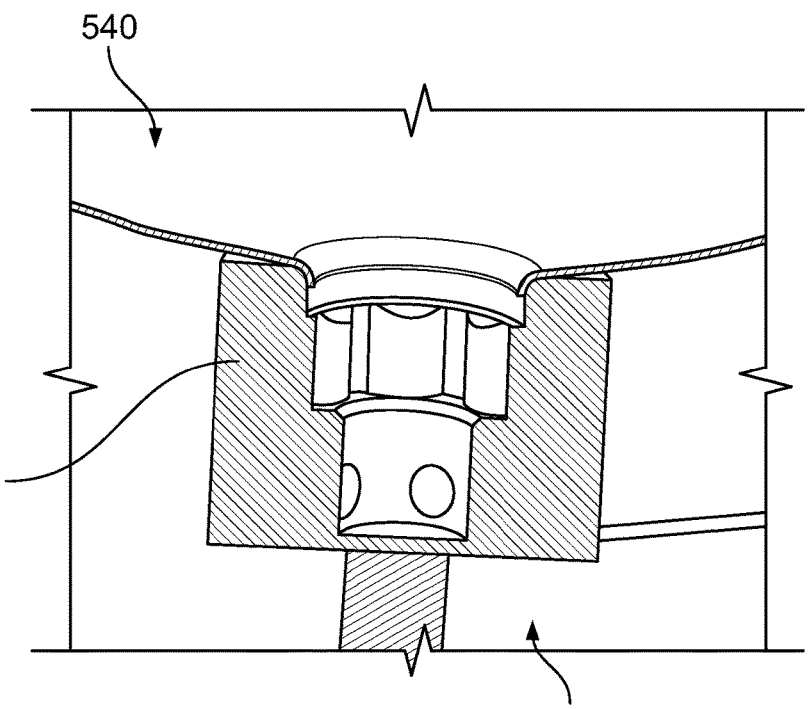
Figure 28C:
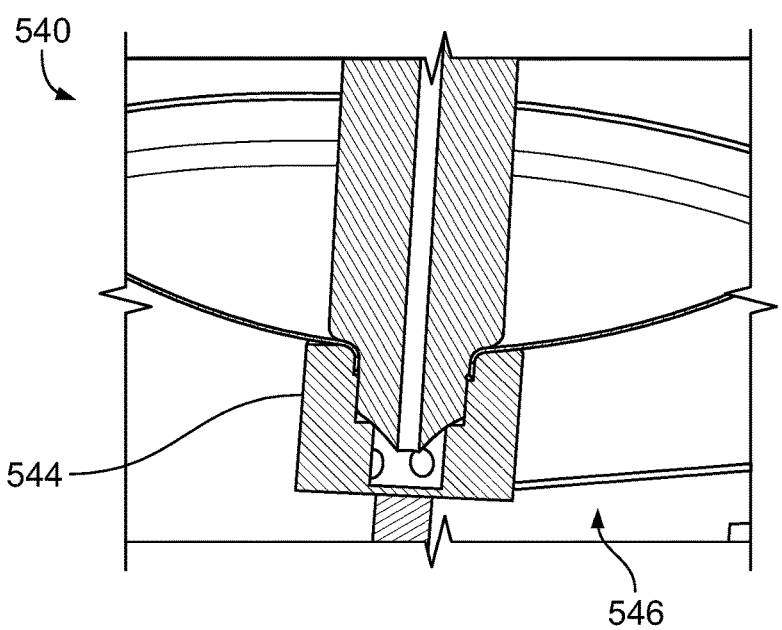

FIGS. 28A-28C show a driveshaft 540 with a barbed end 542 for engaging a complementary recess 544 in a mixing paddle 546. The barbed end of the driveshaft rotationally couples the driveshaft 540 to the mixing paddle. Driveshafts with a barbed end 542 may more easily pierce pods than driveshafts with a square end.

Figure 29:
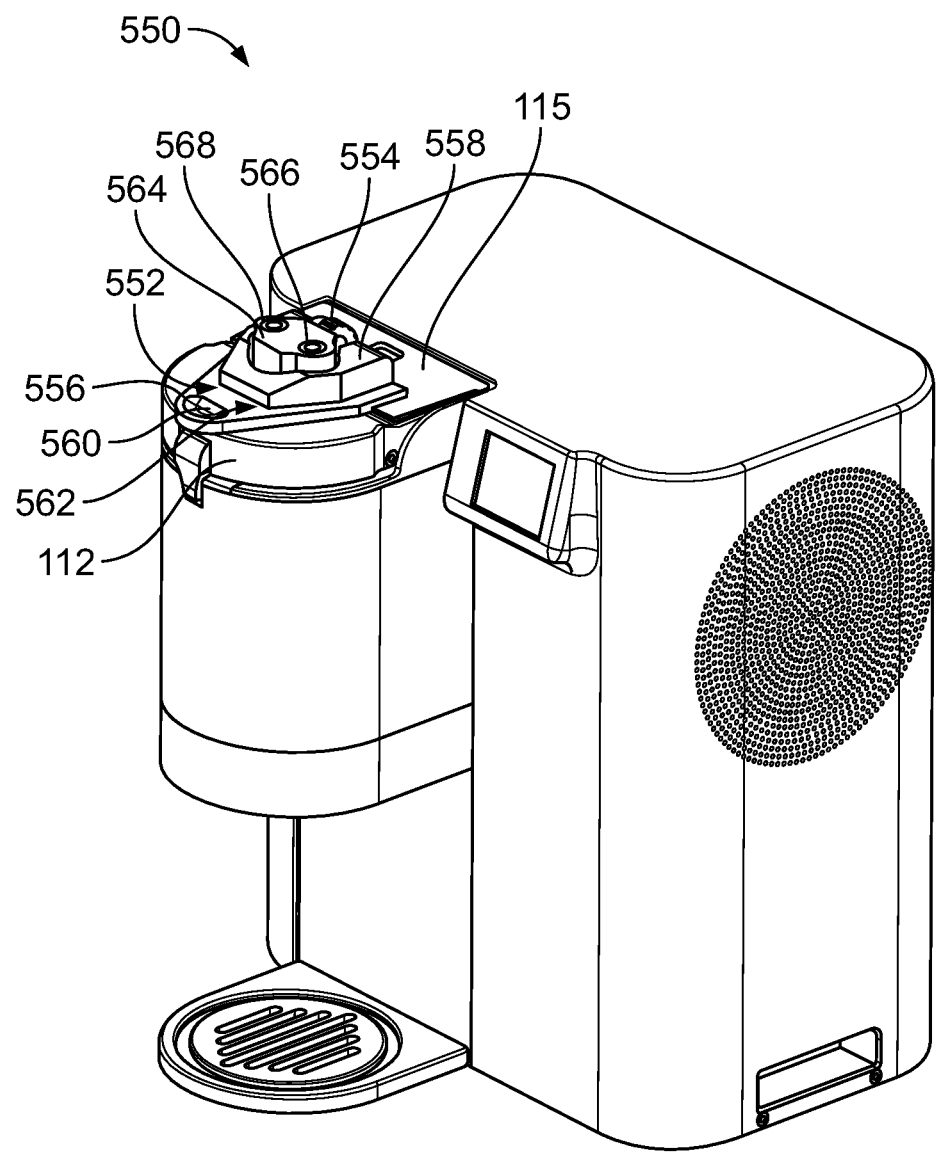
FIG. 29 shows a perspective view of a machine with a handle connected to a pinion.

FIG. 29 shows a perspective view of a machine 550 that is substantially similar to the machine 300 shown in FIGS. 12A-12D. However, the machine 550 has a handle 552 that is connected to a pinion 554 for moving a driveshaft up and down. The handle 552 is triangularly shaped and widens from a first end 556 to a second end 558. A dimple 560 on the first end 556 of the handle 552 provides a gripping surface. The dimple 560 indicates to the user where to grip the handle 552. Some handles have other shapes (e.g., rectangular, square, or circular). Some handles are shaped like the handle shown in FIG. 12A. A recess 562 extends into the handle 552 from the second end 558 of the handle. The pinion 554 and an elevator shaft 564 are disposed in the recess 562. A user lifts the first end 556 of the handle 552 to rotate the handle 552 about the second end 558 to open the lid 112. The user presses downwards on the first end 556 of the handle 552 to rotate the handle 552 about the second end 558 and close the lid 112

Figure 30A:
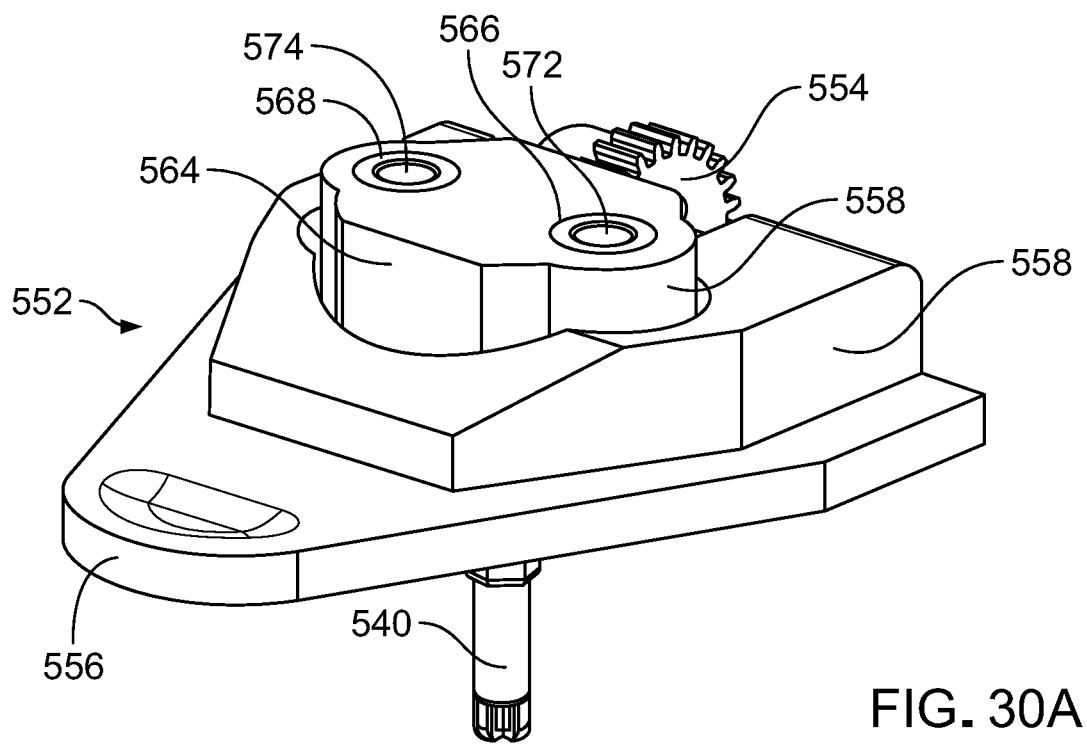
FIGS. 30A and 30B show perspective views of the handle in FIG. 29 in its closed position and in its open position.
Figure 30B:
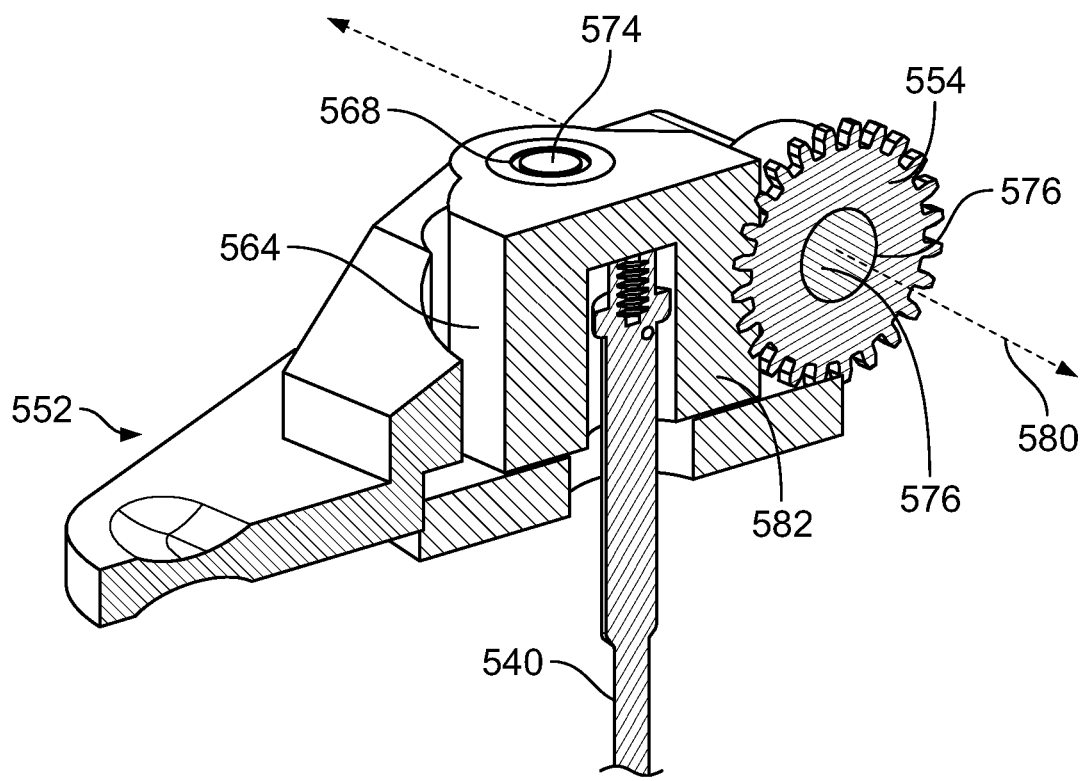
Figure 30C:
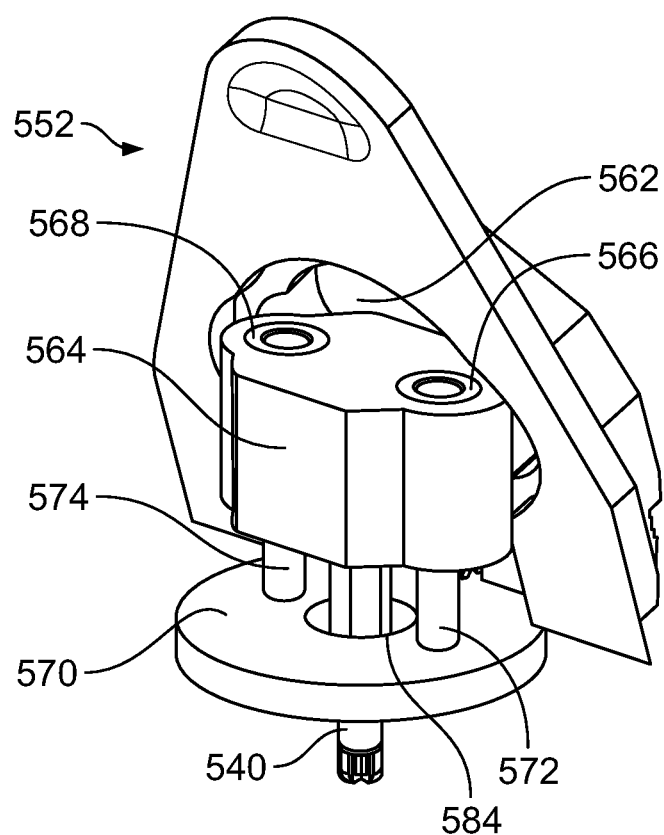
FIGS. 30C and 30D show cross-sectional views of the handle in FIG. 29 in its closed position and in its open position.
Figure 30D:
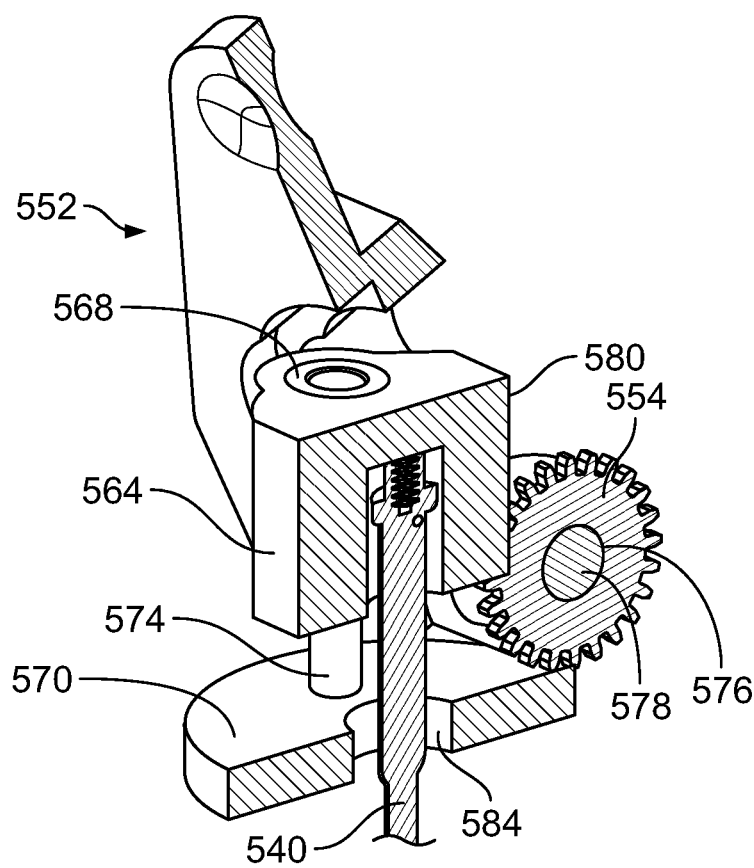

FIGS. 30A and 30B show a perspective view and a cross-sectional view of the handle 552 in its closed position. FIGS. 30C and 30D show a perspective view and a cross-sectional view of the handle 552 in its open position. The elevator shaft 564 defines a first bore 566 and a second bore 568 that extend through the elevator shaft 564 parallel to each other. A base plate 570 is mounted on the lid 112 between the handle 552 and the lid 112. A first linear bearing 572 and a second linear bearing 574 extend from the base plate 570, away from the lid 112 (shown in FIG. 29). The first linear bearing 572 extends into the first bore 566 of the elevator shaft 564 and the second linear bearing 574 extends into the second bore 568 of the elevator shaft 564. The elevator shaft 564 vertically translates along the first and second linear bearings 572, 574 when the handle 552 moves between its open position and its closed position.

The pinion 554 defines a central hole 576, shown in FIGS. 30C and 30D. An axle 578 of the handle 552 extends through the central hole 576 and is rotationally coupled to the pinion 554. Movement of the handle 552 rotates the axle 578 and the pinion 554.

The elevator shaft 564 includes a rack 582 that engages the pinion 554, such that, when the pinion 554 rotates, the rack 582 moves vertically. The rack 582 is integrally formed with the elevator shaft 564. In some elevator shafts, the rack is attached to rather integrally formed with the elevator shaft. The driveshaft 304 extends from the elevator shaft 564, through a central aperture 584 defined in the base plate 570. Vertical movement of the elevator shaft 564 vertically moves the driveshaft 304. When the handle 552 moves from its open position to its closed position, the driveshaft 304 moves downward to engage a mixing paddle in a pod. When the handle 552 moves from its closed portion to its open position, the driveshaft 304 moves upward and disengages from the mixing paddle of a pod inserted in the machine.

Figure 31A:
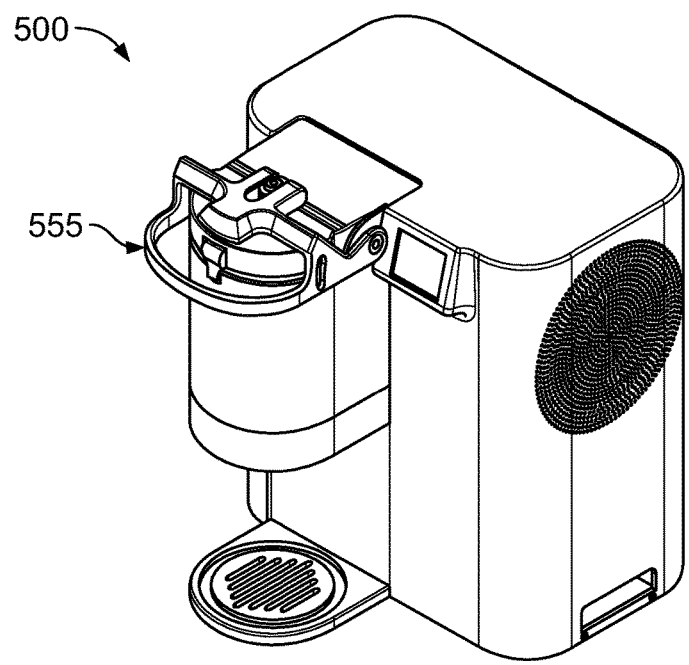
FIGS. 31A-31E show perspective and cross sectional views of a machine with a handle that rotates on the same axis as a lid of the machine.
Figure 31B:
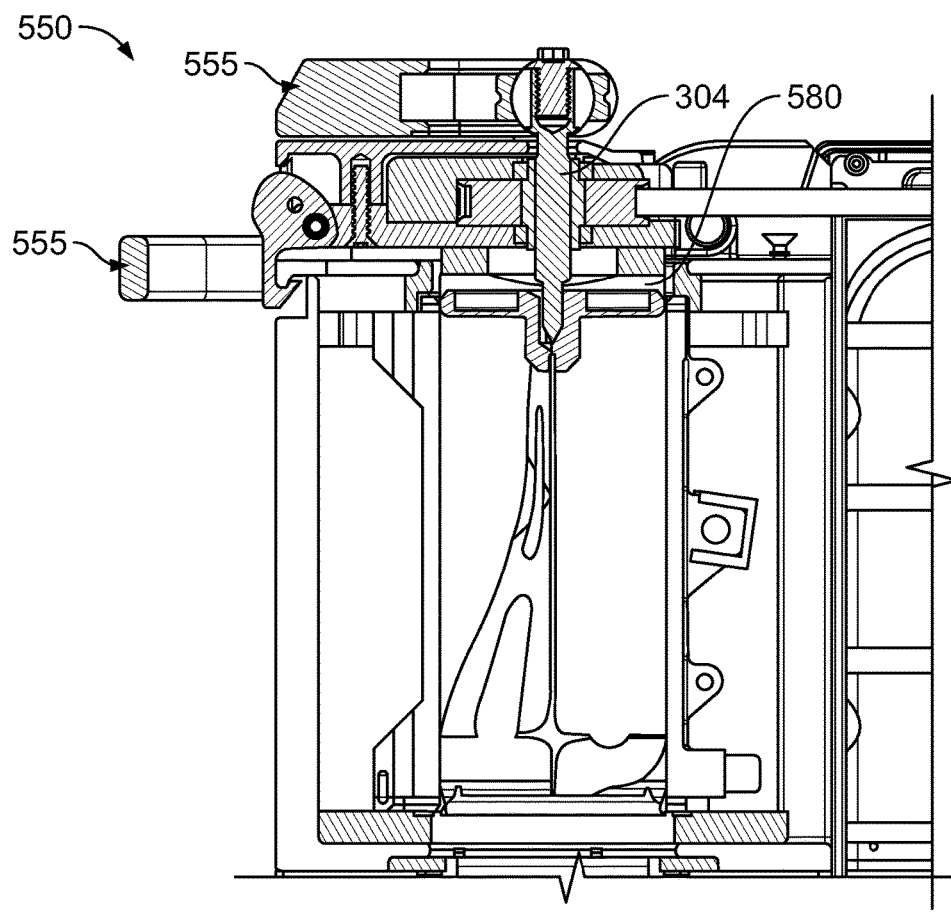
Figure 31C:
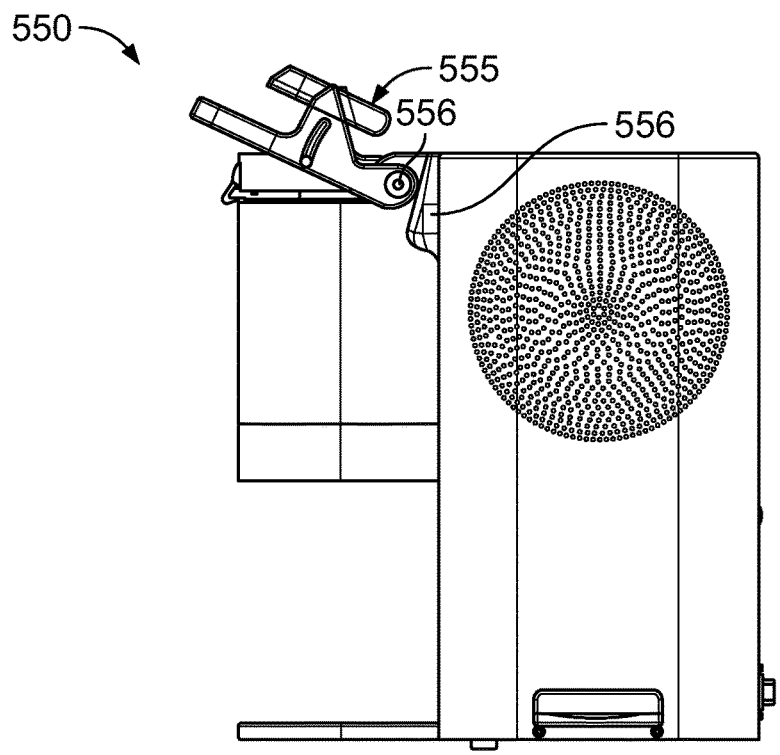
Figure 31D:
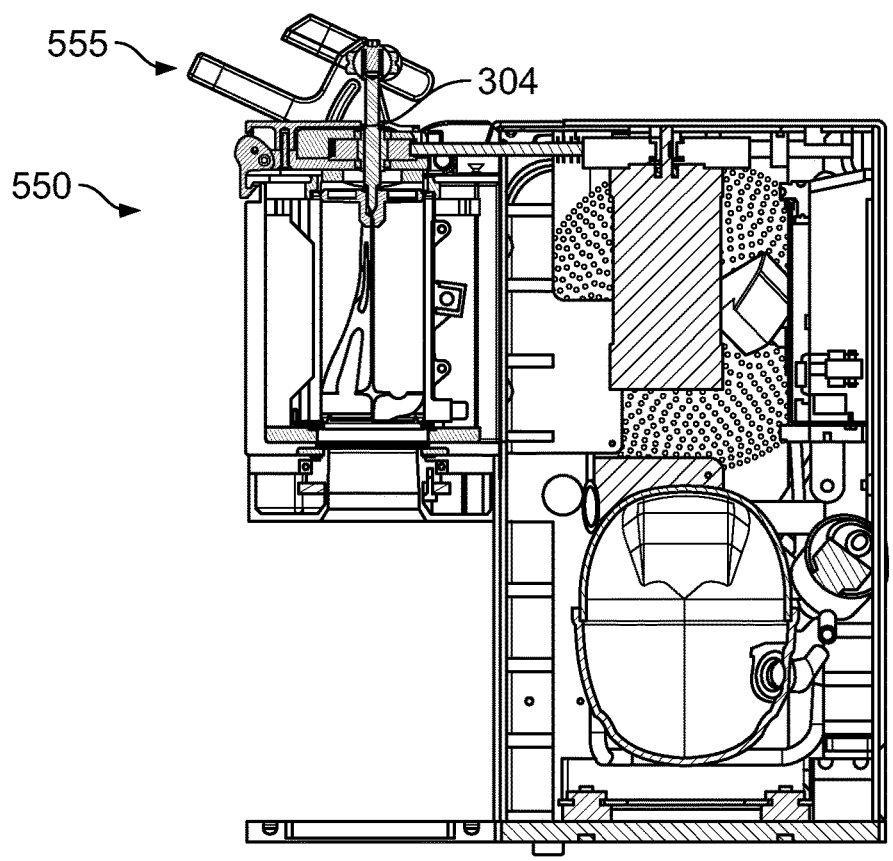
Figure 31E:
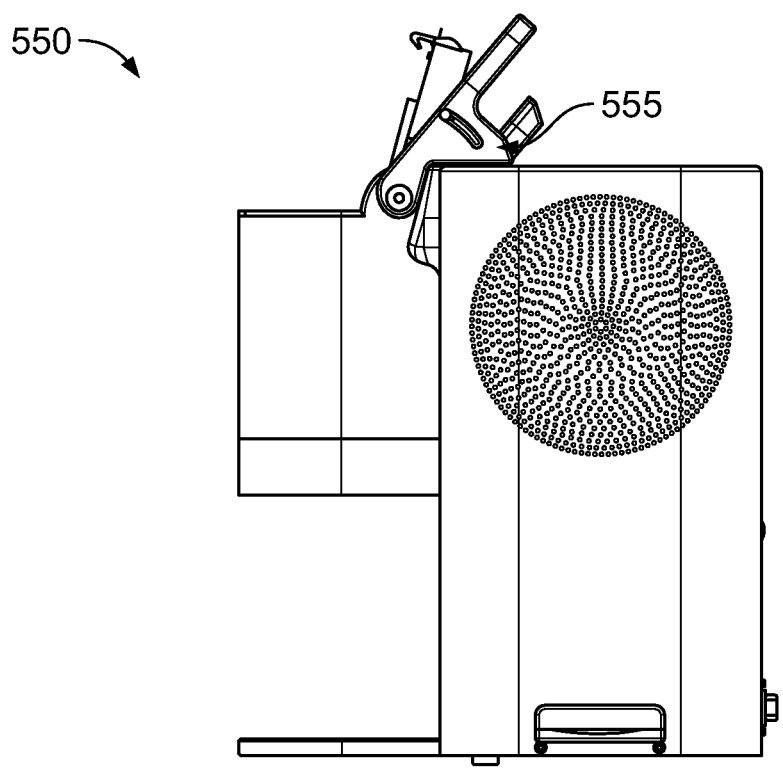

FIGS. 31A-31E show the machine 550 with a handle 555 that operates similarly to the handle 302 in FIGS. 13A and 13B. However, in FIGS. 31A-31E the handle 555 and the lid 112 rotate about the same hinge 556. The handle 555 is also larger and allowing a user to use their entire hand to apply force to the driveshaft via the handle. The length of the handle 555 increases the mechanical advantage provided by the handle 555 and decreases the required amount of force applied by the user to puncture the pod and engage the driveshaft 304. The pod 150 as shown in FIG. 31B also includes a centering head 580 that engages with the paddle 160. The centering head 180 holds the paddle 160 in position with the central stem 228 along the rotational axis. FIGS. 31A and 31B show the handle 555 and lid 112 in its closed position. The driveshaft 304 is extended into the evaporator to pierce the pod 150 and engage the mixing paddle 170. FIGS. 31C and 31D show the handle 555 in the open position and the lid 112 in the closed position. The driveshaft 304 is retracted and is held within the lid 112. FIG. 32E shows the lid 112 and the handle 555 in the open position. The evaporator 108 is exposed and a pod 150 can be inserted into the evaporator 108.

Figure 32:
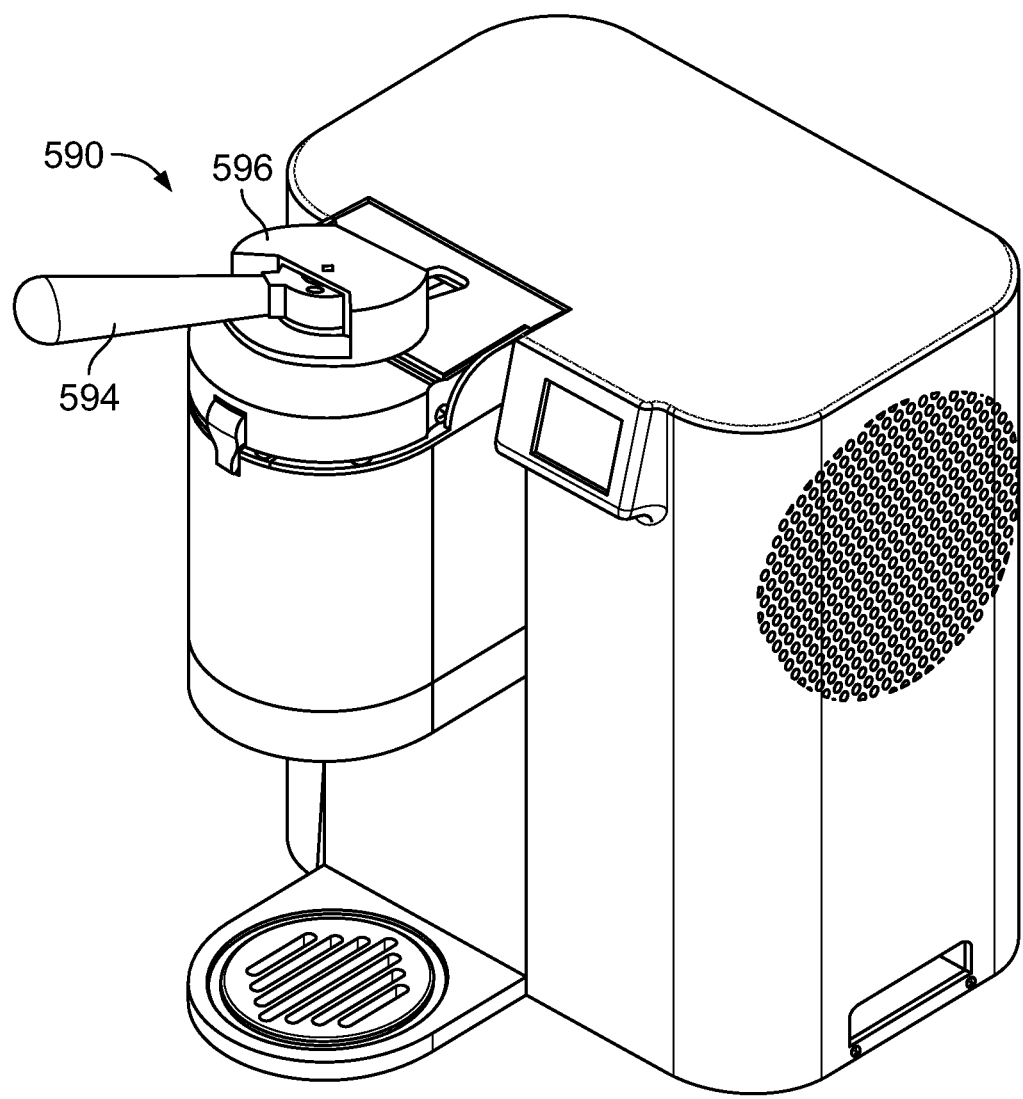
FIG. 32 shows a perspective view of a machine with a handle structure having a handle and a housing.
Figure 33A:
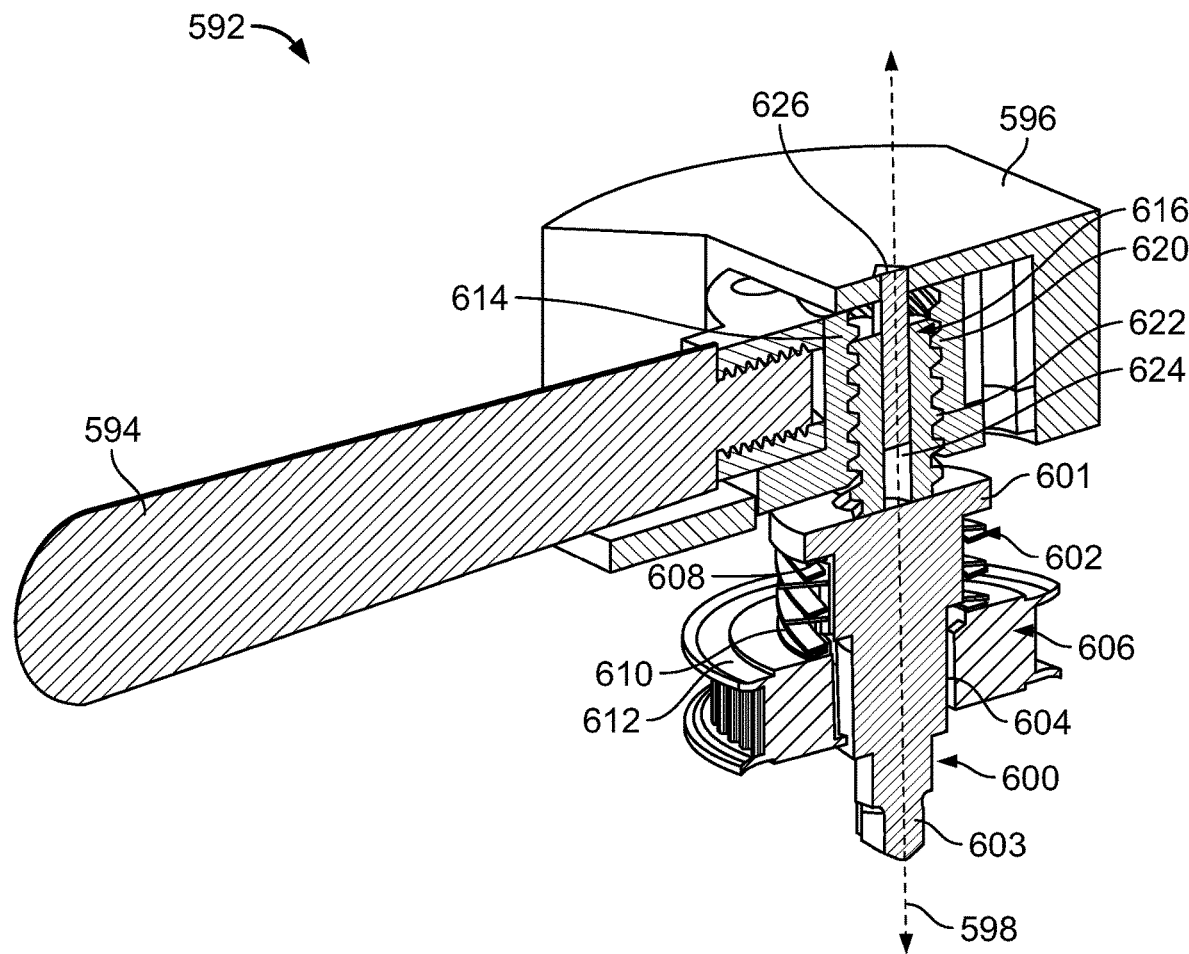
FIG. 33A is a cross sectional view of the handle structure in FIG. 32 in its open position.
Figure 33B:
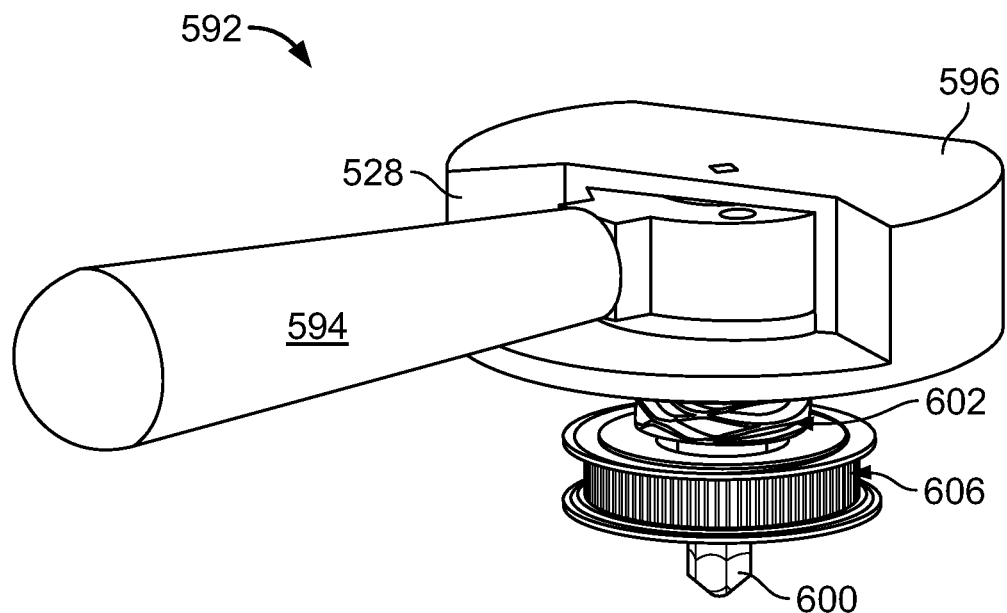
FIG. 33B is a perspective view of the handle structure in FIG. 32 in its open position.
Figure 33C:
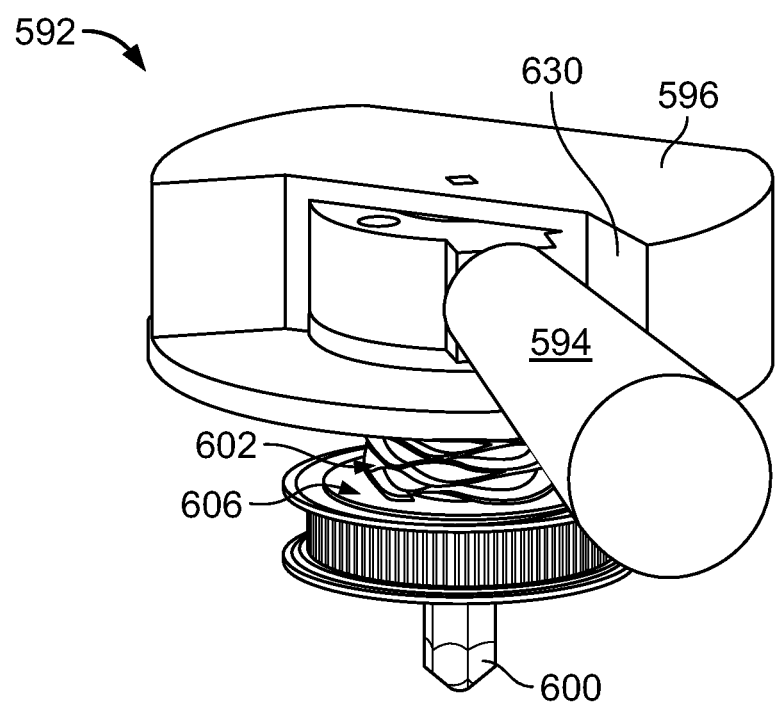
FIG. 33C is a perspective view of the handle structure in FIG. 32 in its closed position.

FIG. 32 shows a perspective view of a machine 590 with a handle structure 592 that includes a handle 594 and a housing 596. FIGS. 33A-33C show a more detailed view of the handle structure 592. The machine 590 is substantially similar to the machine 100 shown in FIGS. 1A and 1B but includes the handle structure 592 and the handle 594 rotates about a vertical axis 598 to extend or retract a driveshaft 600.

FIG. 33A is a cross sectional view of the handle structure 592 in its open position. The handle structure 592 includes a spring 602 and the driveshaft 600. The driveshaft 600 includes a base 601 and a stem 603 that extends from the base 601 through a central opening 604 defined in a pulley 606. A first end 608 of the spring 602 is attached to the base 601 of the driveshaft 600. A second end 610 of the spring 202 abuts a surface 612 of the pulley 606. The spring 602 biases the driveshaft towards its open position.

The central opening 604 is sized to receive the driveshaft 600 and rotationally couple the driveshaft 600 to the pulley 606. The pulley 606 is connected by a drive belt to a motor (not shown). Operation of the motor rotates the pulley 660 and the driveshaft 600.

The handle structure 592 also includes a nut 614 that receives the handle 594 and a lead screw 616. The nut 614 and handle 594 are rotationally and axially constrained such that when a user moves the handle 594 about the vertical axis 598, the nut 614 also rotates about the vertical axis 618. The nut 614 has internal threads 620 that correspond with external threads 622 on the lead screw 616. The lead screw 616 includes an opening 624 that receives a projection 626 from the housing. The projection 626 and opening 624 are shaped so that the lead screw 616 is rotationally constrained to the housing 596 but able to move axially relative to the housing 596. In this configuration, when the handle 594 rotates, the lead screw 616 rides the threads 620 to move axially.

FIG. 33B shows a perspective view of the handle structure 592 in an open position. FIG. 33C shows a perspective view of the handle structure 592 in a closed position. In this configuration, the lead screw 616 abuts the base 601 of the driveshaft 600. In the open position, the spring 602 is in a slightly compressed state such that the spring 602 biases the base 601 of the driveshaft 600 towards the lead screw 616. The driveshaft 600 is in the retracted position when the handle 594 is in its open position. In its open position, the handle 594 abuts a first surface 628 of the housing 596. To move the handle to its closed position, the user rotates the handle 594 until the handle 594 abuts a second surface 630 of the housing, approximately 120 degrees from the original orientation. The rotation of the handle 594 rotates the nut 614. The rotation of the nut 614 moves the lead screw 616 downwards towards the base 201 of the driveshaft 600. The lead screw 616 applies an axial force to the base 601, which translates axially and applies a compressive force to the spring 602. The spring 602 compresses as the lead screw 616 pushes the driveshaft through the opening of the pulley 606 to engage the mixing paddle 160 of the pod 150.

The handle structure 592 retracts the driveshaft 600 by moving the handle 594 from the second surface 630 of the housing 596 to the first surface 628 of the housing. Such a movement rotates the nut 614 in an opposite direction and moves the lead screw 616 axially in a second direction, opposite the first direction. The spring 602 expands to press the base 601 of the driveshaft 600 towards the lead screw 616, away from the pod 150. The driveshaft 600 translates axially upwards to disengage the mixing paddle 160 of the pod 150. The handle structure 592 is in the open position when the driveshaft 600 is disengaged from the mixing paddle 160. The handle structure 592 is in its closed position when the driveshaft 600 is engaged with the mixing paddle 160.

In use, a user opens the lid 112 and inserts the pod 150. The user then closes the lid 112, engaging the latch, and moves the handle 594 from the open position to its closed position to extend the driveshaft 600. The driveshaft 600 engages the mixing paddle 160 and the machine is ready to initiate the refrigeration cycle. The contents of the pod 150 is chilled, mixed, and dispensed. To remove the used pod 150, the user moves the handle 594 from its closed position to the open position, retracting the driveshaft 600. The user then opens the lid 112 by disengaging the latch, and removes the pod. The pod 150 is then be thrown away, recycled, or reused.

In some handle structures, the lead screw and the base of the driveshaft are slightly separated in the open position and abut in the closed position. In some handle structures, the spring is in a natural state in which the spring does not experience compressive or stretching forces when the handle structure 592 is in the open position.

Figure 34A:
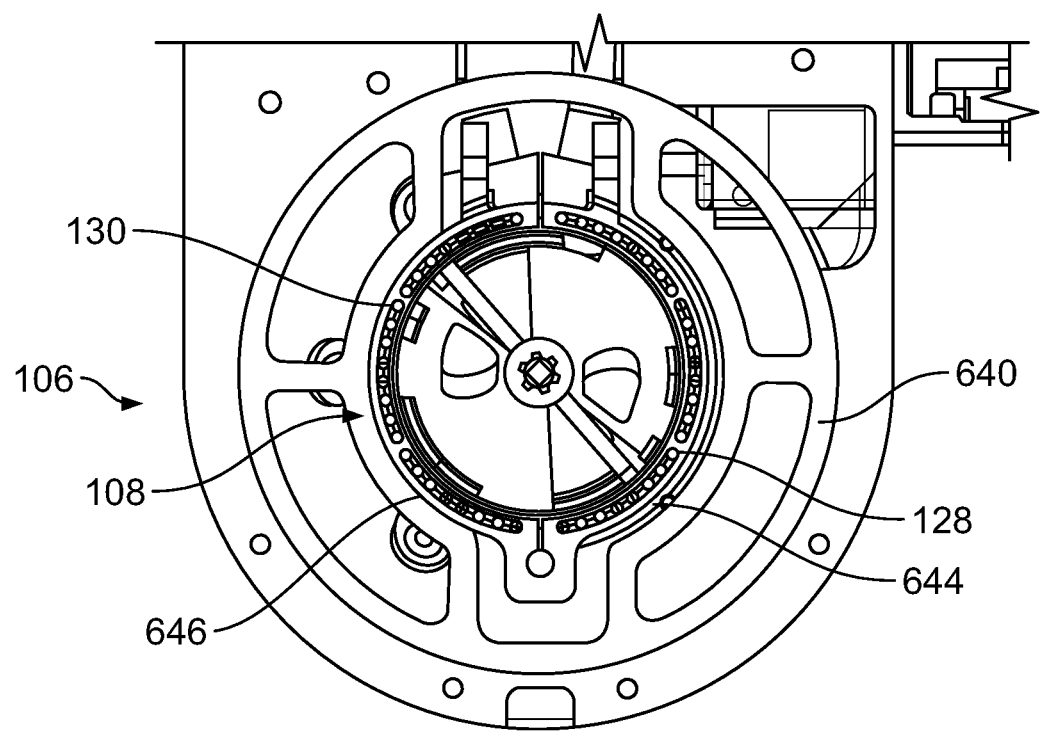
FIGS. 34A and 34B are a views of a frame disposed in a pod machine interface.
Figure 34B:
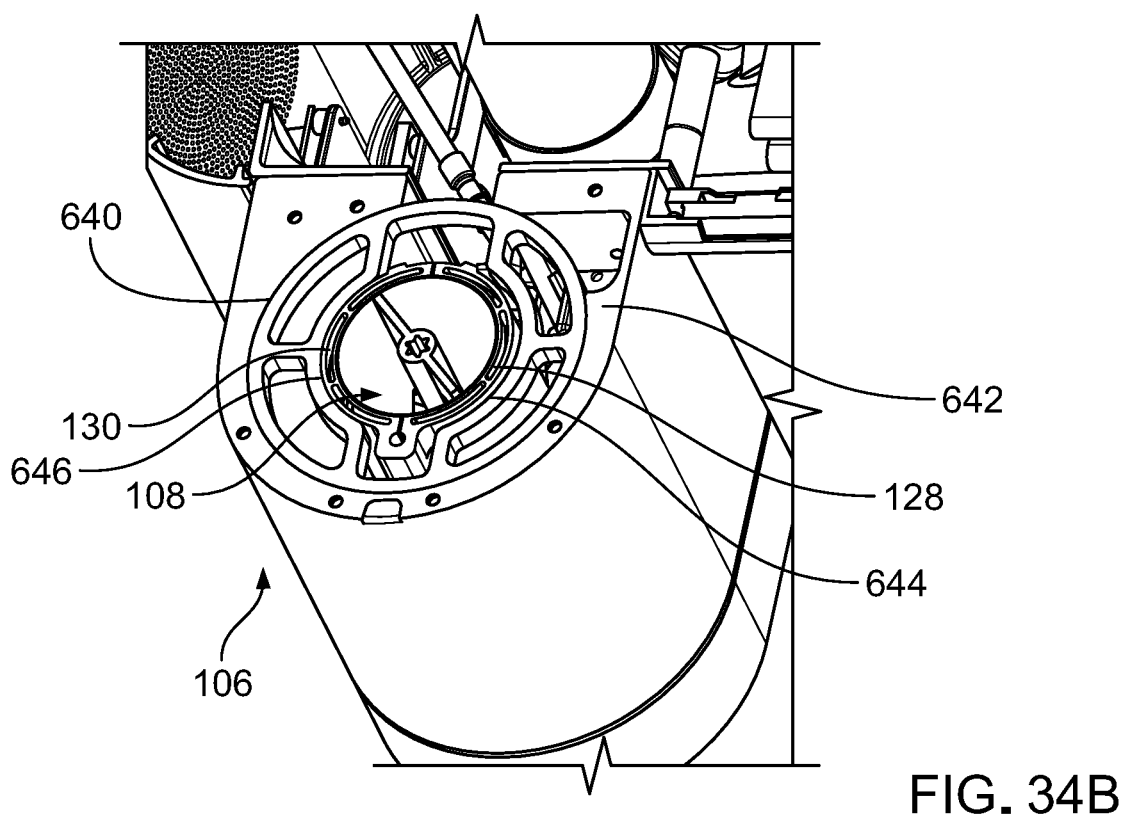

FIGS. 34A and 34B show a top view and a perspective view of a frame 640 disposed in the machine 100 for limiting lateral movement of the evaporator 108. The frame 640 is disposed in the pod-machine interface 106 such that the frame 640 is even with a surface 642 of the pod-machine interface 106. As described previously, the base of the evaporator 108 has three bores 148 on the second portion 130 which are used to mount the evaporator 108 to the floor of the pod-machine interface 106. Bolting the second portion 130 ensures that the second portion 130 is static; however, the first portion 128 is free to move and rotate about the hinge 132. The frame 640 limits the movement of the first portion 128. In the open position, the evaporator 108 is flush with a first inner edge 644 and a second inner edge 646. Specifically, the first inner edge 644 of the frame 640 abuts the first portion 128 of the evaporator 108 and the second inner edge 646 of the frame 640 abuts the second portion 130 of the evaporator 108. When the evaporator is closed, the first portion 128 moves towards the second portion 130. In this position, the second portion 130 still abuts the second inner edge 646 of the frame 640 but the second portion 130 is spaced slightly from the first inner edge 644 of the frame 640 to close the evaporator 108 around the pod 150.

FIGS. 35A-35F show a machine 700 with a lid 710 that rotates laterally relative a housing 712 containing the refrigeration system. The lid 710 is attached to the housing 712 by a pivot pin 714 (see FIG. 35B). A locking lever 716 extends through the top of the lid 710. The locking lever 716 includes a vertically extending hollow cylinder 717 with internal threading.

A rocker 718 extends between a driveshaft 720 and a rod 722. A spring 724 around the driveshaft 720 biases the driveshaft 720 upwards against the rocker 718. In the absence of a force applied to the rod 722, the driveshaft 720 is disposed entirely within the lid 710. An actuator 721 is disposed in the housing 712 with the ball screw 723 extending through the actuator 721. The actuator 721 and the ball screw 723 are positioned such that they are aligned with the rod 722 when the lid 710 is in its closed position.

A motor 726 is attached to the driveshaft 720 by a belt 728. The motor 726 is attached to the lid 710 and rotates with the lid 710. The motor 726 extends downward into the housing 712 through an aperture 730 best seen in FIG. 35C. Because the motor 726 does not move relative to the driveshaft 720, the tensioning devices included in some of the other machines are not required in the machine 700.

The pivot pin 714 is mounted to a plate 732 fixed in position in the housing 712. A bolt 734 is also mounted to the plate 732. The bolt 734 is positioned to engage the vertically extending hollow cylinder 717 of the locking lever 716 when the lid 710 is in its closed position.

Figure 35A:
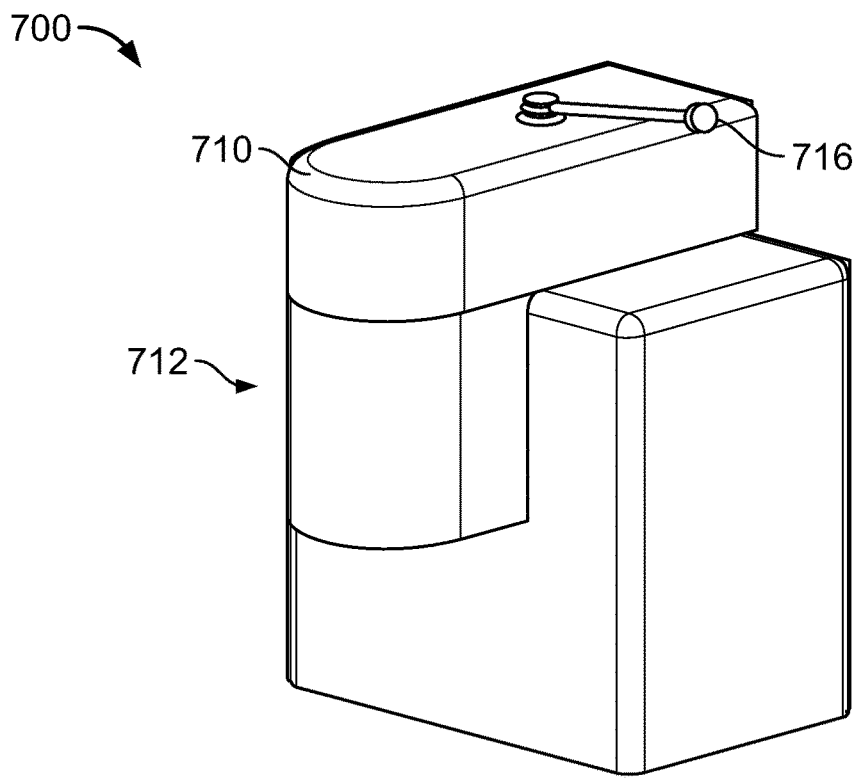
FIGS. 35A-35H are views of a machine with a laterally rotating pod-machine interface.
Figure 35B:
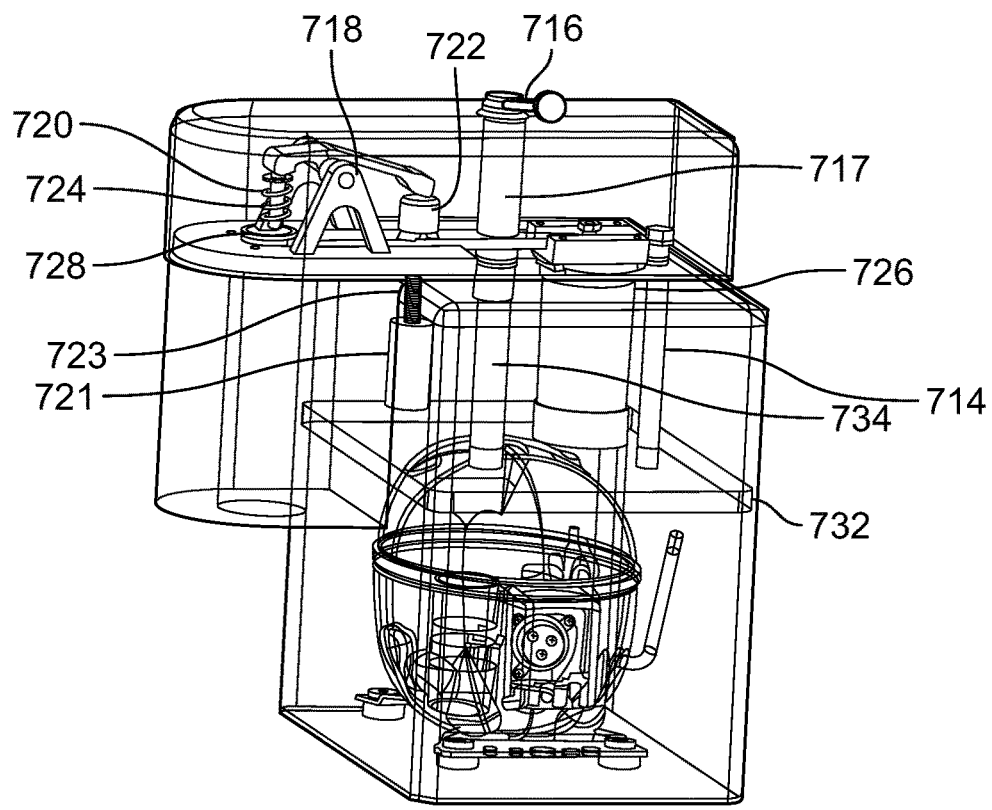
Figure 35C:
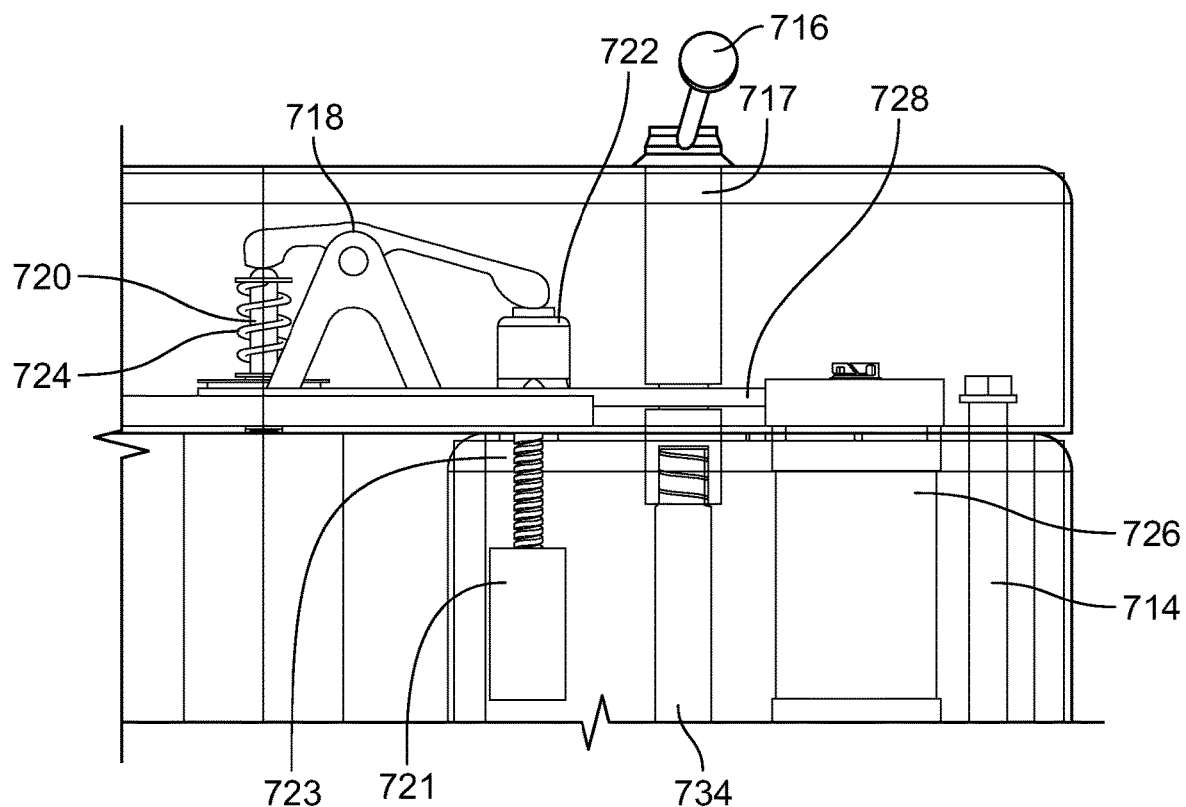
Figure 35D:
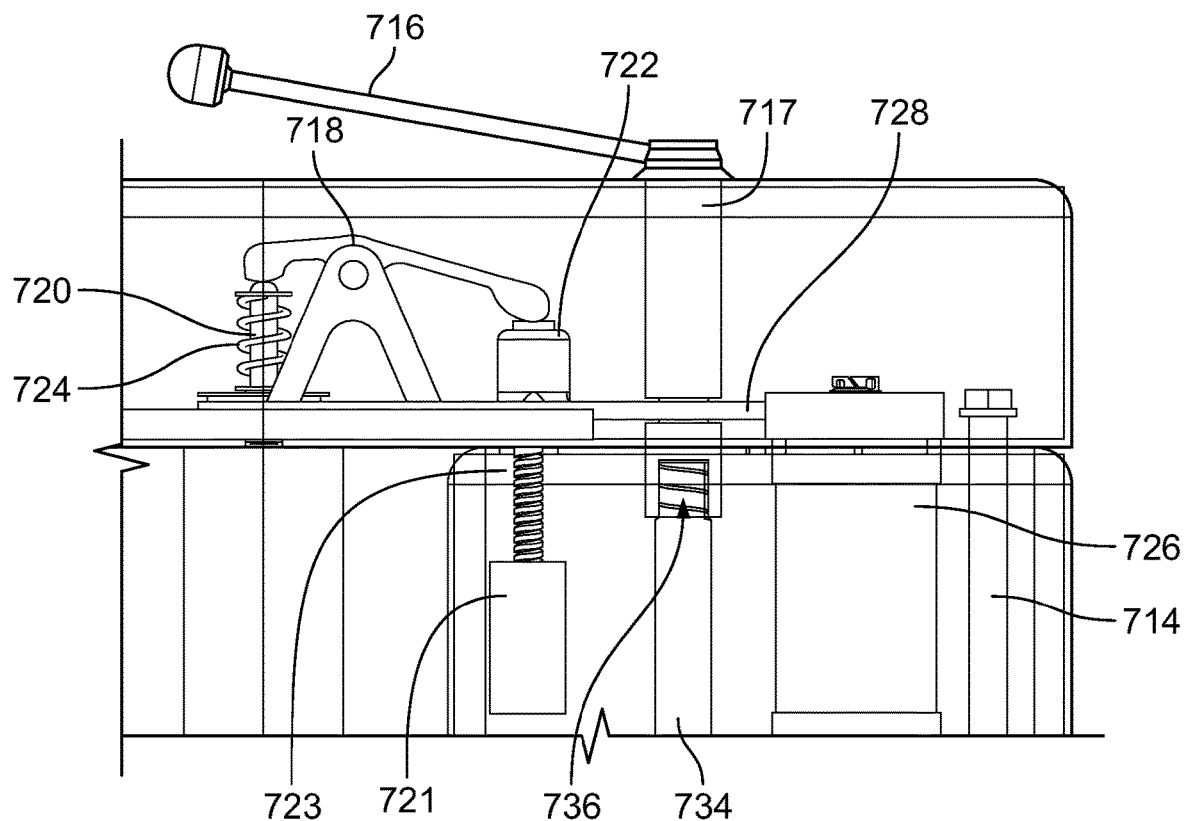
Figure 35E:
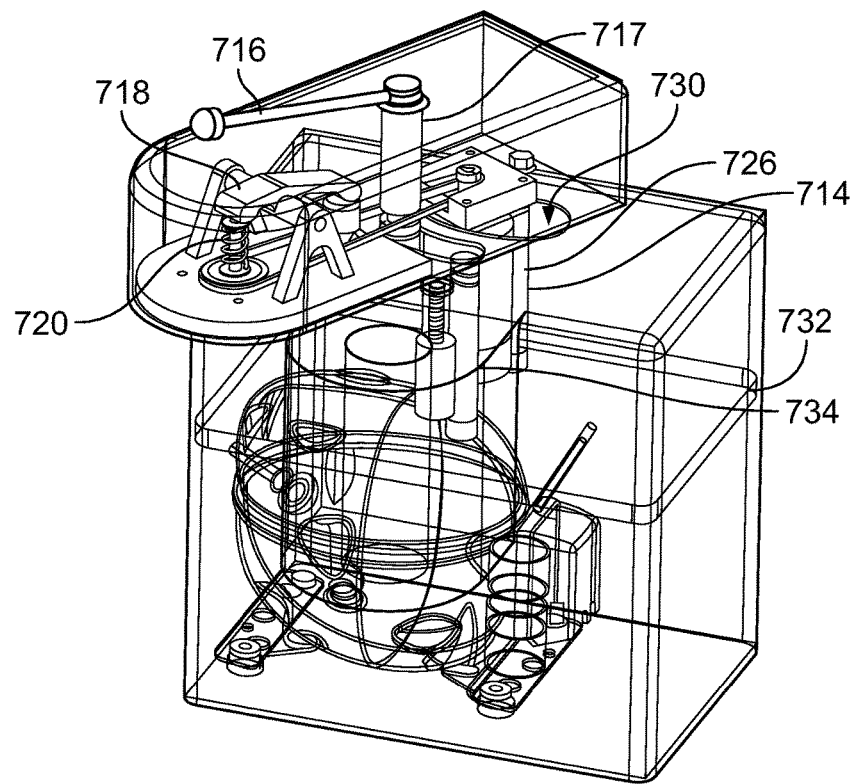
Figure 35F:
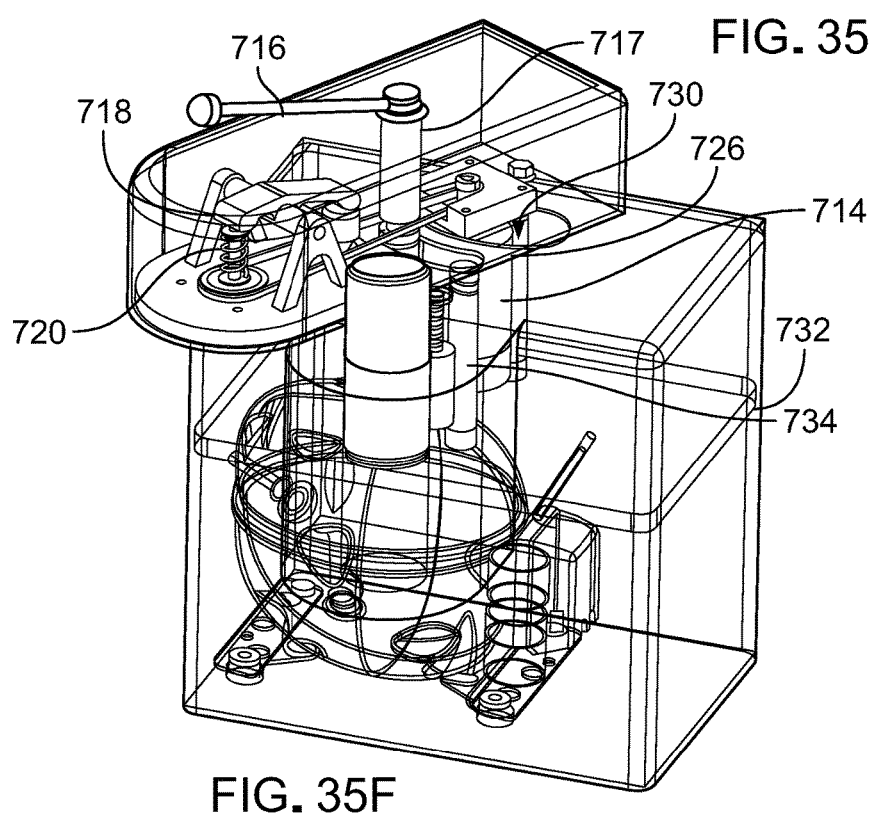

FIGS. 35C and 35D illustrate operation of the locking lever 716. FIG. 35C shows a portion of the machine 700 when the lid 710 is in its closed and locked position with the lid 710 and the locking lever 716 are in the positions shown in FIG. 35A. The internal threads of the vertically extending hollow cylinder 717 of the locking lever 716 are engaged external threads of the bolt 734. The bottom end of the vertically extending hollow cylinder 717 defines a slot 736. When the locking lever 716 is rotated to its unlocked position, the slot 736 aligns with flat faces on the bolt 734 (best seen on FIGS. 35G and 35H). This alignment allows the lid 710 to be rotated to its open position for insertion of a pod as shown in FIGS. 35E and 35F. Because the machine 700 opens laterally, its height can be lower than the height of machines whose lids open upwards. After the pod is inserted, the lid 710 is rotated back to its closed position and the locking lever 716 is rotated to its locked position.

Figure 35G:
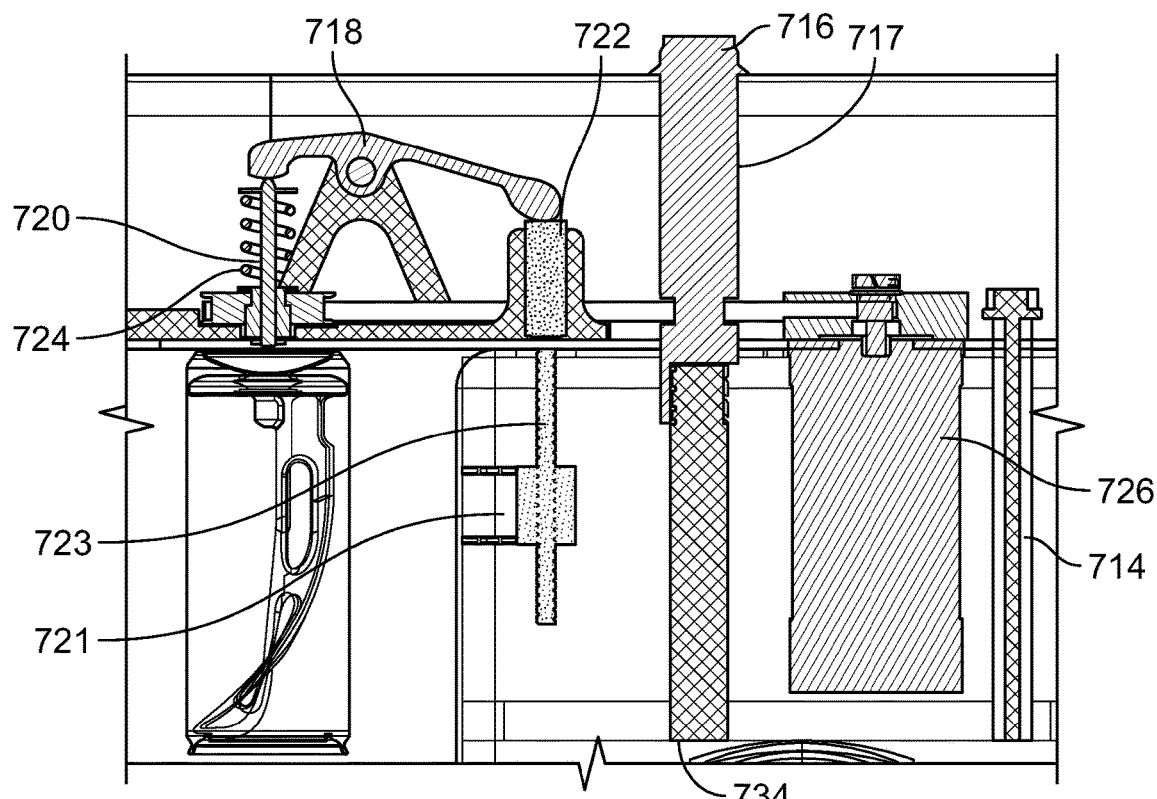
Figure 35H:
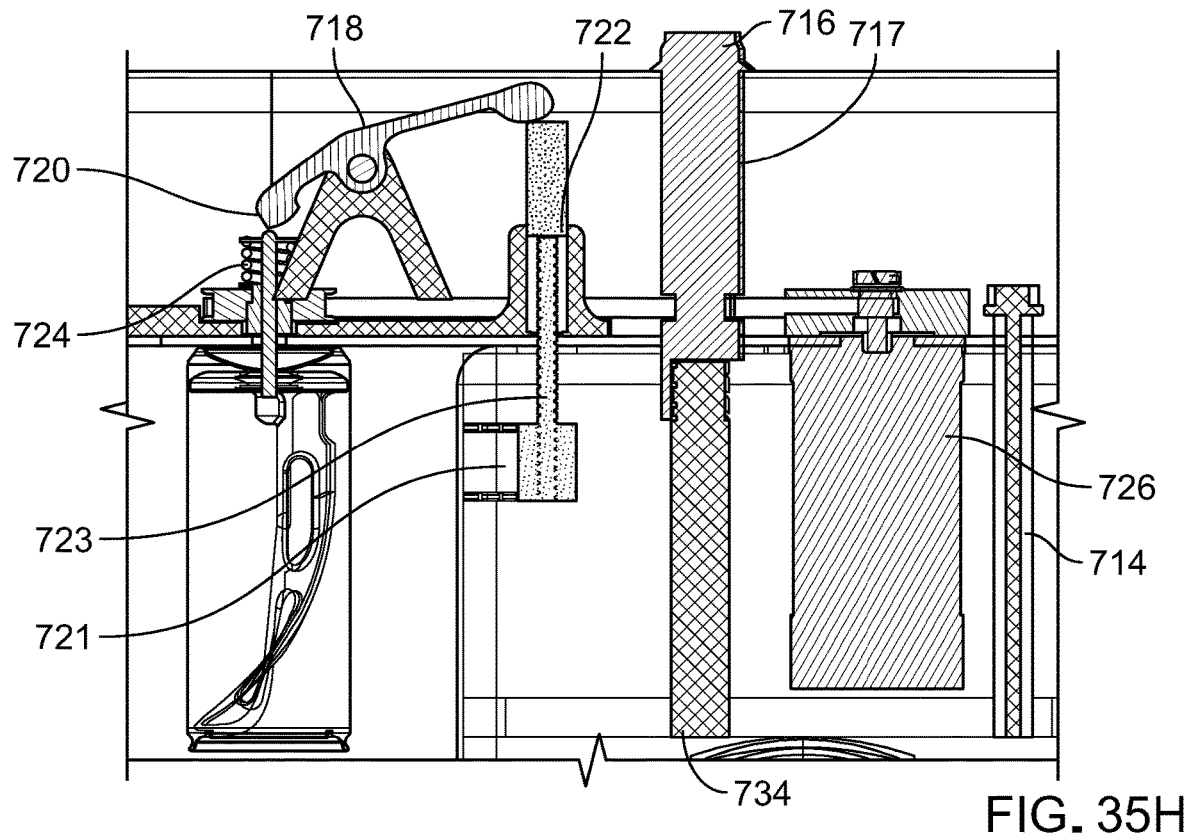

FIGS. 35G and 35H illustrate engagement of the driveshaft 720 with an internal paddle of the pod. In FIGS. 35G and 35H, the end of the hollow cylinder 717 of the locking lever 716 is partially cut away so that one of the flat faces of the bolt 734 is visible. FIG. 35G shows a portion of the machine 700 after the lid 710 is rotated back to its closed position and the locking lever 716 is rotated to its locked position. Operation of the actuator 721 drives the ball screw 723 upwards into engagement with the rod 722. As the rod 722 moves upward, engagement between the rod 722 and the rocker 718 rotates the rocker 718 to force the driveshaft 720 downward into engagement with the internal paddle of the pod. Using the actuator 721 positioned within the housing 712 to supply the force used to press the driveshaft 720 downward avoids creating an external force that can tip the machine as can occur in machines where a user manually applies an external force to press the driveshaft 720 downward.

Figure 36A:
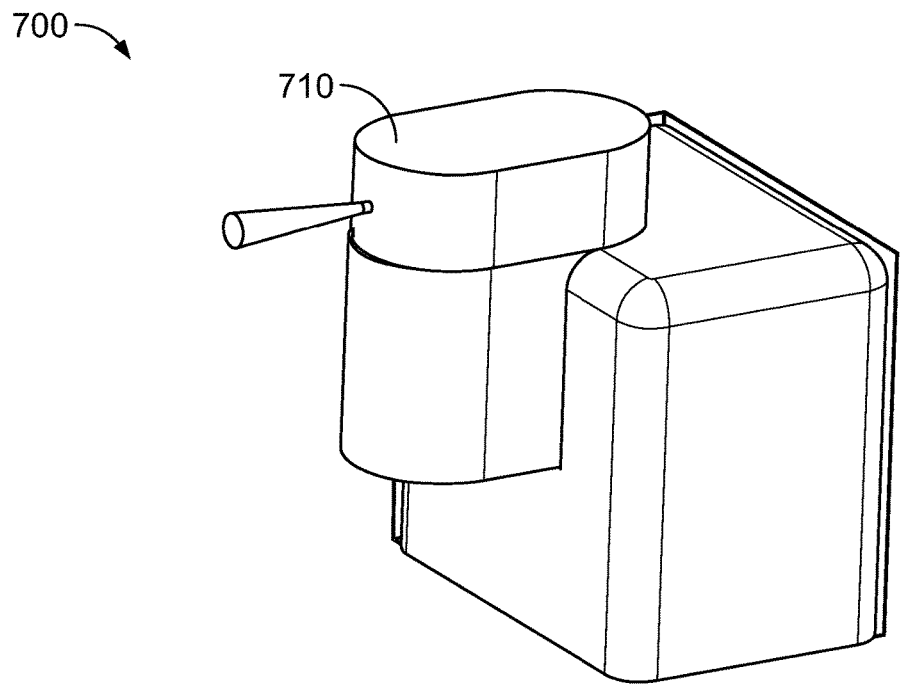
FIGS. 36A-36D are schematic views of a machine with a single motor driving multiple components.
Figure 36B:
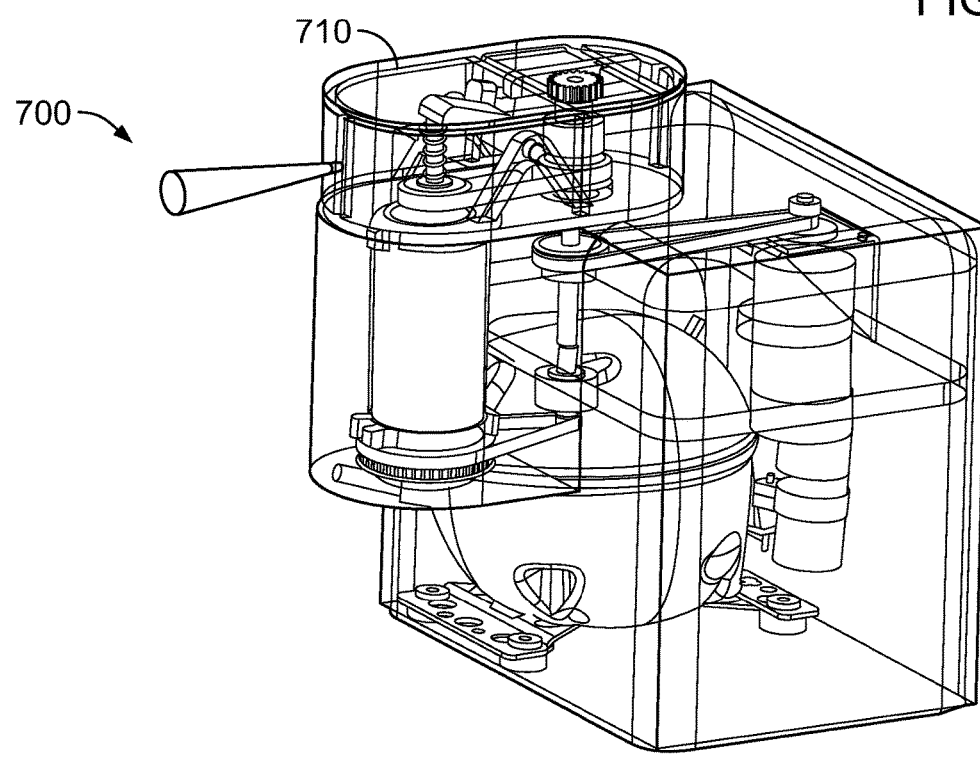

FIGS. 36A and 36B show the machine 700 with the laterally rotating lid 710, and a single motor 740 for rotating the driveshaft 720, translating the driveshaft 720 and rotating a dispensing mechanism 742. The dispensing mechanism 742 used in machine 700 may be any of the previously described dispensing mechanisms that rotate to open and/or close. FIGS. 36A and 36B show outer perspectives of the machine 700 with the housing and with a transparent housing, respectively. FIG. 36B provides a view of the internal components of the machine 700 in a closed position. Using a single motor to control the motion of the internal components may reduce the cost of the machine and the size of the machine.

Figure 36C:
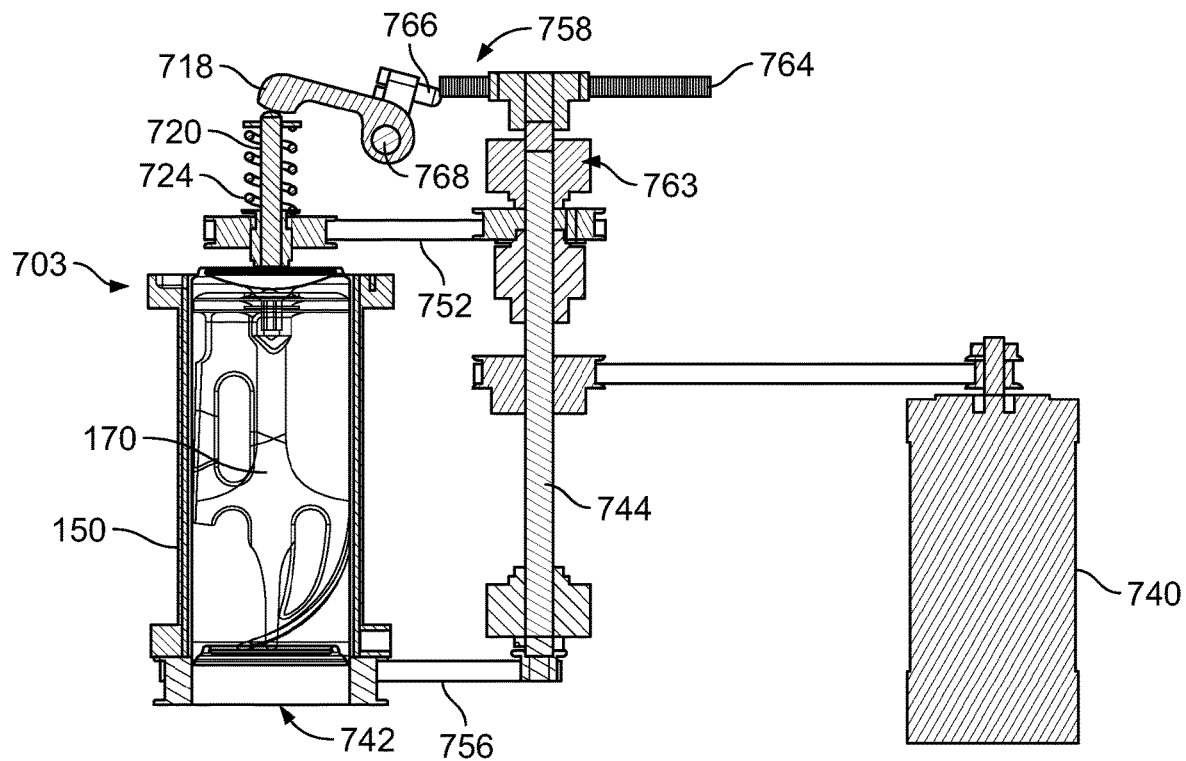
Figure 36D:
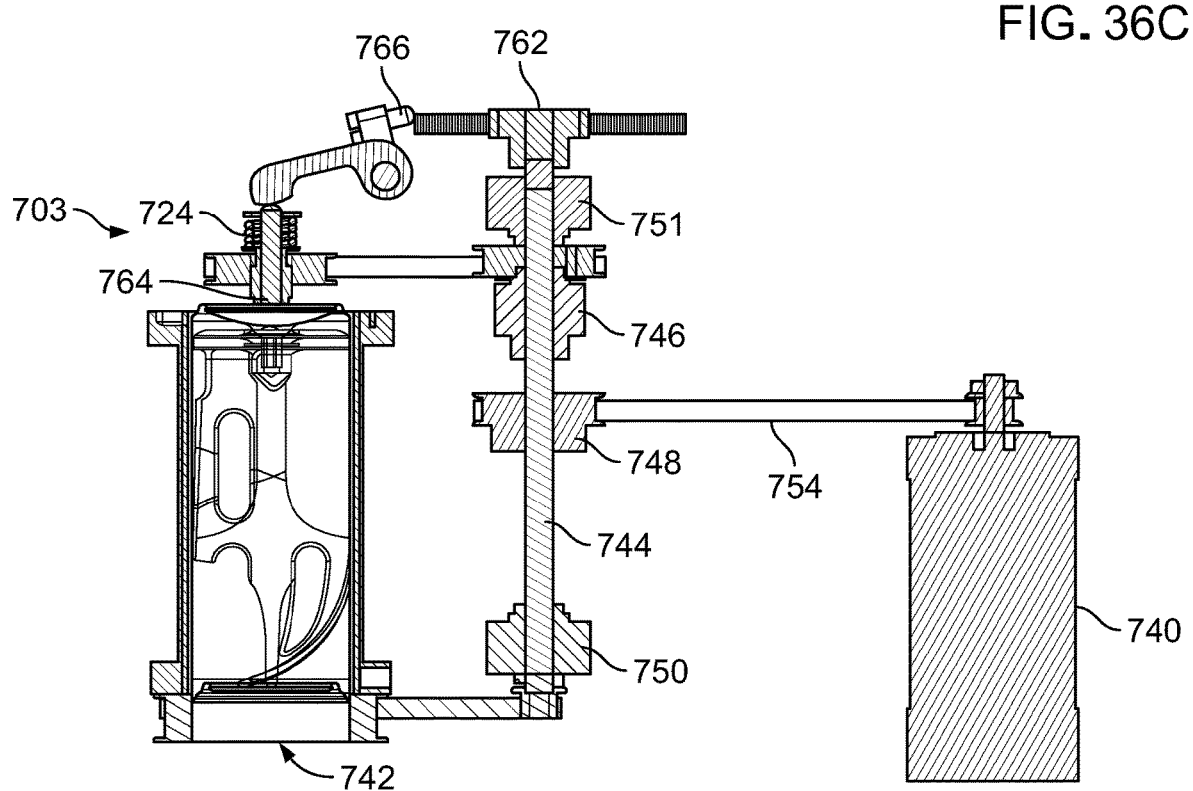

FIGS. 36C and 36D show an assembly 703 within machine 700 with the evaporator 108 containing a pod 150 and a single motor 740. The driveshaft 720, moves vertically from a first position outside of the pod 150 to a second position, partially inside the pod 150 in engagement with the mixing paddle 170. Moving from the first position to the second position punctures the pod 150. In the second position, the mixing paddle 170 and the driveshaft 720 are rotationally coupled. The motor 740 is rotationally connected to a rod 744 that connects to the driveshaft 720 to rotate the driveshaft 720 and mix the contents of the pod 150. In some machines, the motor mounts onto the housing.

A first clutch 746, a gear 748, a second clutch 750, and a third clutch 751 are attached to the rod 744. The clutches 746, 750, 751 rotationally couple with and decouple from the rod 744 based on a signal from the controller of the machine 700. Some clutches are electromechanical or rollers with trip pawls. The gear 748 is permanently rotationally coupled to the rod 644. The first clutch 746 connects to the driveshaft 720 via a mixing drive belt 752 to rotate the mixing paddle 170 when the first clutch 746 is coupled to the rod 744. The gear 748 connects to the motor 742 via a primary drive belt 754 to rotate the gear 748 and rod 744. The second clutch 750 connects to the dispensing mechanism 742 via a dispensing drive belt 756 for rotating the dispensing mechanism 742 when the second clutch 750 is coupled to the rod 744. The third clutch connects to a puncture mechanism 758 for moving the driveshaft 720 between the first and second positions when the third clutch 751 is coupled to the rod 744.

In this configuration, the motor 740 and clutches 746, 750, 751 control rotation of the mixing paddle 170, rotation of the dispensing mechanism 742, and movement of the driveshaft 720 between the first position and the second position. The motor 740 may perform each of the aforementioned tasks individually or simultaneously by coupling or decoupling various clutches 746, 750, 751.

The puncture mechanism 758 includes a pinion 762 on a first end 763 of the rod 744, a rack 764 connected to the pinion 762, and a bolt 766 of the rocker arm 718 that abuts the rack 746. The bolt 766 is translationally coupled to the rocker arm 718 and disposed above a hinge 768 of the rocker arm 718. The hinge 768 is centered on an axis of rotation for the rocker arm 718 and the bolt 764 is arranged off center from the hinge 768. The pinion 762 is rotationally coupled to the third clutch 751, so that the pinion 762 rotates when the third clutch 751 is coupled to the rod 644. When the pinon rotates, teeth of the pinion engage complimentary teeth of the rack 764 and translate the rack 764. As the motor 740 rotates the rod 744, the third clutch 751, and the pinion 762 in a first rotational direction, the rack 764 moves in a first translational direction. As the motor 740 rotates the rod 744, the third clutch 751, and the pinion 762 in a second rotational direction, the rack 764 moved in a second translational direction. In machine 700, the first translational direction is towards the bolt 766 and the second translational direction is away from the bolt 766. In some machines, the first translational direction is away from the bolt and the second translational direction is towards the bolt. The rack 764 moves towards the bolt 766 to apply a perpendicular force relative to the axis of rotation of the rocker arm 718. The perpendicular force rotates the rocker arm 718 about the hinge 768 against the bias of the spring 724 and moves the driveshaft 720 downwards from the first position, shown in FIG. 36C to the second position, shown in FIG. 36D. To disengage the driveshaft 720 for the mixing paddle, the rack 764 moves away from the bolt 766 to remove the perpendicular force and the spring 724 presses the driveshaft 720 back to the first position.

In use, the user opens the lid 710 from a closed position by moving a handle 760 to rotate the lid 710. The rod 744 is in line with the vertical axis of rotation for the lid 710. In this configuration, the distance between the rod 744 and the pulleys 752, 756, 754 remains constant during any operation of the machine 700, for example opening and closing the lid. The pod 150 is then inserted and the user moves the lid 710 back to the closed position. The first clutch 746, second clutch 750, and third clutch 751 are initially decoupled from the rod 744. Once a start button is pressed, the motor 740 rotates the rod 744 in a first direction. The third clutch 751 engages the rod 744 to move the driveshaft 720 from the first position to the second position, thereby puncturing the pod 150 and engaging the mixing paddle 170. The third clutch 751 then decouples from the rod 744 to lock the driveshaft 720 in the second position. The first clutch 746 couples to the rod 744 to rotate the driveshaft 720 and the mixing paddle 170 to mix the contents of the pod 150 while the evaporator 108 cools the contents of the pod 150. When the contents for the pod is ready to be dispense, for example if a sensor on the driveshaft 720 reads a predetermined torque, the motor 740 reverses the direction of rotation and the mixing paddle 170 rotates in the opposite direction to churn the contents of the pod 150 downwards. The second clutch 750 couples to the rod 744 and the dispensing mechanism 742 rotates to open. Once the contents of the pod 150 has been dispensed, the first clutch 746 and second clutch 750 decouple and the third clutch 751 couples to the rod 744. The motor 740 and the third clutch 751 rotate in the second direction and the driveshaft 720 moves from the second position to the first position. The pod 150 can then be removed from the evaporator 108 by opening the lid 710.

In some machines, the evaporator is defrosted after dispensing the contents of the pod and before removing the pod. Defrosting the evaporator melts any material that freezes to the evaporator walls and to the walls of the pod.

In some machines, the dispensing mechanism opens by coupling the second clutch and rod, rotating the dispensing mechanism in the first direction, decoupling the second clutch, and reversing the direction of rotation of the motor to rotate the mixing paddle in the second direction. In some dispensing mechanism, only one direction of rotation is used. In some machines, the motor reverses direction and closes the dispensing mechanism after the contents of the pod has been dispensed.

Figure 37A:
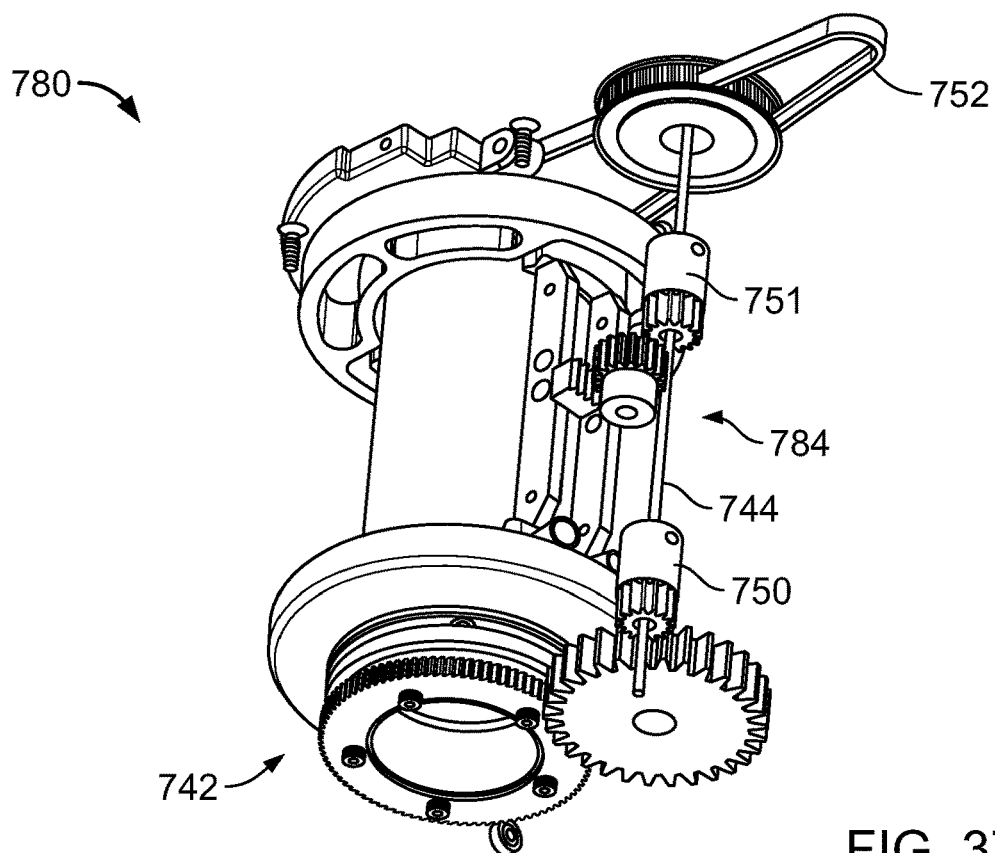
FIGS. 37A and 37B are schematic views of a machine with a single motor driving multiple components.
Figure 37B:
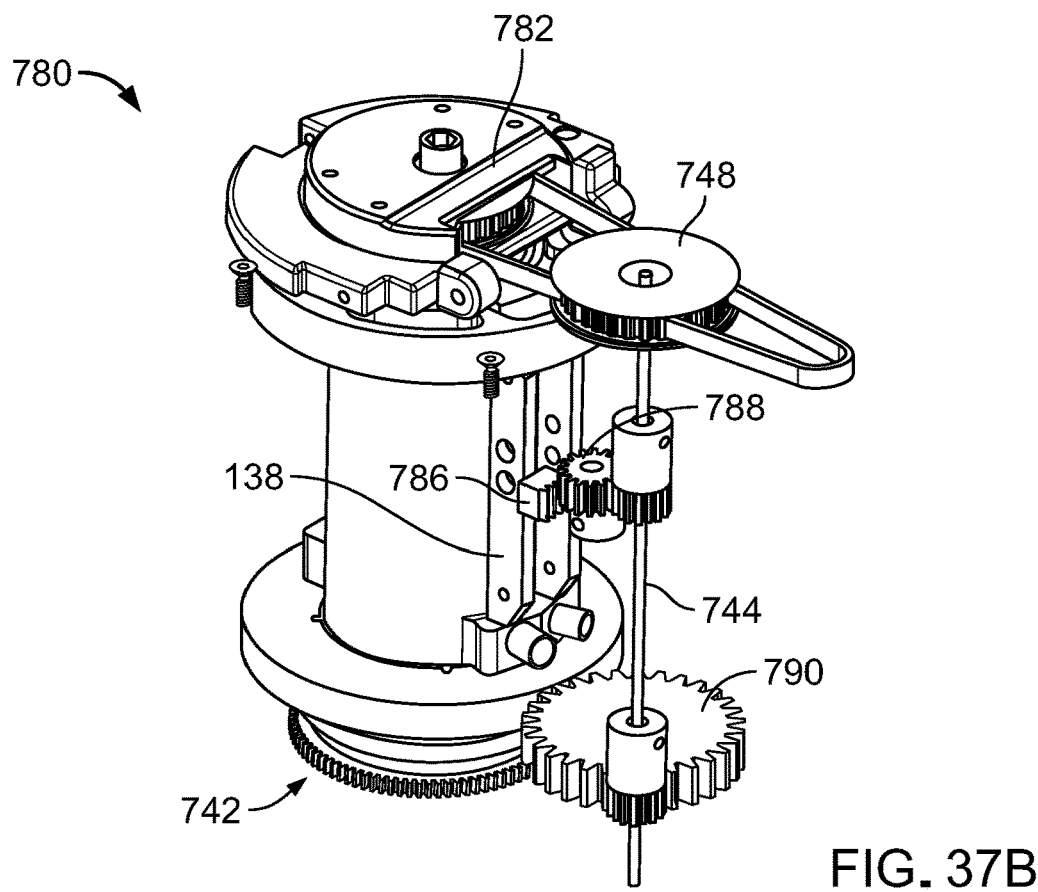

FIGS. 37A and 37B show perspective views of an assembly 780 that operates using a single motor and is substantially similar to the assembly 703. However, in the assembly 780, the third clutch 751 rotates to close or open the evaporator 108 rather than translate the driveshaft 720 via the puncturing mechanism 758. Additionally, the first clutch 746 is omitted and the mixing drive belt 752 connects the gear 748, the motor (not shown), and a second gear 782. The second gear 782 connects to the driveshaft 720 to rotate the driveshaft 720 when the motor rotates.

The third clutch 751 couples and decouples to the rod 744 to open and close the evaporator 108 via a clamping mechanism 784. The clamping mechanism 784 includes a rack 786 attached to the bar 138 and a pinion 788 rotatable by the third clutch 751 when the third clutch 751 is coupled to the rod 744. The second clutch 750 couples to a dispensing gear 790 to open and close the dispensing mechanism 742 when the second clutch 750 couples to the rod 744.

Figure 38A:
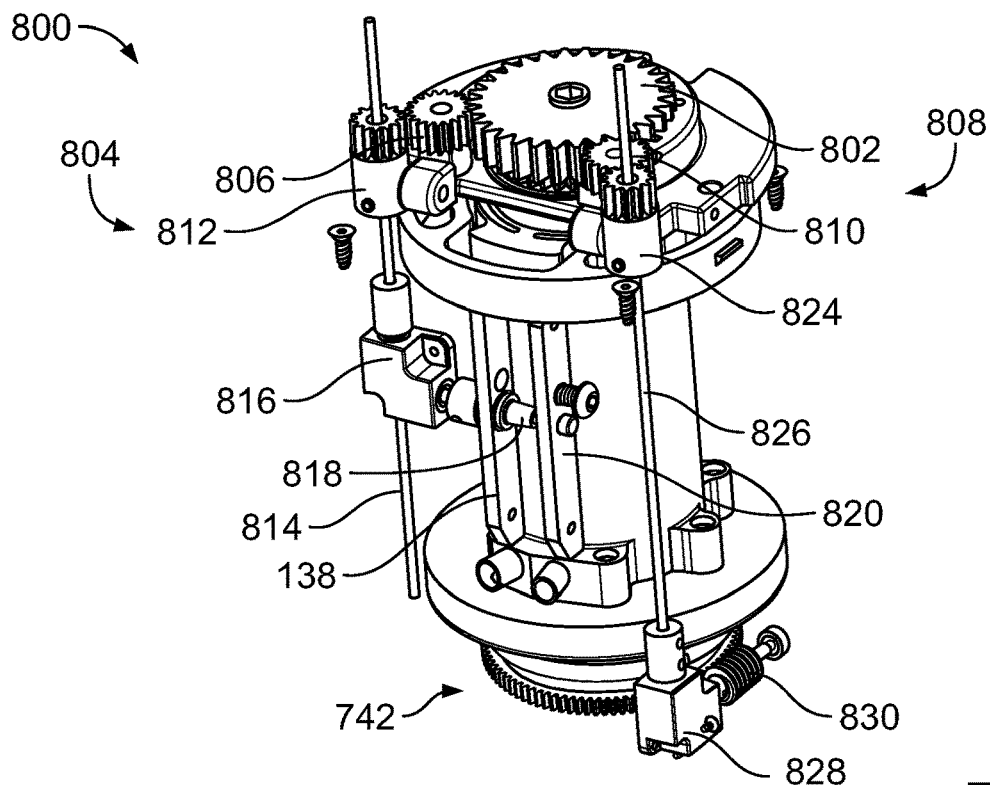
FIGS. 38A and 38B are schematic views of a machine with a single motor driving multiple components.
Figure 38B:
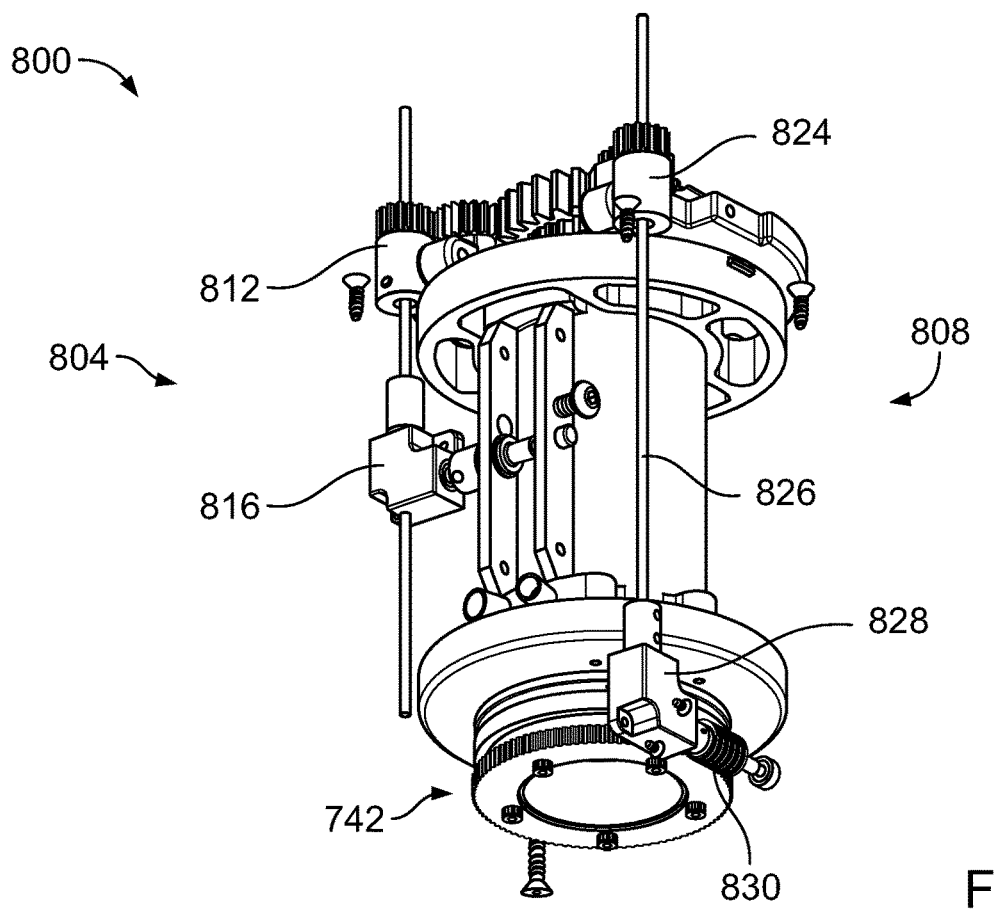

FIGS. 38A and 38B show an assembly 800 for rotating the mixing paddle 170, translating the bar 138 on the evaporator 108, and rotating the dispensing mechanism 742 using a single motor 740. The motor (not shown) connects to a primary gear 802 via a pulley (not shown). The primary gear 802 is rotationally connected to the driveshaft 720 and in toothed engagement with an evaporator clamping assembly 804 via a clamping gear 806 and a dispensing rotation assembly 808 via a dispensing gear 810.

The evaporator clamping assembly 804 includes an evaporator clutch 812, an evaporator rod 814, an evaporator screwdriver 816, and a screw 818 disposed in threaded holes 820 on bars 138. The dispensing gear 810 connects to the evaporator clutch 812. The evaporator clutch 812 rotationally couples and decouples the evaporator rod 814 based on a signal from the controller of the machine 700. When the evaporator clutch 812 and evaporator rod 814 are coupled, the evaporator rod 814 rotates due to the motor. The rotation of the rod 812 is translated into rotation of the screw 818 by the evaporator screwdriver 816. The evaporator screwdriver translates this rotation using an internal gear and pinion (not shown). In some screwdrivers, the screw rotation translates rotational about a vertical axis to rotational about a horizontal axis. The screw 818 screws into the threaded holes 820 and moves the evaporator 108 into the closed position. The evaporator clutch 812 disengages to maintain the closed position of the evaporator 108. To open the evaporator, the motor reverses the direction of rotation and the evaporator clutch 812 reengages to unscrew the screw 820 and move the evaporator 108 from the closed position to the open position.

The dispensing rotation assembly 808 includes a dispensing clutch 824, a dispensing rod 826, and a dispensing screwdriver 828, and a pinion 830 in toothed engagement with a dispensing mechanism 742. The dispensing gear 810 connects to the evaporator clutch 824. The dispensing clutch 824 rotationally couples and decouples the dispensing rod 826 based on a signal from the controller of the machine 700. When the dispensing clutch 824 and dispensing rod 826 are coupled, the dispensing rod 826 rotates due to the motor. The rotation of the rod 826 is translated into movement of the pinion 830 by dispensing screwdriver 828. The pinion 830 rotates to rotate the dispensing mechanism 742 from the closed position to the open position or vice versa. The evaporator screwdriver 828 translates this rotation using an internal gear and pinion (not shown). When the dispensing mechanism 742 is in the open position, the dispensing clutch 824 is decoupled from the rod 826 and the dispensing mechanism 742 maintains the open position. In some assemblies, the dispensing mechanism closes after dispensing by reversing the direction of the motor and coupling the dispensing clutch to the dispensing rod. In some screwdrivers, the movement of the rod is converted into a lateral force that translates the pinion to rotate the dispensing mechanism.

Figure 39:
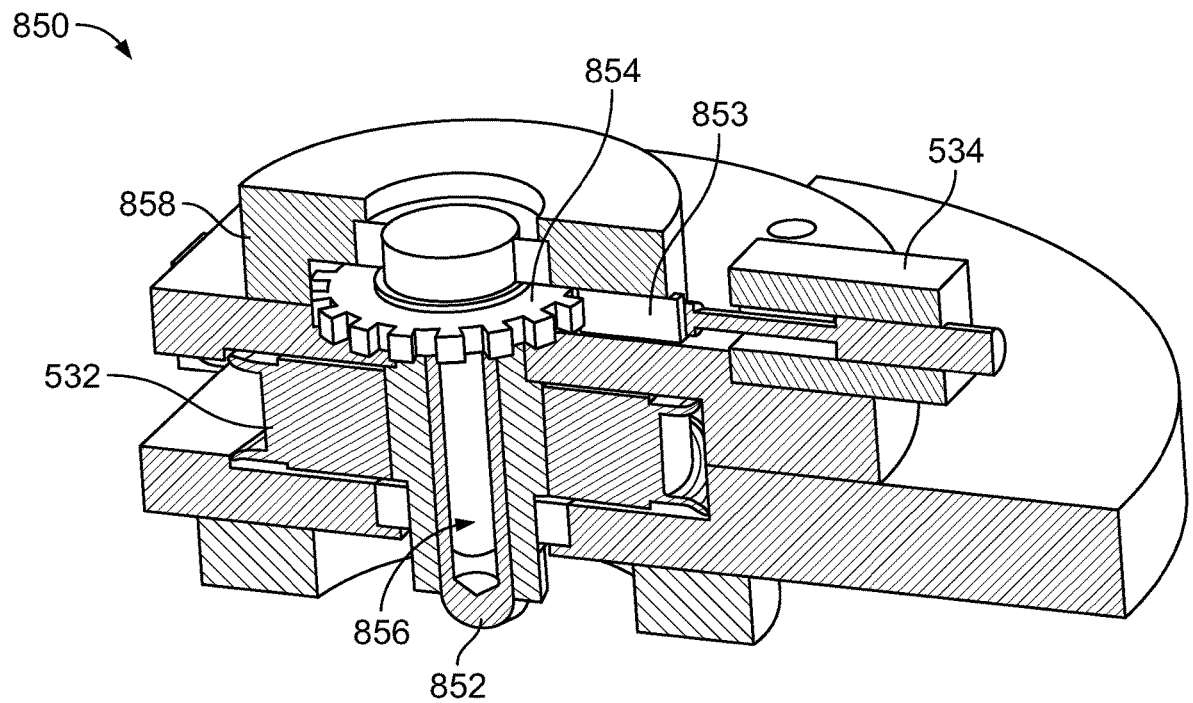
FIGS. 39 and 40 are schematic views of machines with telescoping driveshafts.

FIG. 39 shows a cross-sectional perspective view of a system 850 with telescoping driveshaft 852. The system 850 is substantially similar to the system 524 shown in FIGS. 27A-27C. However, the extending mechanism 850 includes a rod extending 853 that locks a cogwheel 854 of an internal screw 856. The internal screw 856 is internal to the telescopic driveshaft 852 and engages internal threads of the driveshaft 852 to extend the driveshaft 852 when the screw 856 is locked by the rod 853. The rod 853 is deployed when the solenoid 534 is energized and retracted when the solenoid 534 is de-energized. In its locked position, the driveshaft 852 rotates relative to the internal screw 856 and rides threads of the screw 856 to move up and down. When the driveshaft 856 is fully extended, the solenoid is de-energized and the internal screw 856 is unlocked. In the unlocked position, the internal screw 856 is rotationally coupled to the gearwheel 532, the driveshaft 852, and a cover plate 858.

To retract the driveshaft 852, the motor and gearwheel 532 rotate in the opposite direction. The solenoid is energized to lock the internal screw 856. The driveshaft 852 rotates in an opposite direction relative to the internal screw 856 and the driveshaft 852 rides the threads to retract.

Figure 40:
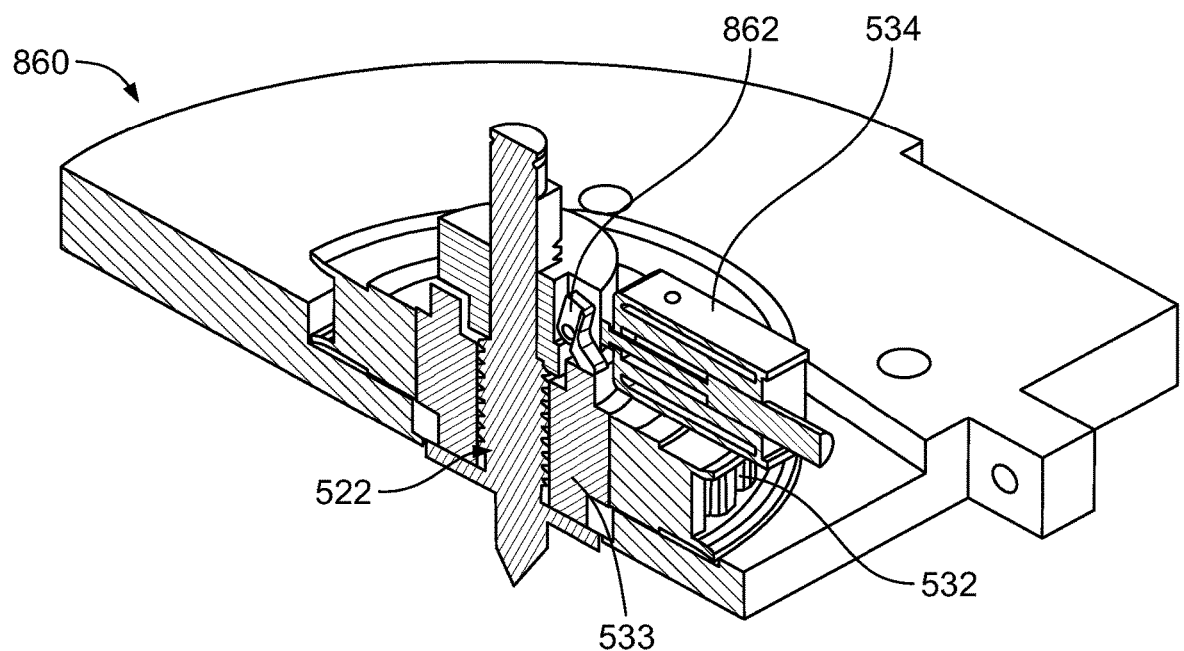

FIG. 40 shows a cross-sectional and perspective view of a system 860 with an extendable driveshaft 522. The system 860 is substantially similar to the system 524 of FIGS. 27A-27C. However, the extending mechanism 860 has a hinged lock 864 that is boomerang shaped.

A number of systems and methods have been described. Nevertheless, it will be understood that various modifications may be made without departing from the spirit and scope of this disclosure. For example, although the evaporators have been generally illustrated as being in vertical orientation during use, some machines have evaporators that are oriented horizontally or an angle to gravity during use. Accordingly, other embodiments are within the scope of the following claims.

What is claimed is:

1. A machine for reducing the temperature of ingredients in pods containing the ingredients and a mixing paddle, the machine including:
   a condenser of a refrigeration system;
   a plurality of evaporators of the refrigeration system fluidly connected with the condenser, each evaporator defining a receptacle sized to receive a pod and having an open position and a closed position;
   a plurality of driveshafts mechanically connected with at least one first motor, each driveshaft of the plurality of driveshafts associated with a corresponding evaporator of the plurality of evaporators and positioned to engage with a pod positioned in the corresponding receptacle to rotate the mixing paddle of the pod positioned in the corresponding receptacle; and
   a compressor disposed in the refrigeration system downstream of the plurality of evaporators and upstream of the condenser.

2. The machine of claim 1, wherein the at least one first motor is operable to move the mixing paddle of a pod in a receptacle of one of the evaporators when the evaporator is in the closed position.

3. The machine of claim 1, wherein the plurality of evaporators of the refrigeration system are fluidly connected in series with the condenser.

4. The machine of claim 1, further comprising a plurality of second motors, each second motor of the plurality of second motors associated with a corresponding evaporator of the plurality of evaporators and positioned to be engaged with a pod positioned in the corresponding receptacle to rotate a cap disposed on the pod positioned in the corresponding receptacle.

5. The machine of claim 1, further comprising a housing containing the condenser and the at least one motor.

6. The machine of claim 1, wherein each evaporator of the plurality of evaporators can operate independently of other evaporators of the plurality of evaporators.

7. The machine of claim 1, wherein each of the plurality of evaporators comprise a plurality of pieces movable between a first position and a second position.

8. The machine of claim 7, wherein the receptacle is smaller when the plurality of pieces are in the first position than when the plurality of pieces are in the second position.

9. A machine for reducing the temperature of ingredients in pods containing the ingredients and a mixing paddle, the machine including:
   a condenser of a refrigeration system;
   a plurality of evaporators of the refrigeration system fluidly connected in series with the condenser, each evaporator defining a receptacle sized to receive a pod and having an open position and a closed position;
   at least one first motor operable to move the mixing paddle of a pod in a receptacle of one of the evaporators when the evaporator is in the closed position;
   a compressor disposed in the refrigeration system downstream of the plurality of evaporators and upstream of the condenser; and
   a plurality of driveshafts mechanically connected with the at least one first motor, each driveshaft of the plurality of driveshafts associated with a corresponding evaporator of the plurality of evaporators and positioned to engage with a pod positioned in the corresponding receptacle to rotate the mixing paddle of the pod positioned in the corresponding receptacle.

10. The machine of claim 9, further comprising a plurality of second motors, each second motor of the plurality of second motors associated with a corresponding evaporator of the plurality of evaporators and positioned to be engaged with a pod positioned in the corresponding receptacle to rotate a cap disposed on the pod positioned in the corresponding receptacle.

11. The machine of claim 10, further comprising a housing containing the condenser and the at least one motor.

12. The machine of claim 11, wherein the plurality of evaporators consists of three evaporators.

13. The machine of claim 9, wherein each evaporator of the plurality of evaporators can operate independently of other evaporators of the plurality of evaporators.

14. A machine for reducing the temperature of ingredients in pods containing the ingredients and a mixing paddle, the machine including:
   a condenser of a refrigeration system;
   a plurality of evaporators of the refrigeration system fluidly connected with the condenser, each evaporator defining a receptacle sized to receive a pod and having an open position and a closed position;
   at least one first motor operable to move the mixing paddle of a pod in a receptacle of one of the evaporators when the evaporator is in the closed position; and
   a plurality of driveshafts mechanically connected with the at least one first motor, each driveshaft of the plurality of driveshafts associated with a corresponding evaporator of the plurality of evaporators and positioned to engage with a pod positioned in the corresponding receptacle to rotate the mixing paddle of the pod positioned in the corresponding receptacle;
   wherein the plurality of evaporators of the refrigeration system are fluidly connected in series with the condenser.

15. The machine of claim 14, further comprising a compressor disposed in the refrigeration system downstream of the plurality of evaporators and upstream of the condenser.

16. The machine of claim 14, further comprising a plurality of second motors, each second motor of the plurality of second motors associated with a corresponding evaporator of the plurality of evaporators and positioned to be engaged with a pod positioned in the corresponding receptacle to rotate a cap disposed on the pod positioned in the corresponding receptacle.

17. The machine of claim 14, further comprising a housing containing the condenser and the at least one motor.

18. The machine of claim 14, wherein the plurality of evaporators consists of three evaporators.

19. A machine for reducing the temperature of ingredients in pods containing the ingredients and a mixing paddle, the machine including:
- a condenser of a refrigeration system;
- a plurality of evaporators of the refrigeration system fluidly connected with the condenser, each evaporator defining a receptacle sized to receive a pod and having an open position and a closed position;
- a plurality of motors, each motor of the plurality of motors associated with a corresponding evaporator of the plurality of evaporators and positioned to be engage with a pod positioned in the corresponding receptacle to rotate a cap disposed on the pod positioned in the corresponding receptacle; and
- a compressor disposed in the refrigeration system downstream of the plurality of evaporators and upstream of the condenser.

20. The machine of claim 19, wherein each evaporator of the plurality of evaporators can operate independently of other evaporators of the plurality of evaporators.

21. The machine of claim 19, further comprising a housing containing the condenser and the plurality of motors.

\* \* \* \* \*